(12) United States Patent
Luzenski et al.

(10) Patent No.: US 10,737,234 B2
(45) Date of Patent: Aug. 11, 2020

(54) MICROCHANNEL REACTORS AND FABRICATION PROCESSES

(71) Applicants: Robert J. Luzenski, Marysville, OH (US); Jeffery D. Slane, Galloway, OH (US); Thomas D. Yuschak, Lewis Center, OH (US); Paul W. Neagle, Westerville, OH (US); Michael Marchiando, London, OH (US)

(72) Inventors: Robert J. Luzenski, Marysville, OH (US); Jeffery D. Slane, Galloway, OH (US); Thomas D. Yuschak, Lewis Center, OH (US); Paul W. Neagle, Westerville, OH (US); Michael Marchiando, London, OH (US)

(73) Assignee: VELOCYS, INC., Plain City, OH (US)

( * ) Notice: Subject to any disclaimer, the term of this patent is extended or adjusted under 35 U.S.C. 154(b) by 0 days.

(21) Appl. No.: 16/147,898

(22) Filed: Oct. 1, 2018

(65) Prior Publication Data
US 2019/0030508 A1 Jan. 31, 2019

Related U.S. Application Data

(62) Division of application No. 14/922,205, filed on Oct. 26, 2015, now Pat. No. 10,159,954, which is a (Continued)

(51) Int. Cl.
*B01J 19/00* (2006.01)
*B01J 8/00* (2006.01)
(Continued)

(52) U.S. Cl.
CPC ......... *B01J 19/0093* (2013.01); *B01J 8/0015* (2013.01); *B01J 8/16* (2013.01);
(Continued)

(58) Field of Classification Search
CPC .......... B01J 19/10; B01J 8/16; B01J 19/0093; B65B 1/22; B29C 67/00
See application file for complete search history.

(56) References Cited

U.S. PATENT DOCUMENTS

| | | | |
|---|---|---|---|
| 4,175,037 A | 11/1979 | Benney et al. | |
| 5,727,618 A | 3/1998 | Mundinger et al. | |

(Continued)

FOREIGN PATENT DOCUMENTS

| | | |
|---|---|---|
| DE | 29719919 U1 | 4/1999 |
| DE | 10057827 A1 | 2/2002 |

(Continued)

OTHER PUBLICATIONS

Boughtflower, R.J. et al., "The production of packed capillaries using a novel pressurized ultrasound device", 1995, Chromatographia 41(7/8), pp. 398-402.

(Continued)

*Primary Examiner* — Timothy P. Kelly
(74) *Attorney, Agent, or Firm* — Frank Rosenberg

(57) ABSTRACT

A method of loading material within a microchannel device, the method comprising: (a) loading particulates into a plurality of microchannels; and, (b) ultrasonically packing the particulates into the plurality of microchannels using a portable, compact ultrasonic densification unit.

15 Claims, 56 Drawing Sheets

Related U.S. Application Data division of application No. 13/553,518, filed on Jul. 19, 2012, now Pat. No. 9,174,387.

(60) Provisional application No. 61/509,469, filed on Jul. 19, 2011.

(51) Int. Cl.
    *B01J 8/16*     (2006.01)
    *B29C 67/00*     (2017.01)
    *C10G 2/00*     (2006.01)
    *B01J 8/18*     (2006.01)

(52) U.S. Cl.
CPC ............... *B29C 67/00* (2013.01); *C10G 2/32* (2013.01); *C10G 2/34* (2013.01); *B01J 8/18* (2013.01); *B01J 8/1881* (2013.01); *B01J 2219/00783* (2013.01); *B01J 2219/00801* (2013.01); *B01J 2219/00806* (2013.01); *B01J 2219/00817* (2013.01); *B01J 2219/00835* (2013.01); *B01J 2219/00844* (2013.01); *B01J 2219/00873* (2013.01); *B01J 2219/00932* (2013.01); *B01L 2200/0647* (2013.01); *B01L 2400/0436* (2013.01)

(56) References Cited

U.S. PATENT DOCUMENTS

| | | |
|---|---|---|
| 6,854,168 B2 | 2/2005 | Booms et al. |
| 6,923,907 B2 | 8/2005 | Hobbs et al. |
| 6,969,506 B2 | 11/2005 | Tonkovich et al. |
| 7,404,936 B2 | 7/2008 | Mazanec et al. |
| 7,549,788 B2 | 6/2009 | Fujiwara et al. |
| 7,820,725 B2 | 10/2010 | Tonkovich et al. |
| 7,842,256 B2 | 11/2010 | Lee-Tuffnell |
| 7,883,579 B2 | 2/2011 | Kodashima et al. |
| 8,118,889 B2 | 2/2012 | Bowe |
| 8,206,666 B2 | 6/2012 | Wang et al. |
| 8,632,729 B2 | 1/2014 | Inoue et al. |
| 8,747,656 B2 | 6/2014 | Tonkovich et al. |
| 9,101,903 B2 | 8/2015 | Zikeli et al. |
| 9,174,387 B2 | 11/2015 | Luzenski et al. |
| 10,335,759 B2 | 7/2019 | Ramler et al. |
| 2004/0189030 A1 | 9/2004 | Briggs |
| 2009/0252658 A1 | 10/2009 | Ramler et al. |
| 2011/0083997 A1 | 4/2011 | Silva et al. |
| 2012/0095268 A1 | 4/2012 | Tonkovich et al. |
| 2012/0132290 A1 | 5/2012 | Tonkovich et al. |

FOREIGN PATENT DOCUMENTS

| | | |
|---|---|---|
| JP | 2004167448 A | 6/2004 |
| JP | 2007216123 A | 8/2007 |
| JP | 2010012466 A | 1/2010 |
| JP | 4804718 B2 | 11/2018 |
| WO | 2009126769 A2 | 10/2009 |

OTHER PUBLICATIONS

Matsusaka et al., "Microfeeding of fine powders using a capillary tube with ultrasonic vibration", Advanced Powder Technology, vol. 6, No. 4, pp. 283-293 (1995).
Yang, Shoufeng, "Acoustic Control of Powder dispensing in open tubes", Powder Technology, vol. 139, No. 1, Jan. 1, 2004 (Jan. 1, 2004), pp. 55-60.
Yang, Yong et al, "Experimental and analytical study of ultrasonic micro-powder feeding", Journal of Physics D: Applied Physics 36 (2003), pp. 1349-1354.
Machine translation of JP2004067448(A).
Machine translation of JP 216123A.
Machine translation of JP2010012466A.
Machine translation of JP4804718B2.
Machine translation of DE 10057827A1.
Machine translation of DE 29719919U1.
International Preliminary Report on Patentability for International Appln. No. PCT/US2012/047466 dated Nov. 20, 2013.
International Search Report for International Appln. No. PCT/US2012/047466 dated Jul. 3, 2013.
Written Opinion of the International Searching Authority PCT/US2012/047466 dated Feb. 23, 2013.
International Preliminary Report on Patentability for International Appln. No. PCT/US2012/047454 dated Nov. 1, 2013.
International Search Report for Appln. No. PCT/US2012/047454 dated Feb. 14, 2013.
Written Opinion in International Application No. PCT/US2012/047454 dated Feb. 14, 2013.
Official Action dated Jan. 27, 2017 by the German Patent Office in German Application No. 11 2012 003 041.9.
Official Action dated May 6, 2016 is Japanese Patent Application No. 2014-521799.
Notice of Grounds for Rejection dated Apr. 16, 2018 from JP Application No. 2017-092504.

MICROCHANNEL REACTORS AND FABRICATION PROCESSES

CROSS-REFERENCE TO RELATED APPLICATIONS

The present application is a divisional of U.S. patent application Ser. No. 14/922,205, filed Oct. 15, 2015, now U.S. Pat. No. 10,159,954 which was a divisional of U.S. patent application Ser. No. 13/553,518, filed Jul. 19, 2012, now U.S. Pat. No. 9,174,387; which claimed the benefit of U.S. Provisional Patent Application Ser. No. 61/509,469, entitled "MICROCHANNEL REACTORS AND FABRICATION PROCESSES," filed Jul. 19, 2011, the disclosure of which is hereby incorporated by reference.

FEDERALLY SPONSORED RESEARCH OR DEVELOPMENT

This invention was made with government support under United States Department of Agriculture NIFA Award No. 2009-10006-06037. The government may have certain rights in the invention.

INTRODUCTION TO THE INVENTION

The present disclosure is directed to conducting chemical processing applications in by manifolding streams to and from multiple parallel reactor modules and, more specifically, to conducting processing in multiple reactor modules within pressure containing assemblies which have been designed to facilitate maintenance, repair, and replacement of packed beds of solid materials. The present disclosure includes methods and devices particularly useful for construction and operation of multiple parallel chemical processing modules, each module comprising multiple distinct and separate process channels, such as microchannels, where each channel comprising packed beds of solids. The packed bed of solids may comprise one or more materials useful as a catalyst, sorbent, heat transfer material, mass transfer material, fluid distribution packing, diluent, as a physical retention material for any of these, or any combination of these. The packed bed of solids may contain multiple types of the foregoing materials. The types of chemical processing operations supported by this invention include heterogeneously-catalyzed chemical reactions, adsorption, including temperature-swing adsorption or pressure-swing adsorption, and separations, including absorption, and distillation.

The catalyst may comprise any catalyst that is suitable for use in chemical reactors involving the use of fluid reactants. The catalyst may be a catalyst useful in conducting one or more of the following chemical reactions: acetylation addition, alkylation, dealkylation, hydrodealkylation, reductive alkylation, amination, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, ammoxidation, water-gas shift, dehalogenation, dimerization, epoxidation, esterification, Fischer-Tropsch reaction, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating, isomerization, methylation, demethylation, metathesis, methanol synthesis, nitration, oxidation, partial oxidation, polymerization, reduction, reformation, reverse water gas shift, sulfonation, telomerization, transesterification, trimerization, Sabatier reaction, carbon dioxide reforming, preferential oxidation, or preferential methanation.

The catalyst may comprise a metal, metal oxide or mixed metal oxide of a metal selected from Mo, W, V, Nb, Sb, Sn, Pt, Pd, Cs, Zr, Cr, Mg, Mn, Ni, Co, Ce, or a mixture of two or more thereof. These catalysts may also comprise one or more alkali metals or alkaline earth metals or other transition metals, rare earth metals, or lanthanides. Additionally elements such as P and Bi may be present.

The catalyst may comprise one or more: catalyst metals, including noble metals, transition metals and combinations thereof; metal oxides, including oxides of alkali metals, alkaline earth metals, boron, gallium, germanium, arsenic, selenium, tellurium, thallium, lead, bismuth, polonium, magnesium, titanium, vanadium, chromium, manganese, iron, nickel, cobalt, copper, zinc, zirconium, molybdenum, tin, calcium, aluminum, silicon, lanthanum series element (s), and combinations thereof; composites; zeolite (s); nitrides; carbides; sulfides; halides; phosphates; and combinations of any of the above.

The sorption medium may be inorganic. Examples of inorganic sorption mediums that may be used include $Sb_2O_5$, AgO, PtO, $CrO_2$, PbO, HgO, $Cu_2O$, MnO, $Mn_2O_3$, $Bi_2O_4$, NiO, $NiO_2$, $Cu_2O_3$, SnO, $SnO_2$, $WO_2$, $WO_3$, $W_2O_5$, perfluorinated film, Pt/γ-alumina, Fe/γ-alumina, Cu/γ-alumina, Zn/γ-alumina, Co/γ-alumina, zeolite, or a combination of two or more thereof. Included in this group are metal cyanide oligomers and polymers. These include the oligomers and polymers represented by the formulae $[Cu(I)(CN)_x]_n$, $[Fe(II)(CN)_y]_n$, or $[Co(II)(CN)_y]_n$, wherein x is 3; y is 5; and n is a number that is at least 2, and in one embodiment is in the range of about 2 to about 16,500, and in one embodiment about 1000 to about 10,000.

The sorption medium may comprise silver, gold, platinum, copper, zinc, palladium, nickel, zeolite, silica gel, carbon molecular sieves, polymeric materials, alumina, inorganic complexes (e.g., metal centered porphyrin rings) or a combination of two or more thereof.

In one embodiment, the sorption medium comprises a reactive complexation sorbent that forms a reversible chemical complex with a fluid component at a relatively high temperature wherein the fluid component is sorbed by the surface of the sorption medium. At a lower temperature the chemical reaction is reversed and the complexed fluid is recovered in a more purified form.

The sorption medium may comprise an antioxidant. Examples include secondary amines, phenolic phosphates, phosphites, phenolics, bisphenolics, hydroxylamines, olefinic carboxylates, amino carboxylates (e.g., ethylene diamine tetracetic acid and salts thereof), tocopherol, di-tertiarybutyl-p-cresol, stannous salts, stannous oxides, sorbate, polysorbate, or a combination of two or more thereof.

As disclosed herein, the exemplary microchannel devices may be utilized to carry out a Fisher-Tropsch (FT) process and more broadly on any high pressure (defined as an operating pressure greater than 2 bar) reaction system. The FT process was first developed by Franz Fischer and Hanz Tropsch in Germany in the 1920s and 1930s. The chemistry is based on making longer chain hydrocarbons from a mixture of carbon monoxide (CO) and hydrogen (H2), referred to as "synthesis gas", at an elevated pressure and temperature and in the presence of a catalyst. The FT reaction may be carried out in a chemical reactor containing a fixed bed of solid catalyst. Suitable FT catalyst compositions are known in the art. The excess heat generated from conducting the FT reaction in a fixed catalyst bed has typically been removed by inserting boiler tubes that carry water. In theory, any source of carbon can be used to generate the synthesis gas.

The majority of the products from FT synthesis are paraffinic waxes based on the following chemical equation.

$$nCO+(2n+1)H_2 \rightarrow C_nH_{2n+2}+H_2O \quad (1)$$

Typical byproducts are liquefied petroleum gas (LPG) and naphtha. After the FT process, heavier hydrocarbons can be hydrocracked to produce distillate products, notably diesel and jet fuels. FT derived transportation fuels are typically referred to as synthetic fuels.

Conventional microchannel technology typically uses diffusion bonding and/or brazing to secure large area metal shim layers to one another. It is believed that without bonding the entire exposed surfaces of the shim layers to one another, the microchannel device will not withstand normal or elevated operating pressures. At the same time, conventional wisdom greatly favors diffusion bonding and/or brazing to ensure parallel microchannels are not in communication with one another (i.e., complete channel separation even between channels carrying the same contents). Diffusion bonding and brazing rely on the formation of a contiguous metallic interface between the microchannel layers. The contiguous interface is thought to be advantageous for the purposes of heat transfer from one microchannel to an adjacent microchannel and to avoid cross-talk of fluids which may create an operational challenge whereby boiling in the coolant channels could lead to local dryout if flow could move away from high flux zones.

Brazing is the process to bond two objects to one another that relies upon the addition of an interlayer material that melts at a temperature below the melting temperature of the materials to be bonded. The interlayer material becomes liquid during the diffusion brazing or brazing process and flows to fill any gaps or voids between the materials to be joined. As the interlayer material cools, it solidifies to joint the adjacent materials. But when the interlayer material is liquefied, it may also diffuse into the materials to be joined. Likewise, the materials to be joined may diffuse into the interlayer material. As diffusion progresses, the local composition of the interlayer material may significantly change.

The inventors of the subject matter disclosed herein have defied conventional wisdom and created microchannel technology that does not rely on diffusion bonding and/or brazing to secure microchannel shim layers to one another. Instead, the novel microchannel technology disclosed herein makes use of welding to secure the shim layers to one another. By using welding instead of brazing or diffusion bonding, the process costs are significantly reduced and manufacturing scale-up to large hardware is considerably easier as induced thermal deformation from bonding and brazing of large devices is avoided.

Welded microchannel reactors which operate with fluids at differential pressures more than about 2 bar, such as 4 to 100 bar (or more specifically within the range of 5 to 40 bar) from ambient pressure require external support into order to maintain mechanical integrity. These external supports may include compression reactor assemblies, as exemplified in US2005/0249647, which is incorporated by reference. These external supports may also include external mechanical structural supports as exemplified in US patent application Ser. No. 61/394,328 filed Oct. 18, 2010 and 61/441,276 filed Feb. 9, 2011, which are incorporated by reference. Additional designs for providing support to welded reactors are provided in the following description.

The exemplary pressure containment systems differs from the prior art through a reduction in the amount of metal required to contain a pressurized microchannel device when the device is not internally joined as with bonding or brazing. In the prior art, a pressurized shell with a single pressurized fluid surrounded four or more sides of a microchannel device. The exemplary devices described herein require less metal to contain pressure within the devices. In exemplary form, pressurized zones, such as cylindrical or curved, are placed around two faces of the device that do not contain inlet or outlet flow streams. On faces which include flow streams, the pressure is contained in headers and footers without secondary pressure containment.

One of the problems addressed by the exemplary embodiments is reducing the amount of material and thus cost to contain high pressure fluids in welded microchannel reactors that are not internally sealed, such as by using bonding or brazing. The solution, in part, may include containing high internal pressures using higher pressure external fluids in selective locations of the device or through the use of thick (greater than 3 cm, or in a range of 3 to 50 cm (such as 3 to 15 cm)) endplates without the use of a secondary fluid. Both solutions require less metal and thus are lower cost than the use of a high pressure fluid surrounding the entire device which includes four or more faces.

Additional problems addressed by the exemplary embodiments are: (a) the need to load solid particulate materials into multiple parallel and separate microchannels contained within a pressure vessel with sufficient uniformity to achieve desired packing density, without which the chemical processor may not achieve desired performance; (b) the need to provide a precise, repeatable catalyst loading process for multiple parallel and separate microchannels contained within a pressure vessel, (b) the need to need to unload solid particulate materials from multiple parallel microchannels contained within a pressure vessel in order to refresh the chemical processor with new materials; (c) the need to provide loading and unloading of solid materials using a densification apparatus that is placed within a pressure vessel and which enables loading of multiple parallel microchannels with sufficient uniformity; and, (d) the need to provide service to chemical processors located in the field at a plant or in a remote location by using a portable densification apparatus that is placed within a pressure vessel and which enables loading of solid materials with sufficient uniformity into multiple parallel microchannels contained within said pressure vessel. For example, when a catalyst has reached its useful life in service and a plant owner schedules a change out of the used catalyst for fresh catalyst, a catalyst handling service provider may use the portable densification apparatus to provide catalyst unloading and loading services to the reactor owner. These and other exemplary advantages should be apparent to those skilled in the art after reviewing the following description of exemplary embodiments.

In a first aspect, the invention provides a method of increasing packing density of particulates loaded into a plurality of microchannels in microchannel apparatus, comprising: providing a microchannel apparatus comprising a plurality of microchannels that comprise particulates; positioning a ultrasound-producing head at one end of the plurality of microchannels and placing the head in sonic contact with the plurality of microchannels; and, applying ultrasonic energy to the plurality of microchannels from the ultrasound-producing head. In some preferred embodiments, the invention can be further characterized by one or any combination of the following characteristics: a sonically conductive material is disposed between the ultrasound-producing head and the plurality of microchannels; wherein the ultrasonic energy has a frequency of 15 to 40 kHz; wherein the ultrasound-producing head is pressed against the apparatus with a contact pressure of 100 kPa (15 psi) to 280 kPa (40 psi); wherein the ultrasonic energy is provided in bursts of 30 seconds or less, more preferably from 1 to 10 seconds, and in some embodiments in that range of 1 to 5 seconds; wherein each microchannel in the plurality of microchannels has a length of at least 10 cm and at least one dimension of 10 mm or less; wherein the microchannel apparatus comprises at least 1000 microchannels and wherein the ultrasound-producing head extends over no more than 500 of said at least 1000 microchannels at one time; wherein the microchannel apparatus comprises an insert that extends down the length of the microchannel; wherein the insert transmits sonic energy down the length of the microchannel; wherein the microchannel apparatus comprises channels at least partly defined by walls of a wave-shaped insert (an example of the construction of a waveform is shown in FIG. 9); wherein the microchannel apparatus comprises plural inserts that extend down the length of the plurality of microchannels; wherein the inserts transmit sonic energy down the length of the plurality of microchannels; further comprising a step, that is subsequent to the step of applying ultrasonic energy, of attaching a manifold that covers the ends of the plurality of microchannels and creates a flow path for fluid into or out of the plurality of microchannels. In some preferred embodiments, the microchannel is defined by a first wall and a second wall and the insert has lower mass than either the first or second walls, typically a thickness that is 50% or less than the thickness of either the first or the second walls. Insert can have shapes such as a waveform, or a spiral. The term "extends down the length" means that the insert has a length that is in the same direction as the length of the microchannels. The microchannel length is typically longer than the insert length. In preferred embodiments, the insert's length is at least 50% that of the microchannel, in some embodiments, at least 90% of the microchannel's length.

In a second aspect, the invention provides a method of unloading particulates from microchannel apparatus, comprising: providing a microchannel apparatus comprising a plurality of microchannels that comprise particulates; positioning a ultrasound-producing head at one end of the plurality of microchannels and placing the head in sonic contact with the plurality of microchannels; and, applying ultrasonic energy to the plurality of microchannels from the ultrasound-producing head; wherein the step of applying ultrasonic energy is conducted while the plurality of microchannels are dry (note that "dry" means that the channels comprise a greater volume of gas than volume of liquid).

It is a third aspect of the present invention to provide a method of loading material within a microchannel device, the method comprising: (a) loading particulates into a plurality of microchannels; and, (b) ultrasonically packing the particulates into the plurality of microchannels using a portable, compact ultrasonic densification unit.

In a more detailed embodiment of the third aspect, the act of loading particulates into the plurality of microchannels creates a microchannel packed bed. In yet another more detailed embodiment, the plurality of microchannels are arranged in parallel to one another. In a further detailed embodiment, the particulates comprise at least one of a catalyst, a sorbent, a heat transfer material, a mass transfer material, a fluid distribution packing, and a diluent. In still a further detailed embodiment, the particulates comprise a catalyst. In a more detailed embodiment, the method further includes dislodging used particulates from the plurality of microchannels, where the used particulates was packed within the plurality of microchannels. In a more detailed embodiment, the method further includes removing a first barrier downstream from the plurality of microchannels prior to dislodging spent catalyst from the plurality of microchannels, the first barrier inhibiting catalyst housed within the plurality of microchannels from passing therethrough, and reinstalling the first barrier downstream from the plurality of microchannels prior to loading the particulates into the plurality of microchannels. In another more detailed embodiment, the method further includes removing a first barrier downstream from the plurality of microchannels prior to dislodging spent catalyst from the plurality of microchannels, the first barrier inhibiting catalyst housed within the plurality of microchannels from passing therethrough, and installing a second barrier downstream from the plurality of microchannels prior to loading the particulates into the plurality of microchannels, the second barrier inhibiting catalyst housed within the plurality of microchannels from passing therethrough. In yet another more detailed embodiment, the method further includes removing a third barrier upstream from the plurality of microchannels prior to dislodging spent catalyst from the plurality of microchannels, the third barrier inhibiting catalyst housed within the plurality of microchannels from passing therethrough, and installing a fourth barrier upstream from the plurality of microchannels subsequent to ultrasonically packing the particulates into the plurality of microchannels, the fourth barrier inhibiting catalyst housed within the plurality of microchannels from passing therethrough. In still another more detailed embodiment, the plurality of microchannels extend in parallel to one another, each of the plurality of microchannels includes a linear segment, the linear segment houses at least one of the spent catalyst and the particulates, and ultrasonically packing the particulates into the plurality of microchannels includes increasing the density of particulates between 1 grams per milliliter to 1.5 grams per milliliter.

In yet another more detailed embodiment of the third aspect, the plurality of microchannels are arranged in multiple layers, where at least two of the layers are spaced apart from one another, and the step of ultrasonically packing the particulates into the plurality of microchannels includes packing certain layers prior to other layers. In still another more detailed embodiment, at least two of the multiple layers of the plurality of microchannels are spaced apart from one another by a layer of intervening channels. In a further detailed embodiment, the intervening channels comprise coolant channels and the coolant channels comprise coolant microchannels. In still a further detailed embodiment, the portable, compact ultrasonic densification unit includes a programmable ultrasonic packer, the step of ultrasonically packing the particulates into the plurality of microchannels includes using the programmable ultrasonic packer, and the programmable ultrasonic packer is autonomously repositionable with respect to the plurality of microchannels. In a more detailed embodiment, the portable, compact ultrasonic densification unit includes an ultrasonic packer, the step of ultrasonically packing the particulates into the plurality of microchannels includes using the ultrasonic packer, and the ultrasonic packer is manually repositionable with respect to the plurality of microchannels. In a more detailed embodiment, the method further includes installing a first barrier downstream from the plurality of microchannels prior to loading the particulates into the plurality of microchannels, the first barrier inhibiting catalyst housed within the plurality of microchannels from passing therethrough. In another more detailed embodiment, the method further includes installing a second barrier upstream from the plurality of microchannels subsequent to ultrasonically packing the particulates into the plurality of microchannels, the second barrier inhibiting catalyst housed within the plurality of microchannels from passing therethrough. In yet another more detailed embodiment, the act of loading particulates into the plurality of microchannels includes distributing particulate particulates into the plurality of microchannels.

In a more detailed embodiment of the third aspect, the act of ultrasonically packing the particulates includes vertically repositioning an ultrasonic horn to contact a first set of a plurality of coolant microchannels adjacent the plurality of microchannels, and activating the ultrasonic horn after contacting the first set of the plurality of coolant microchannels. In yet another more detailed embodiment, the ultrasonic horn emanates sound waves having a frequency between twenty to forty kilohertz. In a further detailed embodiment, the ultrasonic horn is pressed against the first set of the plurality of coolant microchannel with a contact pressure of between 200 kilopascals to 280 kilopascals. In still a further detailed embodiment, the ultrasonic horn is activated in bursts of thirty seconds or less. In a more detailed embodiment, the ultrasonic horn is activated in bursts of ten seconds or less. In a more detailed embodiment, the ultrasonic horn is activated in bursts of three seconds or less. In another more detailed embodiment, the act of ultrasonically packing the particulates includes vertically repositioning the ultrasonic horn to no longer contact the first set of the plurality of coolant microchannels, horizontally repositioning the ultrasonic horn, lowering the ultrasonic horn to contact a second set of the plurality of coolant microchannels adjacent the plurality of microchannels, and activating the ultrasonic horn after contacting the second set of the plurality of coolant microchannels. In yet another more detailed embodiment, the method further includes assembling the portable, compact ultrasonic densification unit within a pressure vessel housing the plurality of microchannels prior to the act of ultrasonically packing the particulates, and disassembling the portable, compact ultrasonic densification unit and removing the portable, compact ultrasonic densification unit from the pressure vessel housing the plurality of microchannels subsequent to the act of ultrasonically packing the particulates. In still another more detailed embodiment, the method further includes loading a second amount of particulates into a plurality of microchannels after initially ultrasonically packing the particulates, and ultrasonically packing the second amount particulates into the plurality of microchannels using the portable, compact ultrasonic densification unit.

It is a fourth aspect of the present invention to provide a portable, compact ultrasonic packer comprising a mobile carriage including an ultrasonic horn, the mobile carriage traverses along a rail in order to reposition the mobile carriage horizontally, where the ultrasonic horn is vertically repositionable with respect to the rail, and where the rail comprises at least two sections operatively coupled to one another.

In a more detailed embodiment of the fourth aspect, the rail comprises a horizontal member. In yet another more detailed embodiment, the rail comprises a right side rail and a left side rail, the right side rail comprises a first section removably coupled to a second section, the left side rail comprises a third section removably coupled to a fourth section, and the mobile carriage spans between the right side rail and the left side rail. In a further detailed embodiment, the first section, the second section, the third section, and the fourth section comprise a planar, horizontal surface upon which the mobile carriage may be repositioned, and a vertical surface including a plurality of evenly spaced orifices, and the mobile carriage includes a repositionable actuator that is configured to move between an extended position and a retracted position, the repositionable actuator sized so that at least a portion thereof can be received within at least one of the plurality of evenly spaced orifices. In still a further detailed embodiment, the mobile carriage includes a first wheel that rides upon at least one of the first and second sections, and a second wheel that rides upon at least one of the third and fourth sections. In a more detailed embodiment, the rail includes a plurality of evenly spaced apart orifices distributed therealong, and the mobile carriage includes a repositionable actuator that is configured to move between an extended position and a retracted position, the repositionable actuator sized so that at least a portion thereof can be received within at least one of the plurality of orifices of the rail. In a more detailed embodiment, the mobile carriage includes a wheel that rides upon the rail. In another more detailed embodiment, the ultrasonic horn is vertically repositionable with respect to the mobile carriage, and the ultrasonic horn comprises a first ultrasonic horn and a second ultrasonic horn. In yet another more detailed embodiment, the ultrasonic horn is pneumatically repositionable with respect to the mobile carriage, and the first ultrasonic horn is oriented on the left side of the carriage and the second ultrasonic horn is orientated on the right side of the carriage. In still another more detailed embodiment, the portable, compact ultrasonic packer further comprises a microchannel apparatus, where the mobile carriage is repositionably mounted to the microchannel apparatus.

It is a fifth aspect of the present invention to provide a microchannel reactor comprising: (a) a plurality of reaction microchannels having a particulate catalyst packed along the length of the microchannels; (b) a plurality of heat transfer microchannels in thermal communication with the plurality of reaction microchannels; and, (c) a first retainer positioned at a first end of the plurality of microchannels to inhibit the particulate catalyst from exiting the reaction microchannels via the first end.

In a more detailed embodiment of the fifth aspect, the microchannel reactor further includes a second retainer positioned at a second end of the plurality of microchannels, opposite the first end, to inhibit the particulate catalyst from exiting the reaction microchannels via the second end. In yet another more detailed embodiment, at least one of the first retainer and the second retainer includes a screen. In a further detailed embodiment, the first retainer and the second retainer each include the screen, and the screen is fabricated from at least one of a metal, a ceramic, stainless steel, a nickel alloy, a cobalt alloy, an iron alloy, copper, aluminum, a glass, and a plastic. In still a further detailed embodiment, the first retainer comprises a screen fabricated from at least one of a metal, a ceramic, stainless steel, a nickel alloy, a cobalt alloy, an iron alloy, copper, aluminum, a glass, and a plastic. In a more detailed embodiment, at least one of the first retainer and the second retainer includes a porous foam. In a more detailed embodiment, the first retainer and the second retainer each include the porous foam, and the porous foam is fabricated from at least one of a metal, a ceramic, stainless steel, a nickel alloy, a cobalt alloy, an iron alloy, copper, aluminum, a glass, and a plastic. In another more detailed embodiment, the first retainer comprises a porous foam fabricated from at least one of a metal, a ceramic, stainless steel, a nickel alloy, a cobalt alloy, an iron alloy, copper, aluminum, a glass, and a plastic. In yet another more detailed embodiment, the first retainer includes a porous foam fabricated from at least one of a metal, a ceramic, stainless steel, a nickel alloy, a cobalt alloy, an iron alloy, copper, aluminum, a glass, and a plastic and a screen fabricated from at least one of a metal, a ceramic, stainless steel, a nickel alloy, a cobalt alloy, an iron alloy, copper, aluminum, a glass, and a plastic. In still another more detailed embodiment, at least one of the first retainer and the second retainer includes a screen and a porous foam.

In yet another more detailed embodiment of the fifth aspect, the first retainer and the second retainer each include the screen and the porous foam, the screen is fabricated from at least one of a metal, a ceramic, stainless steel, a nickel alloy, a cobalt alloy, an iron alloy, copper, aluminum, a glass, and a plastic, and the screen is fabricated from at least one of a metal, a ceramic, stainless steel, a nickel alloy, a cobalt alloy, an iron alloy, copper, aluminum, a glass, and a plastic. In still another more detailed embodiment, the first retainer is removably mounted to the microchannel reactor via at least one of a friction fit and a mechanical fastener. In a further detailed embodiment, the friction fit is achieved by pinching the first retainer within a joint. In still a further detailed embodiment, the mechanical fastener comprises a framework overlying the first retainer and a plurality of bolts. In a more detailed embodiment, each of the plurality of bolts is received within a T-shaped channel formed within a support of the microchannel reactor. In a more detailed embodiment, the first retainer and the second retainer are removably mounted to the microchannel reactor via at least one of a friction fit and a mechanical fastener. In another more detailed embodiment, the plurality of reaction microchannels are distributed amongst a plurality of reaction layers, the plurality of heat transfer microchannels are distributed amongst a plurality of coolant layers, a first predetermined number of reaction layers are interposed by a second predetermined number of coolant layers to comprise a sub-stack, and where the sub-stack includes a pair of end plates interposed by the reaction layers and coolant layers. In yet another more detailed embodiment, a plurality of sub-stacks are placed adjacent one another and mounted to each other to comprise a core, the core includes a top surface and a bottom surface angled ninety degrees with respect to each of four sides comprising a reactant entrance side, a product exit side, a coolant inlet side, and a coolant outlet side, and the core includes a plurality of vertical flanges mounted thereto, the plurality of vertical flanges cooperating to form a reactant entrance halo on the reactant entrance side, a product exit halo on the product exit side, a coolant inlet halo on the coolant inlet side, and a coolant outlet halo on the coolant outlet side.

In a more detailed embodiment of the fifth aspect, the reactant entrance halo is mounted to a first arcuate plate, the product exit halo is mounted to a second arcuate plate, the coolant entrance halo is mounted to a third arcuate plate, the coolant exit halo is mounted to a fourth arcuate plate, and the first, second, third, and fourth plates cooperate to circumferentially enclose the stacked structure. In yet another more detailed embodiment, the first arcuate plate includes a reactant entrance orifice, the second arcuate plate includes a product exit orifice, the third arcuate plate includes a coolant entrance orifice, the fourth arcuate plate includes a coolant exit orifice, the first and second plates are opposite each other, the third and fourth plates are opposite each other, the third and fourth plates adjoin the first plate, and the third and fourth plates adjoin the second plate. In a further detailed embodiment, the reactant entrance orifice is in fluid communication with the plurality of microchannels, but not in fluid communication with the plurality of coolant microchannels, and the coolant entrance orifice is in fluid communication with the plurality of coolant microchannels, but not in fluid communication with the plurality of microchannels. In still a further detailed embodiment, at least one of the first and second plates includes a manway. In a more detailed embodiment, both of the first and second plates includes a manway.

It is a sixth aspect of the present invention to provide a microchannel reactor comprising: (a) a plurality of reaction microchannels having catalyst contained therein, each of the plurality of reaction microchannels having an entrance that is aligned along a reactant entrance side and each of the plurality of reaction microchannels having an exit that is aligned along a product exit side; and, (b) a plurality of heat transfer microchannels in thermal communication with the plurality of reaction microchannels, each of the plurality of heat transfer microchannels having an entrance that is aligned along a coolant entrance side and each of the plurality of heat transfer microchannels having an exit that is aligned along a coolant exit side, where the reactant entrance side is angled at least forty-five degrees from the product exit side, and the coolant inlet side is angled at least forty-five degrees from the coolant outlet side.

In a more detailed embodiment of the sixth aspect, the reactant entrance side includes a first cover to distribute fluid flow into the entrance of each of the plurality of reaction microchannels, the product exit side includes a second cover to consolidate fluid flow coming out of the exit of each of the plurality of reaction microchannels, the coolant entrance side includes a third cover to distribute fluid flow into the entrance of each of the plurality of coolant microchannels, the coolant exit side includes a fourth cover to consolidate fluid flow coming out of the exit of each of the plurality of coolant microchannels, and the first cover, the second cover, the third cover, and the fourth cover are mounted to one another to comprise a pressure vessel containing the plurality of reaction microchannels and the plurality of coolant microchannels. In yet another more detailed embodiment, at least two of the plurality of reactant microchannels is interposed by at least one of the plurality of coolant microchannels. In a further detailed embodiment, the plurality of reactant microchannels are divided into a plurality of discrete reactant layers having multiple reactant microchannels extending parallel to one another, the plurality of coolant microchannels are divided into a plurality of discrete coolant layers having multiple coolant microchannels extending parallel to one another, and a stacked structure is formed by stacking in an alternating pattern one of the discrete reactant layers with one of the discrete coolant layers to have a rectangular horizontal cross-section and a rectangular vertical cross-section. In still a further detailed embodiment, the stacked structure includes four sides comprising the reactant entrance side, the product exit side, the coolant inlet side, and the coolant outlet side, the reactant entrance side is angled at least ninety degrees from the product exit side, and the coolant inlet side is angled at least ninety degrees from the coolant outlet side. In a more detailed embodiment, the stacked structure includes a top surface and a bottom surface angled ninety degrees with respect to each of the four sides, and the stacked structure includes a plurality of vertical flanges mounted thereto, the plurality of vertical flanges cooperating to form a reactant entrance halo on the reactant entrance side, a product exit halo on the product exit side, a coolant inlet halo on the coolant inlet side, and a coolant outlet halo on the coolant outlet side. In a more detailed embodiment, the reactant entrance halo is mounted to a first arcuate plate, the product exit halo is mounted to a second arcuate plate, the coolant entrance halo is mounted to a third arcuate plate, the coolant exit halo is mounted to a fourth arcuate plate, and the first, second, third, and fourth plates cooperate to circumferentially enclose the stacked structure. In another more detailed embodiment, the first arcuate plate includes a reactant entrance orifice, the second arcuate plate includes a product exit orifice, the third arcuate plate includes a coolant entrance orifice, the fourth arcuate plate includes a coolant exit orifice, the first and second plates are opposite each other, the third and fourth plates are opposite each other, the third and fourth plates adjoin the first plate, and the third and fourth plates adjoin the second plate. In yet another more detailed embodiment, the reactant entrance orifice is in fluid communication with the plurality of reactant microchannels, but not in fluid communication with the plurality of coolant microchannels, and the coolant entrance orifice is in fluid communication with the plurality of coolant microchannels, but not in fluid communication with the plurality of reactant microchannels. In still another more detailed embodiment, at least one of the first and second plates includes a manway.

In yet another more detailed embodiment of the sixth aspect, both of the first and second plates includes a manway. In still another more detailed embodiment, the microchannel reactor further comprises a first retainer positioned at a first end of the plurality of microchannels to inhibit the particulate catalyst from exiting the reaction microchannels via the first end. In a further detailed embodiment, the microchannel reactor further comprises a second retainer positioned at a second end of the plurality of microchannels, opposite the first end, to inhibit the particulate catalyst from exiting the reaction microchannels via the second end. In still a further detailed embodiment, at least one of the first retainer and the second retainer includes a screen. In a more detailed embodiment, the first retainer and the second retainer each include the screen, and the screen is fabricated from at least one of a metal, a ceramic, stainless steel, a nickel alloy, a cobalt alloy, an iron alloy, copper, aluminum, a glass, and a plastic. In a more detailed embodiment, the first retainer comprises a screen fabricated from at least one of a metal, a ceramic, stainless steel, a nickel alloy, a cobalt alloy, an iron alloy, copper, aluminum, a glass, and a plastic. In another more detailed embodiment, at least one of the first retainer and the second retainer includes a porous foam. In yet another more detailed embodiment, the first retainer and the second retainer each include the porous foam, and the porous foam is fabricated from at least one of a metal, a ceramic, stainless steel, a nickel alloy, a cobalt alloy, an iron alloy, copper, aluminum, a glass, and a plastic.

In yet another more detailed embodiment of the sixth aspect, the first retainer comprises a porous foam fabricated from at least one of a metal, a ceramic, stainless steel, a nickel alloy, a cobalt alloy, an iron alloy, copper, aluminum, a glass, and a plastic. In still another more detailed embodiment, the first retainer includes a porous foam fabricated from at least one of a metal, a ceramic, stainless steel, a nickel alloy, a cobalt alloy, an iron alloy, copper, aluminum, a glass, and a plastic, and the first retainer includes a screen fabricated from at least one of a metal, a ceramic, stainless steel, a nickel alloy, a cobalt alloy, an iron alloy, copper, aluminum, a glass, and a plastic. In a further detailed embodiment, at least one of the first retainer and the second retainer includes a screen and a porous foam. In still a further detailed embodiment, the first retainer and the second retainer each include the screen and the porous foam, the screen is fabricated from at least one of a metal, a ceramic, stainless steel, a nickel alloy, a cobalt alloy, an iron alloy, copper, aluminum, a glass, and a plastic, and the porous foam is fabricated from at least one of a metal, a ceramic, stainless steel, a nickel alloy, a cobalt alloy, an iron alloy, copper, aluminum, a glass, and a plastic. In a more detailed embodiment, the first retainer is removably mounted to the microchannel reactor via at least one of a friction fit and a mechanical fastener. In a more detailed embodiment, the friction fit is achieved by pinching the first retainer within a joint. In another more detailed embodiment, the mechanical fastener comprises a framework overlying the first retainer and a plurality of bolts. In yet another more detailed embodiment, each of the plurality of bolts is received within a T-shaped channel formed within a support of the microchannel reactor.

It is a seventh aspect of the present invention to provide a microchannel device comprising: (a) a plurality of process microchannels distributed circumferentially around a longitudinal axis, at least a portion of the reaction microchannels partially defined by a process layer having a cross sectional area that increases as a distance from the longitudinal axis increases; and, (b) a plurality of heat transfer microchannels circumferentially distributed around the longitudinal axis and in thermal communication with the plurality of reaction microchannels.

In a more detailed embodiment of the seventh aspect, the process layer comprises a waveform having a thickness that increases as the distance from the longitudinal axis increases to increase the cross sectional area. In yet another more detailed embodiment, the microchannel device has a circular horizontal cross-section. In a further detailed embodiment, the process layer comprises a waveform having an amplitude that increases as the distance from the longitudinal axis increases to increase the cross sectional area. In still a further detailed embodiment, the plurality of heat transfer microchannels are divided into discrete radial heat transfer wedges, and the plurality of process microchannels are divided into discrete radial process wedges. In a more detailed embodiment, the discrete process reaction wedges have process microchannels that extend parallel to the longitudinal axis, a horizontal cross-sectional area of the process microchannels increases as the distance from the longitudinal axis increases, the discrete radial heat transfer wedges have heat transfer microchannels that extend perpendicular to the longitudinal axis, and a vertical cross-sectional area of the heat transfer microchannels increases as the distance from the longitudinal axis increases. In a more detailed embodiment, the discrete radial process wedges circumferentially alternate with the discrete radial heat transfer wedges. In another more detailed embodiment, the discrete radial process wedges have reaction microchannels that extend parallel to the longitudinal axis, a horizontal cross-sectional area of the process microchannels increases as the distance from the longitudinal axis increases, the discrete radial heat transfer wedges have heat transfer microchannels that extend parallel to the longitudinal axis, and where a horizontal cross-sectional area of the heat transfer microchannels increases as the distance from the longitudinal axis increases. In yet another more detailed embodiment, the discrete radial process wedges circumferentially alternate with the discrete radial heat transfer wedges. In still another more detailed embodiment, the waveform includes a constant overall length, and the waveform includes a constant overall width.

In yet another more detailed embodiment of the seventh aspect, the microchannel device further includes a first process manifold having a ring shape that is in fluid communication with the plurality of process microchannels. In still another more detailed embodiment, the microchannel device further includes a second reaction manifold having a ring shape that is in fluid communication with the plurality of process microchannels, where the plurality of process microchannels interpose the first process manifold and the second process manifold. In a further detailed embodiment, the microchannel device further includes a first heat transfer manifold having a ring shape that is in fluid communication with the plurality of heat transfer microchannels, and a second reaction manifold having a cylindrical shape that is in fluid communication with the plurality of heat transfer microchannels, where the plurality of heat transfer microchannels interpose the first heat transfer manifold and the heat transfer reaction manifold. In still a further detailed embodiment, the plurality of process microchannels comprises reactant microchannels housing catalyst therein. In a more detailed embodiment, the plurality of process microchannels comprises separation microchannels operative to separate a first component from a second component.

It is an eighth aspect of the present invention to provide a method of conducting a reaction comprising passing a composition into an inlet of a plurality of microchannels that are in parallel to one another, and through the plurality of microchannels, and out through an outlet, wherein the plurality of microchannels is defined at least in part by a waveform, where a local contact time is constant along the length of the plurality of microchannels, and where the local contact time perpendicular to the plurality of microchannels is different.

In a more detailed embodiment of the eighth aspect, a cross-sectional area increases across of the plurality of reaction microchannels.

It is a ninth aspect of the present invention to provide a method for chemically reacting a composition in the presence of a catalyst, comprising passing the composition to flow in a direction through a plurality of reaction microchannel containing the catalyst, the plurality of reaction microchannels oriented in parallel to one another and at least partially defined by a waveform, where a local contact time is constant along the length of the plurality of reaction microchannels, and where the local contact time perpendicular to the plurality of microchannels is different.

In a more detailed embodiment of the ninth aspect, the catalyst flows into the plurality of reaction microchannels as at least one of a slurry, a liquid, and a dissolved catalyst in a reactant stream. In yet another more detailed embodiment, the waveform is substantially filled with a solid, fixed bed catalyst. In a further detailed embodiment, the method is selected from the group consisting of: acetylation, addition reactions, alkylation, dealkylation, hydrodealkylation, reductive alkylation, amination, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, oxidation, partial oxidation, polymerization, reduction, reformation, reverse water gas shift, sulfonation, telomerization, transesterification, trimerization, and water gas shift.

It is a tenth aspect of the present invention to provide a process unit comprising a plurality of process microchannels having an inlet and an outlet, the plurality of process microchannels is defined at least in part by a waveform, wherein a local contact time is constant along the length of the plurality of micro channels, and where the local contact time perpendicular to the plurality of microchannels is different.

In a more detailed embodiment of the tenth aspect, the process unit has been made by laminating sheets. In yet another more detailed embodiment, the plurality of process microchannels comprise a plurality of reaction microchannels housing a catalyst therein, and the catalyst comprises a porous material extending between channel walls of the plurality of reaction microchannels. In a further detailed embodiment, the plurality of process microchannels comprise a plurality of reaction microchannels housing a catalyst therein, and the catalyst comprises a porous material that touches at least one wall of the plurality of reaction microchannels and leaves an open space that extends throughout the length of at least one of the plurality of reaction microchannels. In still a further detailed embodiment, the plurality of process microchannels comprise a plurality of reaction microchannels housing a catalyst therein, and the plurality of reaction microchannels include microchannel walls and the catalyst comprises a catalyst coating disposed on the microchannel walls. In a more detailed embodiment, the plurality of process microchannels comprise a plurality of reaction microchannels housing a catalyst therein, and at least a portion of the plurality of reaction microchannels is adjacent to a heat exchanger. In a more detailed embodiment, the plurality of process microchannels comprise a plurality of reaction microchannels housing a catalyst therein, and at least a portion of the plurality of reaction microchannels is adjacent to a plurality of heat exchange microchannels.

It is an eleventh aspect of the present invention to provide a method of increasing packing density of particulates loaded into a plurality of microchannels in microchannel apparatus, comprising: (a) providing a microchannel apparatus comprising a plurality of microchannels having particulates contained therein; (b) mounting a portable, compact ultrasonic device to a microchannel apparatus, the portable, compact ultrasonic device configured to be repositionable between a first position where the portable, compact ultrasonic device is in acoustic communication with the plurality of microchannels and a second position where the portable, compact ultrasonic device is not in acoustic communication with the plurality of microchannels; and, (c) applying ultrasonic sound to the plurality of microchannels from the portable, compact ultrasonic device to densify the particulates to form a packed bed of particulates within the plurality of microchannels.

In a more detailed embodiment of the eleventh aspect, a sonically conductive material is disposed between the portable, compact ultrasonic device and the plurality of microchannels. In yet another more detailed embodiment, the ultrasonic sound has a frequency of 20 kilohertz to 40 kilohertz. In a further detailed embodiment, at least a portion of the portable, compact ultrasonic device is pressed against the microchannel apparatus with a contact pressure of 200 kilopascals to 280 kilopascals. In still a further detailed embodiment, the ultrasonic sound is applied in bursts of 30 seconds or less. In a more detailed embodiment, the ultrasonic sound is applied in bursts of 10 seconds or less. In a more detailed embodiment, the ultrasonic sound is applied in bursts of 3 seconds or less. In another more detailed embodiment, each microchannel in the plurality of microchannels has a length of at least 10 cm and at least one dimension of 2 mm or less. In yet another more detailed embodiment, the microchannel apparatus comprises at least 1000 microchannels and wherein the portable, compact ultrasonic device extends over no more than 500 of the at least 1000 microchannels. In still another more detailed embodiment, the microchannel apparatus comprises an insert that extends down the length of at least one of the plurality of microchannels, and the insert transmits sound down the length of the at least one of the plurality of microchannels.

In yet another more detailed embodiment of the eleventh aspect, the microchannel apparatus comprises channels at least partly defined by walls of a wave-shaped insert. In still another more detailed embodiment, the microchannel apparatus comprises a plurality of inserts that extends down the plurality of microchannels, and the plurality of inserts transmit sound down the length of plurality of microchannels. In a further detailed embodiment, the step of applying ultrasonic energy is conducted while the plurality of microchannels are dry. In still a further detailed embodiment, the plurality of microchannels comprise a plurality of reactant microchannels and the particulates comprise catalyst contained with the plurality of reactant microchannels. In a more detailed embodiment, the plurality of reactant microchannels comprise at least 100 microchannels. In a more detailed embodiment, the method further includes adding particulates into the plurality of reactant microchannels, and passing a gas through the channels to fluidize the particulate and allowing the particulate to fill the microchannels. In another more detailed embodiment, the packed bed includes a void fraction of 0.50 or less. In yet another more detailed embodiment, a pack density of any subset of the plurality of microchannels varies by less than 10 percent.

DETAILED DESCRIPTION

Figure 1:
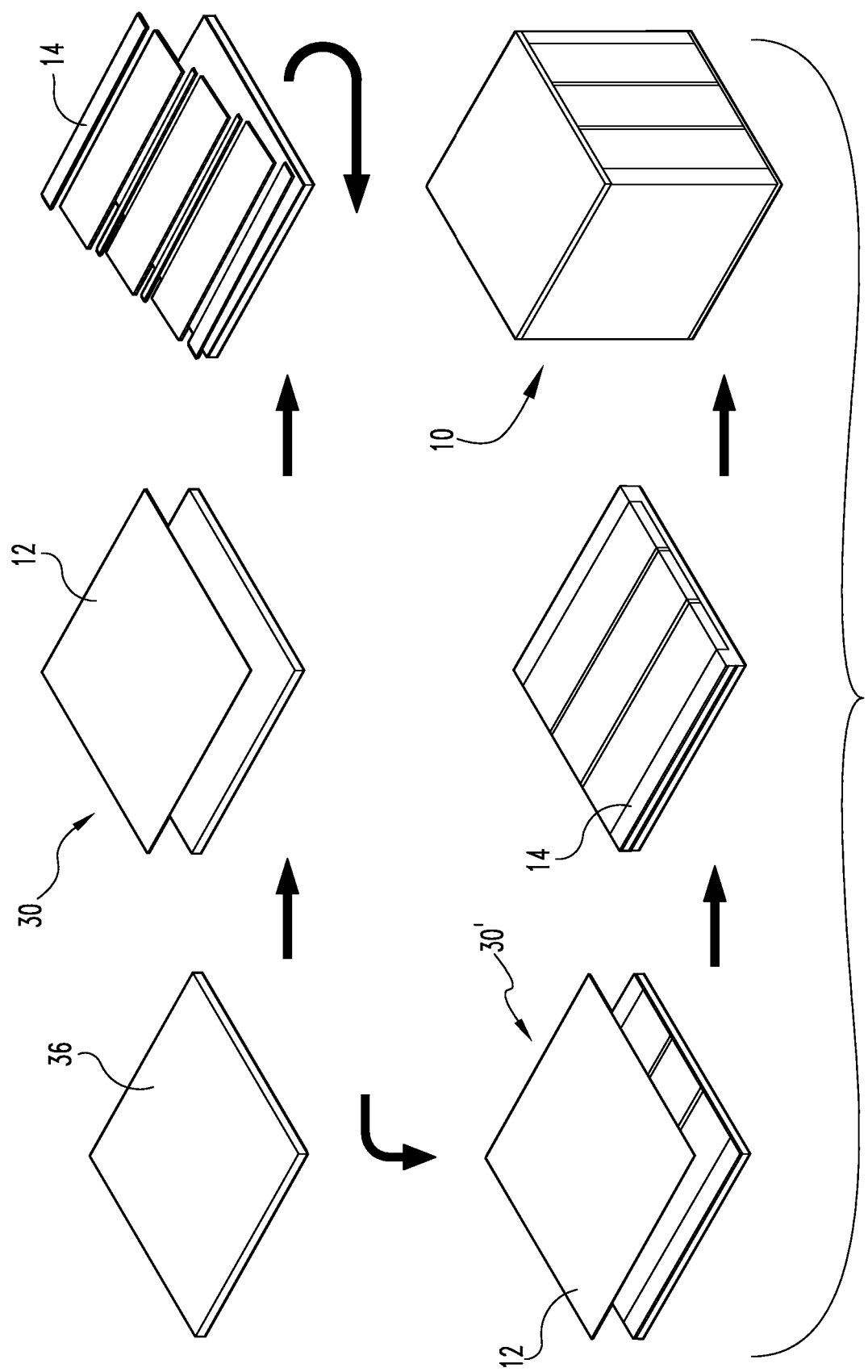
FIG. 1 is a process sequence illustration showing various steps of fabricating a microchannel module.
Figure 2:
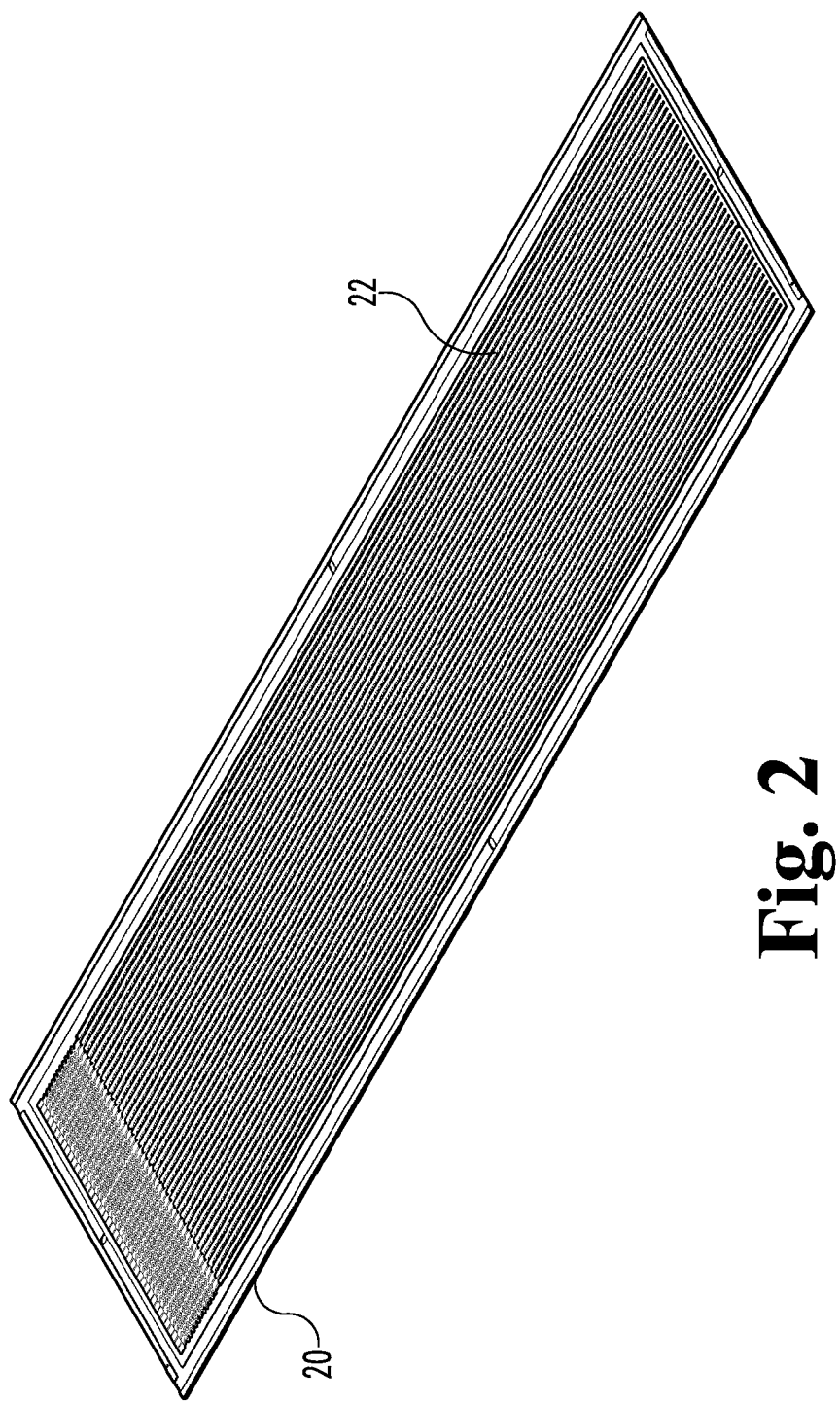
FIG. 2 is an elevated perspective view of an exemplary shim part of an exemplary microchannel coolant subassembly for incorporation into the microchannel module of FIG. 1.
Figure 3:
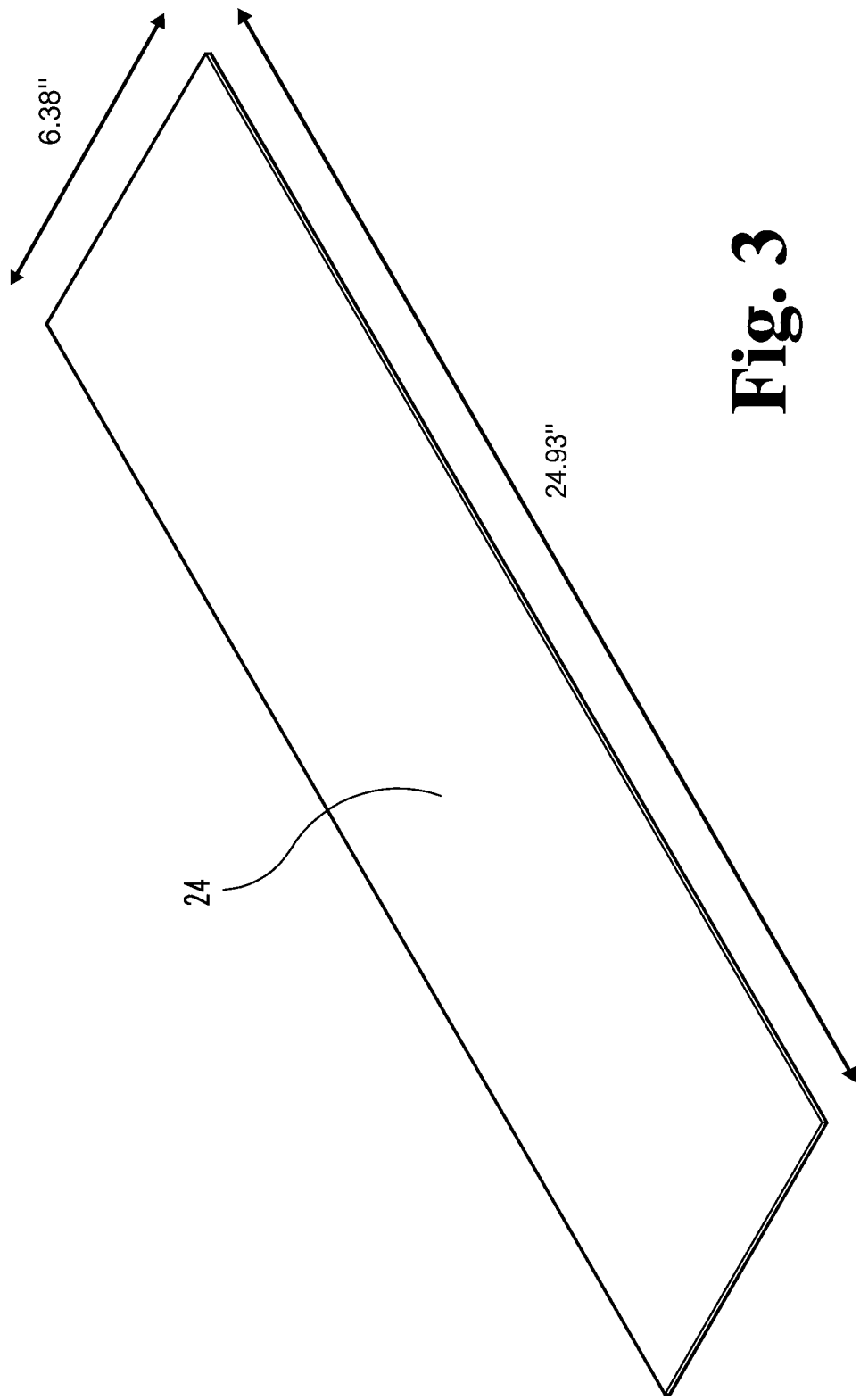
FIG. 3 is an elevated perspective view of an exemplary top plate of an exemplary microchannel coolant subassembly for incorporation into the microchannel module of FIG. 1.
Figure 4:
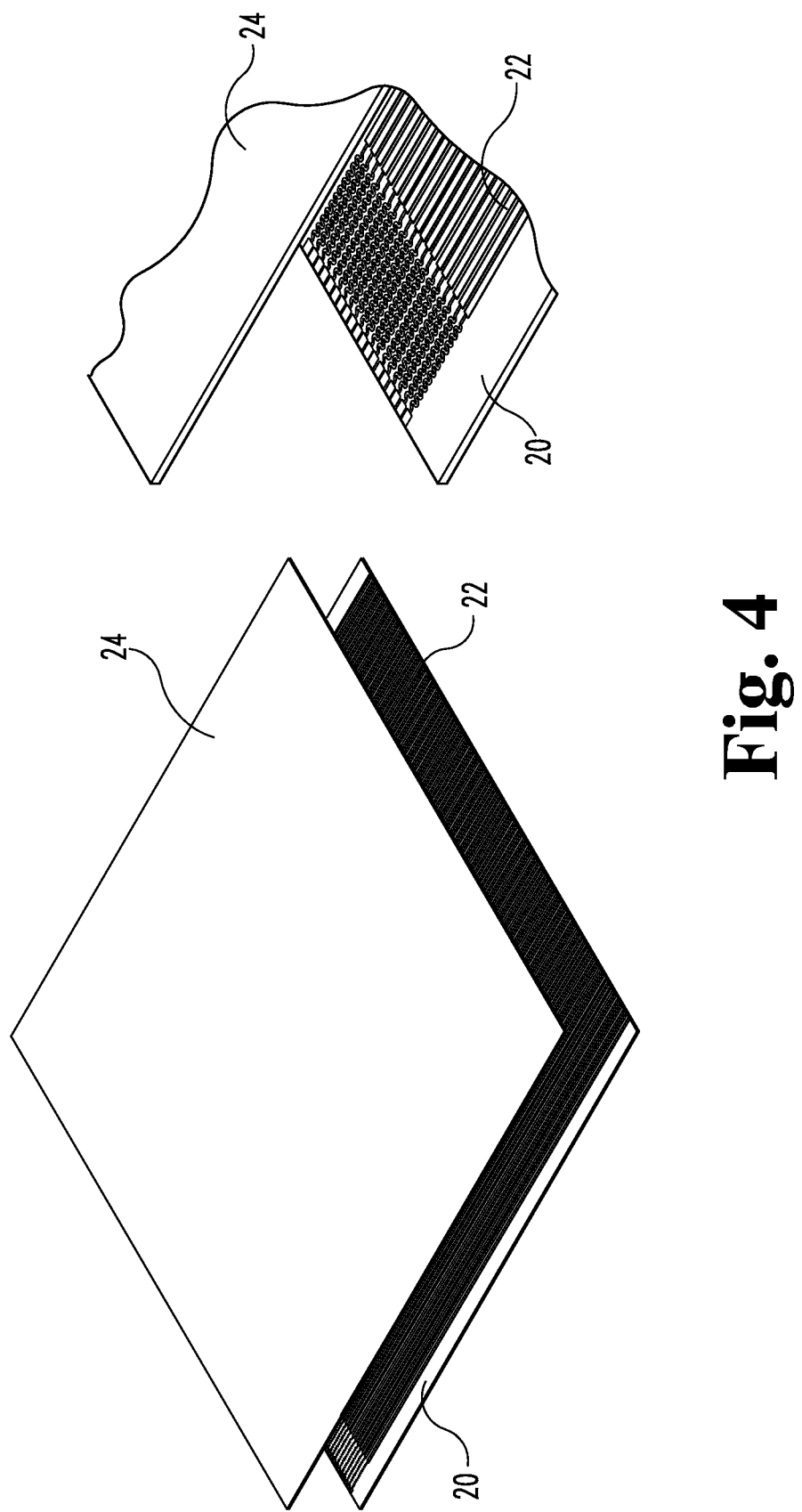
FIG. 4 is an exploded view of an exemplary microchannel coolant subassembly showing the orientation of the top plate of FIG. 3 with respect to the shim of FIG. 2.

It should be understood that the following detailed description of embodiments of the present invention are exemplary in nature and are not intended to constitute limitations upon the present invention. It is also to be understood that variations of the exemplary embodiments contemplated by one of ordinary skill in the art shall concurrently fall within the scope and spirit of the invention.

The catalysts described in the following examples may have the advantage of particle sphericity, that is estimated to range from 0.7 to 1 as defined by *Unit Operations of Chemical Engineering*, 4$^{th}$ Edition, McCabe, Smith & Harriot, McGraw-Hill Publishing Company, ©1985, pg 137.

As used herein, a "gap" is the smallest dimension of a microchannel. Typically, in a laminated device, the gap is in the stacking direction (i.e., the height). Where the term "gap" is used, preferred embodiments can be described instead as the height of a microchannel.

Further, as used herein, "portable" refers to anything that is capable of being carried by a human being or is comprised of a relatively few number of components that are themselves able to be carried and assembled by a human being.

As used herein, "compact" refers to anything that is small in size but does not sacrifice function for decreased size.

As used herein, "sonic contact" means that the ultrasonic horn is in direct contact with an apparatus through a solid medium (preferably having a thickness of 0.5 cm or less, more preferably 2 mm or less) that transmits sound.

Also, as used herein, a "microchannel" is a channel having at least one internal dimension (wall-to-wall, not counting catalyst) of 10 mm or less, preferably 5 mm or less, and greater than 1 μm (preferably greater than 10 μm), and in some embodiments 50 to 2000 μm, with 500 to 1500 microns especially preferred when used with a particulate form of catalyst; preferably a microchannel remains within these dimensions for a length of at least 1 cm, preferably at least 20 cm. In some embodiments, in the range of 5 to 100 cm in length, and in some embodiments in the range of 10 to 60 cm. Microchannels are also defined by the presence of at least one inlet that is distinct from at least one outlet. Microchannels are not merely channels through zeolites or mesoporous materials. The length of a microchannel corresponds to the direction of flow through the microchannel. Microchannel height and width are substantially perpendicular to the direction of flow of through the channel. In the case of a laminated device where a microchannel has two major surfaces (for example, surfaces formed by stacked and joined sheets), the height is the distance from major surface to major surface and width is perpendicular to height. In preferred embodiments of this invention, microchannels are straight or substantially straight—meaning that a straight unobstructed line can be drawn through the microchannel ("unobstructed" means prior to particulate loading). Typically, devices comprise multiple microchannels that share a common header and a common footer. Although some devices have a single header and single footer, a microchannel device can have multiple headers and multiple footers. Likewise, a microchannel may comprise a simple, straight channel or have more complex geometries.

In some apparatus, process channels contain catalyst, sorbents, or heat transfer materials. In exemplary form, the catalyst, sorbents, or heat transfer materials may be in particular form and have a maximum average particle size of 5 mm or less, in some other exemplary embodiments even smaller maximum particle size on the order of 2 mm or less. Some preferred embodiments include solid materials in a particulate form which have an average particle size 0.1 to 10% of the smallest dimension of the microchannel; some catalysts may have an average particle size of 50 micrometers to 1,000 micrometers, or more preferably 100 micrometers to 500 micrometers. The particles may be spherical or have an irregular shape. Catalysts, sorbents, or heat transfer materials may also be coated on microchannel walls or coated on supports, which may be inserted into the microchannel before, during, or after forming the laminated device.

Heat exchange fluids may flow through heat transfer channels (such as, without limitation, microchannels) adjacent to process channels (such as, without limitation, reaction microchannels), and may be gases or liquids and may include steam, liquid metals, or any other heat exchange fluids. It is also within the scope of this disclosure to optimize the system to include a phase change of the heat exchange fluid. In some further exemplary embodiments, multiple heat exchange layers are interleaved with multiple reaction microchannels. For example, ten or more heat exchange layers may be interleaved with ten or more reaction layers. More specifically, ten or more heat exchange microchannels may be interleaved with ten or more microchannel reaction layers. By way of example, and not limitation, there may be "n" heat exchange layers interleaved with "m" reaction layers, where "n" and "m" are variable integers. One or more of these "n" heat exchange layers may include a heat transfer microchannel layer or section of heat transfer microchannels, while one or more of the "m" reaction layers may include a reaction microchannel layer or section of reaction microchannels.

As used herein, "weld" or "welding" refers to a process of a joining together two or more metal pieces, whether or not one uses a fusible metal material that is liquefied proximate a joint of two or more metal pieces and thereafter solidified to unite the two or more metal pieces. An example of welding that does not use a fusible material is laser welding, where the laser liquefies one or more of the metal pieces themselves to form a single fused joint.

As used herein, "bonding" refers to a heating process used for joining pieces in which there is diffusion of elements from one piece to another resulting in a joined article with diffused elements near the interface (or near what used to be the interface before bonding). In contrast, "brazing" refers to a process where an interlayer material is sandwiched between two or more pieces and melted to contact all exposed surfaces between the two or more pieces to join the pieces at each area in contact with the molten interlayer material.

For purposes of this disclosure, "joining" includes welding, bonding, adhesives, brazing and any other process that unites two or more pieces.

As used herein, "unit operation" refers to any chemical reaction, vaporization, compression, chemical separation, distillation, condensation, mixing, heating, or cooling process. A "unit operation" does not encompass, by itself, fluid transport or mixing. But a "unit operation" may make use of fluid transport and/or mixing.

For purposes of this disclosure, a "microchannel reactor" refers to any "microchannel" having occurring therein at least one chemical reaction. The boundary of a microchannel reactor may be comprised of, without limitation, stainless steel, a Ni-, Co- or Fe-based superalloy such as FeCrAlY, Inconel®, copper, aluminum, glass, ceramics, or plastics. The process layers of the microchannel reactor may be made of a dissimilar material from the heat exchange channels, and in one preferred embodiment the process layers are made from copper, aluminum or other material with a thermal conductivity greater than 30 W/m-K. The choice of material for the boundary of the microchannel reactor may depend on the reaction for which the reactor is intended.

Referencing FIG. 1, an exemplary microchannel module device 10 includes a plurality of microchannel coolant and reaction subassemblies 12, 14 comprising a stack of layers having a plurality of fluid passageways. In exemplary form, more than two layers are joined to create an array of fluid passageways for the same fluid or a plurality of fluid passageways for two or more fluids.

Heat exchange fluids may flow through microchannels of the coolant subassemblies 12 adjacent to process channels (such as reaction microchannels), and can be gases or liquids and may include steam, liquid metals, or any other known heat exchange fluids. It should also be noted that the heat exchange fluid may make use of a phase change to further increase the heat capacity of the heat exchange system. As will be discussed in more detailed hereafter, multiple coolant subassemblies 12 are interleaved with multiple reaction subassemblies 14. For example, ten or more coolant subassemblies 12 may be interleaved with ten or more reaction subassemblies 14. Each of these subassemblies 12,14 may contain simple, straight channels or channels with more complex geometries.

Referencing FIGS. 1-7, an exemplary coolant subassembly 12 comprises a shim or laminae 20 containing preformed channels 22 (the channels may be formed by etching) that is joined with a top plate 24. In exemplary form, the coolant shim 20 comprises a rectangular piece having dimensions of a width of 7.0 inches, a length of 25.5 inches, and a thickness of 0.040 inches. This shim 20 includes a plurality of straight line channels having a depth of 0.020 inches and a width of 0.1 inches that are spaced apart with an intervening rib with a width of 0.035 to 0.045 inches. Further, the substantially straight channels also contain a wavy short section at the front of the channels as shown in U.S. Published Patent Application No. 2007/0246106, Ser. No. 11/738,456, Priority Date Apr. 25, 2006, which is incorporated by reference herein. This lateral spacing between the channels 22 is operative to form a rib 26 between adjacent channels that extends the length of the adjacent channels. In exemplary form, the top plate 24 is also a rectangular piece, but includes dimensions different than that of the coolant shim and is also substantially planar. By way of example, the top plate 24 includes dimension of a width of 6.38 inches, a length of 24.93 inches, and a width of 0.020 inches. After the cooling shim 20 and top plate 24 have been formed, assembly of the coolant subassembly 12 occurs.

Figure 5:
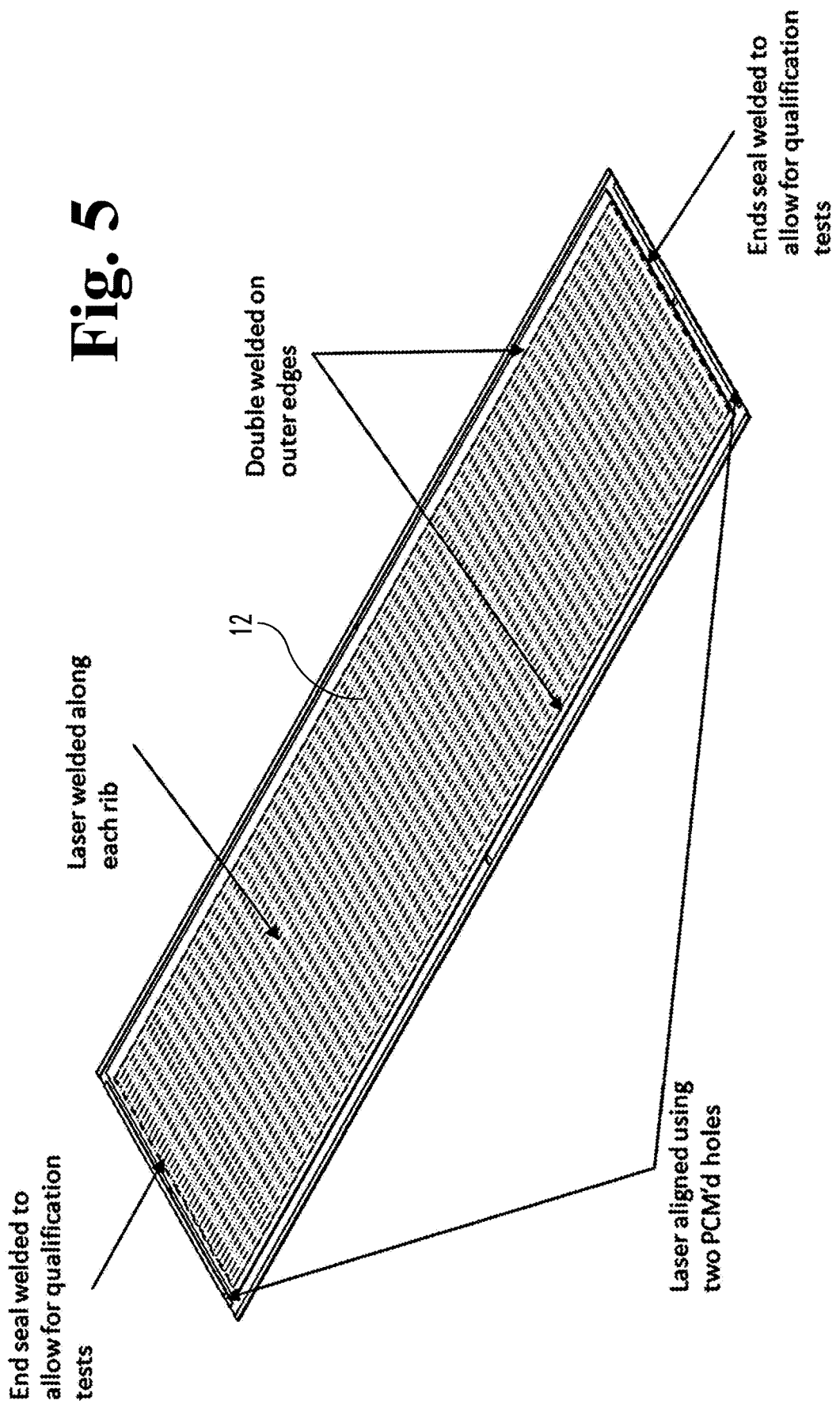
FIG. 5 is an elevated perspective view of an exemplary microchannel coolant subassembly showing the orientation of the top plate of FIG. 3 with respect to the shim of FIG. 2 prior to trimming of the shim.
Figure 6:
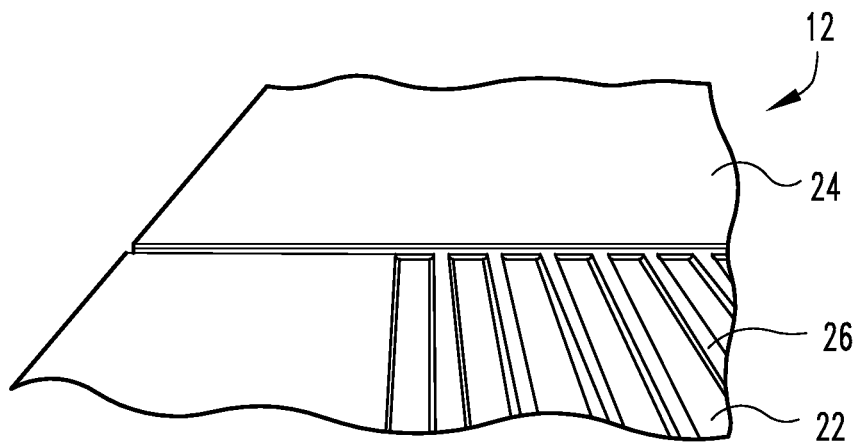
FIG. 6 is a photograph of the structure of FIG. 5 with a portion of the top plate removed to show how the coolant channels are formed by linear welds.
Figure 7:
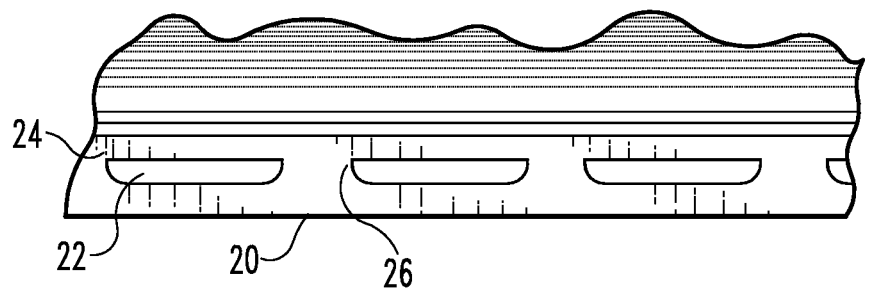
FIG. 7 is a magnified end view of a portion of the structure of FIG. 5 to show the profile of the coolant channels and how the channels are sealed after the top plate is mounted to the shim.

Assembly of the coolant subassembly 12 includes fixing the position of the coolant shim 20 within a holding apparatus (not shown) so the channels 22 of the coolant shim face upward and do not change in orientation during the assembly process. Thereafter, the top plate 24 is lowered over the coolant shim 20 so that the exposed uppermost surfaces of the coolant shim are adjacent the lower surface of the top plate. As shown in FIG. 5, the top plate 24 is aligned with the coolant shim so that each edge of the top plate is inset with respect to an edge of the coolant shim 20. In exemplary form, the medial and lateral sides of the top plate 24 are each inset 0.310 inches from the nearest edge of the coolant shim 20, thereby centering the top plate in the medial-to-lateral direction with respect to the coolant shim. Similarly, the proximal and distal sides of the top plate 24 are each inset 0.285 inches from the nearest edge of the coolant shim 20, thereby centering the top plate in the proximal-to-distal direction with respect to the coolant shim. After alignment, downward pressure is applied to the top plate 24 and a laser welding process is carried out to join the shim 20 and top plate.

Welding of the coolant subassembly requires at least two layers, but could include three, or more layers comprising a series of top plates 24 and shims 20. In exemplary form, a process for fabricating a coolant subassembly 12 with two layers will be described. As described herein, methods for welding a coolant subassembly 12 include, without limitation, laser welding, resistance welding, friction stir welding, ultrasonic welding, and the like. In particular, the utilization of laser welding includes fiber lasers such as Yb fiber lasers. For purposes of explanation only, laser welding will be utilized.

The laser welding process includes forming a lengthwise weld between the top plate 24 and each rib 26 of the coolant shim 20 that extends the entire length of the rib. This welding process operates to create separate coolant channels that extend generally parallel to one another.

The welding process also includes a pair of end laser welds that are formed adjacent the proximal and distal ends of the top plate in order to seal off the respective coolant channels. The edges of the subassembly 12 are substantially hermetically sealed to prevent a fluid from leaking out the sides and maintaining the continuity of flow passage so that somewhere between 95-100% of fluid that enters from an inlet leaves the subassembly from the outlet, rather than leaking out through the sides or other pathways where flow is not intended. In alternate embodiments, there may be more than one inlet and/or outlet that is defined by the laminate geometry. As will be discussed briefly hereafter, these proximal and distal end welds are utilized to fluid test the effectiveness of the laser welds between the top plate 24 and ribs 26. Moreover, as will be discussed in more detail hereafter, these proximal and distal welds are not incorporated into final microchannel module device 10.

In addition to the foregoing welds, the lateral and medial sides each include a pair of laser welds created adjacent the medial and lateral edges of the top plate 24. The welding occurs in regions where, when stacked in a subassembly, metal is in contact between the layers. It is understood that regions comprising a flow channel or a void for fluids to traverse after the device is manufactured may not necessarily be closed. It should be noted that the lateral and medial side welds will be incorporated as part of the final microchannel device. At the end of the welding process, a coolant subassembly 12 has been created, but should be tested and needs to be further processed to create a functional coolant subassembly.

After the welding process is carried out, the welded top plate 24 and coolant shim 20 are subjected to pressure testing to verify the integrity of the welds. Subsequent to validation of the welds, the top plate 24 and coolant shim 20 are processed to arrive at the final coolant subassembly 12. This processing includes trimming the edges of the rough coolant subassembly to arrive at the final coolant subassembly dimension of 6.0 inches wide and 24.0 inches long.

Figure 8:
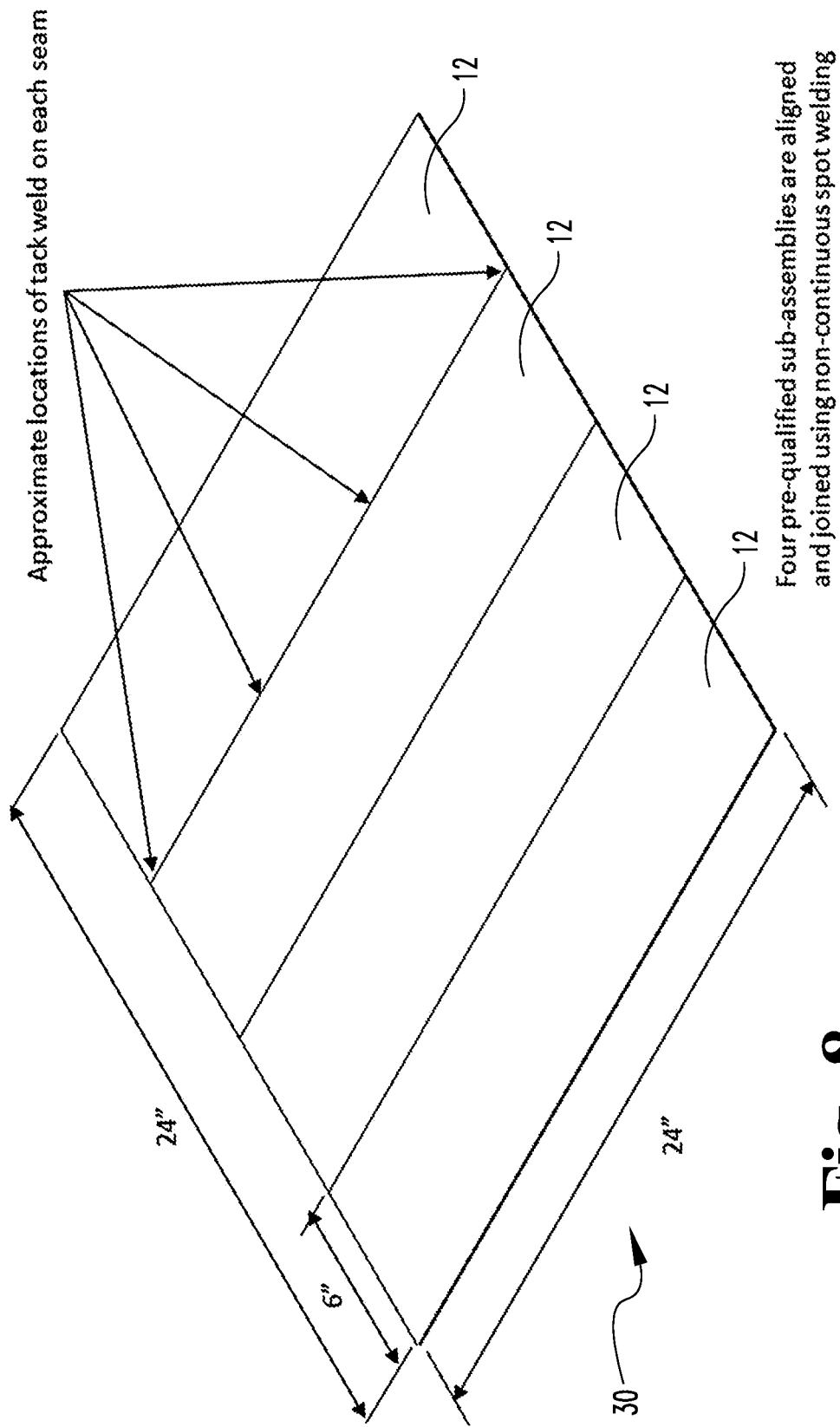
FIG. 8 is an elevated perspective view of an exemplary coolant panel incorporating four microchannel coolant subassemblies.

Referring to FIG. 8, a plurality of final coolant subassemblies 12 are placed side by side (lateral side of one subassembly contacting the lateral side of another subassembly), flat, and vertically aligned to be flush at the proximal and distal ends. In exemplary form, four coolant subassemblies 12 are oriented in this fashion and welded along the seams between adjacent coolant subassemblies in order to join the subassemblies together. The seam weld may be effectuated using various welding techniques including, without limitation, laser welding (including fiber laser welding and pulsed laser welding) and tungsten inert gas (TIG) welding. As will be discussed in more detail below, it is not imperative that the entire seam between adjoining coolant subassemblies 12 be filled. The resulting structure is a square coolant panel 30 having 24.0 inch sides that is ready to be incorporated in a microchannel module device 10.

Referring back to FIG. 1, an exemplary microchannel module device 10 includes a plurality of coolant subassemblies 12 interposing a plurality of microchannel reactor subassemblies 14. In exemplary form, the coolant subassemblies 12 (as part of the coolant panel 30) alternate with layers of microchannel reactor subassemblies 14 to create the fluid passageways inside the microchannel module device 10. An exemplary process and structures used to fabricate the exemplary microchannel module device 10 will now be discussed.

Fabricating the microchannel module device 10 includes utilizing a first endplate 36 as a base upon which to layer successive layers. In exemplary form, the first end plate 36 has final dimensions of 24.0 inches in width, 24.0 inches in length, and 0.25 inches in thickness. Initially, this end plate may have slightly larger dimensions and is trimmed to the final size and includes a series of through orifices extending upon the medial and lateral sides. Upon this end plate 36 is positioned a first coolant panel 30 so the edges of the coolant panel are centered between the edges of the end plate. Upon the first coolant panel 30, on the opposite side of the first end plate, is created one or more microchannel reactor modules 14.

Figure 9:
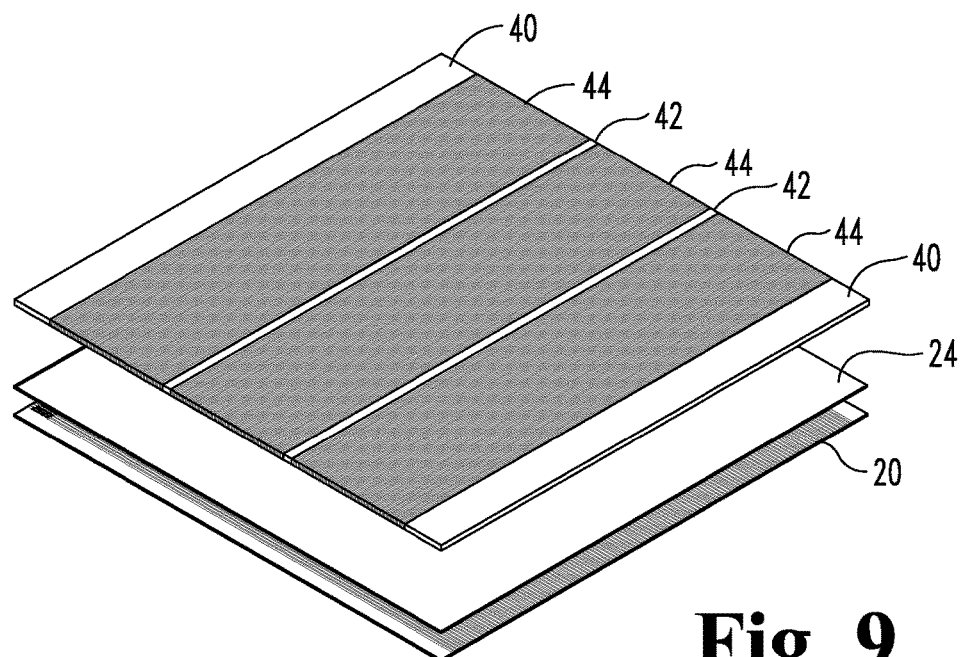
FIG. 9 is an exploded view showing the layering of a portion of the microchannel module of FIG. 1.
Figure 10:
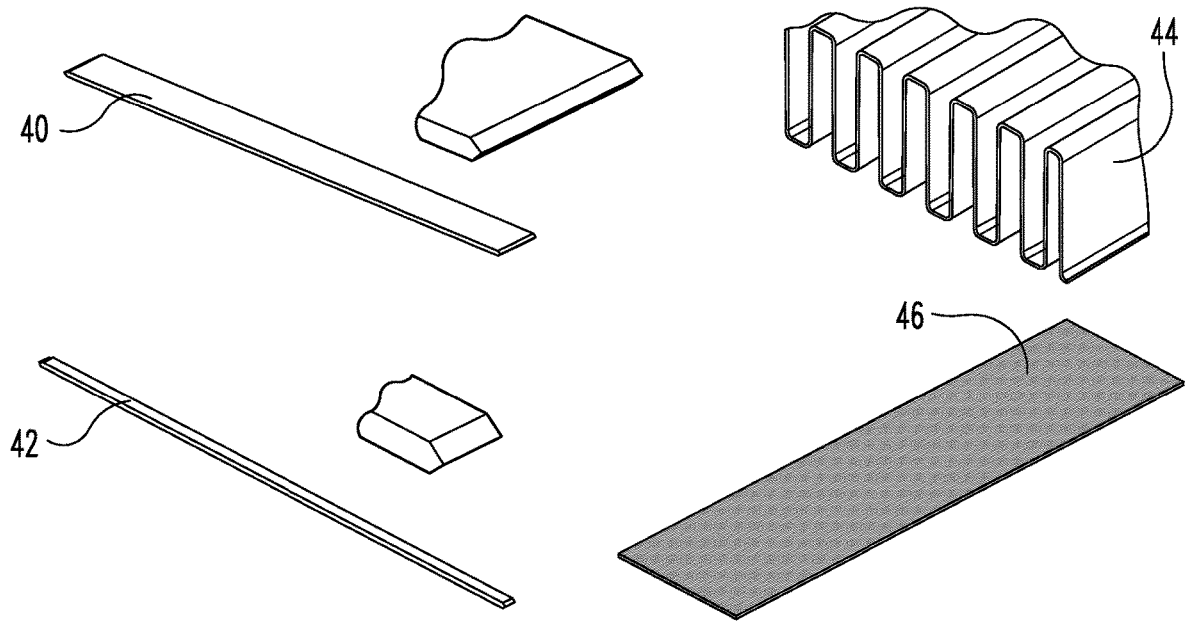
FIG. 10 comprises a series of elevated perspective views of some exemplary components comprising a microchannel reactant subassembly.
Figure 11:
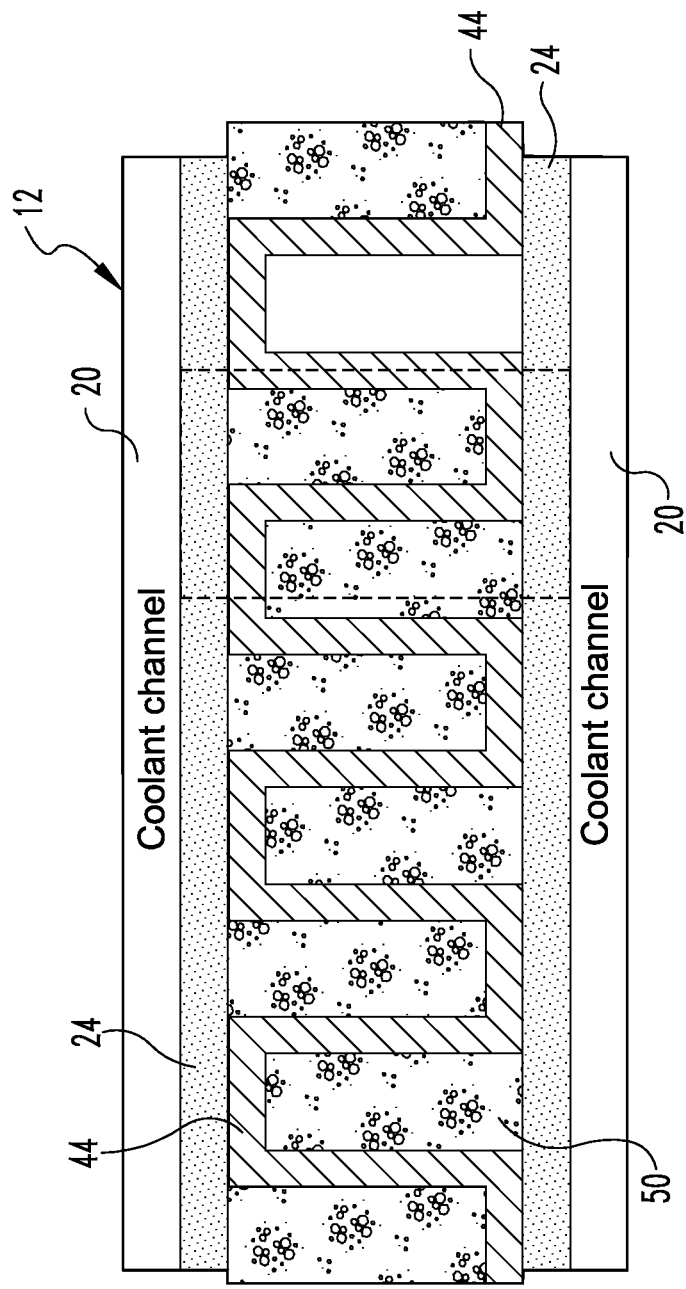
FIG. 11 is an isolated profile view of an exemplary microchannel reactant subassembly sandwiched between adjacent microchannel coolant subassemblies.

Referencing FIGS. 9-11, in exemplary form, a microchannel reactor module 14 includes at least one microchannel reactor within which a chemical reaction occurs. This reaction may occur within the presence of a catalyst, and the catalyst may be layered upon all or a portion of the boundary of the microchannel reactor and/or be in particulate form to be contained within the boundaries of the microchannel reactor. Pursuant to this exemplary embodiment, the microchannel reactor module includes dimensions of 24.0 inches in length and 24.0 inches in width.

For purposes of exemplary explanation only, an exemplary reactor module 14 comprises at least two support strips 40 extending lengthwise along the length of the microchannel reactor. The support strips 40, 42 operate to carry the load of adjoining layers without compromising the shape of the reactor microchannel themselves. By way of example, and not limitation, the reactor module 14 includes an outermost medial and lateral support strips 40 and a pair of interior support strips 42 spaced apart and inset with respect to the outermost support strips. In particular, the outermost support strips 40 have exemplary dimensions of 24.0 inches in length, 0.5 to 3 inches in width (or a narrower range of 1 to 2 inches), and 0.125 to 1 inches in thickness (or a narrower range of 0.25 to 0.5 inches). Similarly, the interior support strips 42 have exemplary dimensions of 24.0 inches in length, 0.25 to 1 inches in width (or even a narrower range of 0.25 to 0.5 inches), and 0.125 to 1 inches in thickness (or even a narrower range of 0.25 to 0.5 inches). These support strips 40, 42 may be formed of any material that provides the requisite structural support for the microchannel apparatus.

Interposing the support strips 40, 42 are one or more waveforms or fin structures 44 partially defining a boundary of the microchannel. By way of example, this exemplary embodiment includes three waveforms 44 per reactor subassembly 14, but it should be noted that one, two, or more than three waveforms may be utilized depending upon the number of support strips utilized. In exemplary form, the reactor subassembly 14 includes, from medial to lateral, a medial support strip 40, a first waveform 44, a first interior support strip 42, a second waveform 44, a second interior support strip 42, a third waveform 44, and a lateral support strip 40. The waveform or fin structure 44 creates channels or chambers that have an aspect ratio (height to width) greater than one, where the height is the distance between two adjacent cooling subassemblies 14 and width is the distance between repeating fins or adjacent legs (wave surfaces) of the waveform. By way of example, and not limitation, the waveform is created from planar foils 46 to have a block U-shaped repeating pattern operative to cooperate with an adjacent cooling subassembly 14 to define the cross-section of the microchannel reactor. Exemplary dimensions for the waveform 44, include without limitation, a length of 24 inches, a width of 3 to 40 inches (or even a narrower range of 6 to 12 inches), and a height of 0.25 to 1 inches (or even a narrower range of 0.25 to 0.5 inches). In this exemplary embodiment, the waveform 44 is fabricated from copper, however any conductive material may be utilized to partially define the microchannel reactor boundaries.

As discussed above, the microchannel reactor may include catalyst 50. The catalyst may be layered upon all or a portion of the boundary of the microchannel reactor and/or be in particulate form to be contained within the boundaries of the microchannel reactor. In this exemplary embodiment, the catalyst is in particulate form and packed within the waveform. Various catalysts may be utilized depending upon the particular reaction(s) desired within the microchannel. For purposes of explanation only, an exemplary Fischer-Tropsch reaction will be discussed as the reaction to be carried out within the microchannel reactors of the microchannel reactor subassembly. To carry out this reaction, the catalyst is formulated with Cobalt and promoters, which may comprise Platinum, and/or Ruthenium and/or Rhenium to drive the Fisher-Tropsch reaction. Those skilled in the art will understand that various catalysts have been developed and are commercially available to drive the Fischer-Tropsch reaction that may be used with the embodiments of the instant disclosure. Following loading of catalyst 50 into the reactor channels of the waveform 44, the catalyst is activated by exposure to hydrogen at an elevated temperature, for example between 300 to 400 C.

Fabrication of the first microchannel reactor module 14 includes positioning the medial and lateral support strips 40 to be substantially flush to a corresponding medial/lateral side of the first coolant panel 30. Thereafter, the support strips 40 are welded in position to the first coolant panel so that the support strips extend parallel to one another and flush along corresponding medial and lateral edges of the coolant panel 30. Likewise, a pair of interior support strips 42 is positioned on top of the first cooling panel 30 to extend in parallel to, but inset with respect to, the medial and lateral support strips 40 and spaced apart from one another and the medial and lateral support strips to define three substantially identical and parallel U-shaped cavities. The interior support strips are thereafter welded to the first coolant panel. It should be noted that the coolant panel 30 was positioned so that the microchannel pathways extended along the medial-to-lateral direction. But the support strips 40, 42 are oriented to extend along the proximal-to-distal direction so that the U-shaped cavities extend perpendicular to the microchannel fluid conduits of the first coolant panel 30. A waveform 44 is positioned within each U-shaped cavity between the supports 40, 42 so that the proximal and distal ends of the waveform are substantially flush with the proximal and distal ends of the first coolant panel 30. At the same time, the waveform has already been created so that is fits in a friction fit arrangement between corresponding supports 40, 42. But is should also be noted that the waveform 44 effectively floats on top of the coolant panel 30 because the waveform is neither welded to the supports 40, 42, nor to the underlying first coolant panel. This waveform insertion finishes fabrication of the components comprising the first reactor subassembly 14.

After the first reactor subassembly has been fabricated, approximately half of the microchannel reactors have completely bounded conduits along their longitudinal length (extending in the proximal-to-distal direction). More specifically, these microchannel reactors have parallel side walls and a top wall formed by the waveform 44, while the bottom wall is formed by the exposed surface of the coolant panel 30. But to finish the remainder of the microchannel reactors (because some of the reactors are missing a top wall), a second coolant panel 30' is positioned over the first reactor subassembly 14. This second coolant panel 30' is fabricated just as the first coolant panel was fabricated. The second coolant panel 30' is laid over the first reactor subassembly 14 so that the microchannels extend perpendicular to the reactor microchannels of the first reactor subassembly. The second coolant panel 30' is aligned so that its medial and lateral edges are substantially flush with the medial and lateral edges of the supports 40, while the proximal and distal edges of the coolant panel are substantially flush with the proximal and distal edges of the supports 40, 42. Thereafter, the process for forming a reactor subassembly 14 is replicated on top of the second coolant panel 30'. This process of placing cooling panels 30 on top of a first reactor subassembly 14 and thereafter constructing a second reactor subassembly on top of the cooling panel is repeated until the microchannel module is completed and the uppermost cooling panel does not have a reaction subassembly fabricated on its uppermost surface. Instead, this uppermost cooling panel is topped with a second endplate 36 to finish the module stacking sequence.

Figure 12:
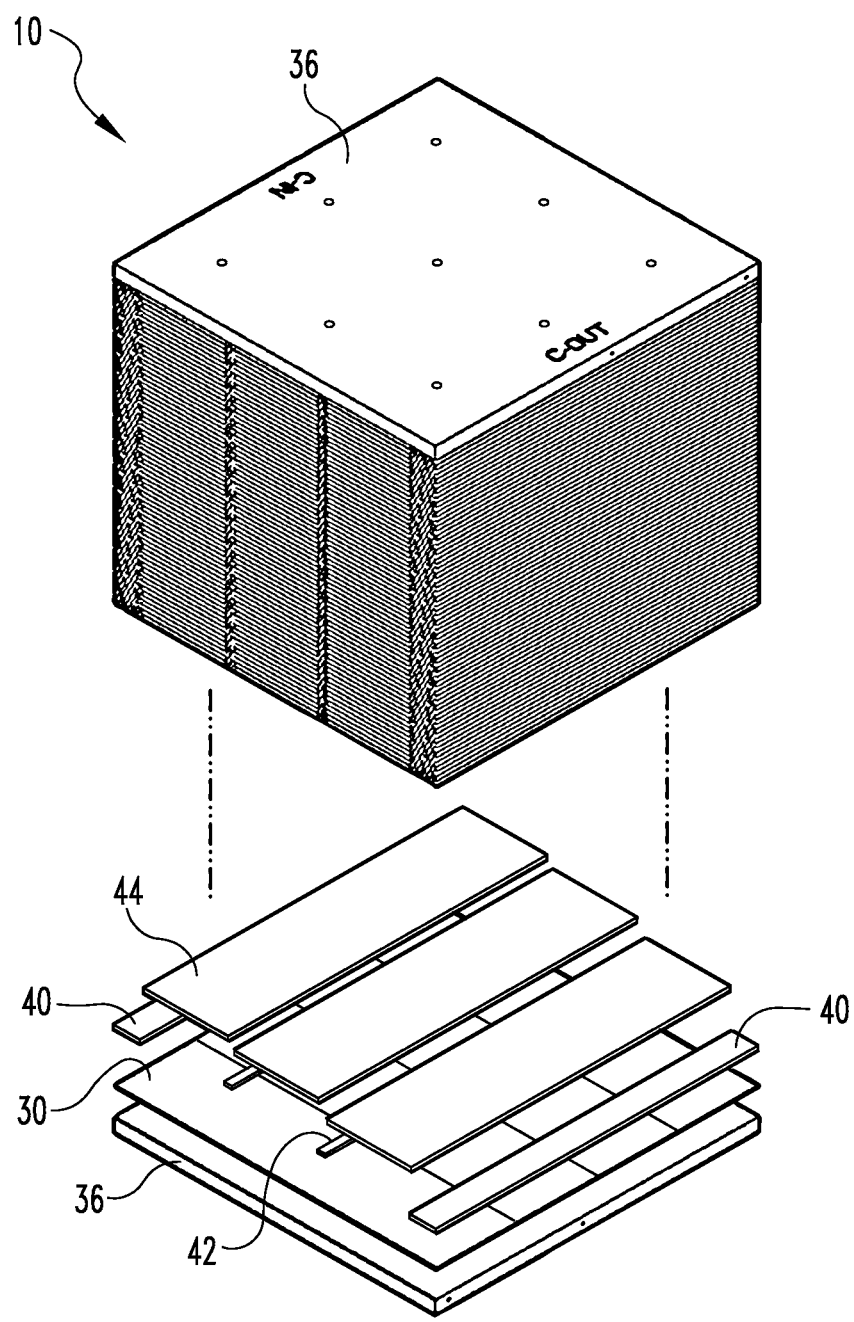
FIG. 12 is a partially exploded view of a microchannel module of FIG. 1.
Figure 13:
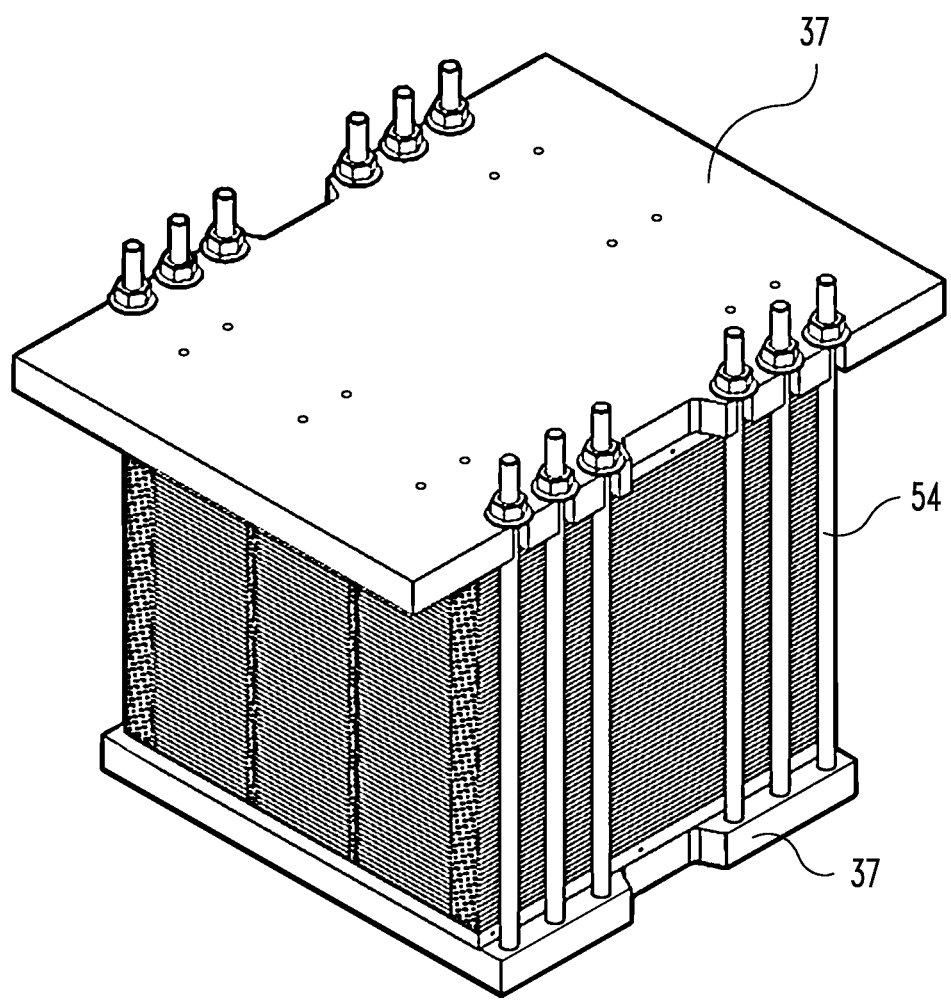
FIG. 13 is an elevated perspective view of a microchannel module undergoing compression prior to welding the components.

Referring to FIGS. 12 and 13, the stack 10 is placed between two clamp plates 37 which include a series of through orifices extending upon the medial and lateral sides to receive fasteners 54. These fasteners 54, in exemplary form, comprise bolts and nuts operative to be tightened to compress the clamp plates 37 toward one another, likewise compressing the cooling plates 30 and reaction subassemblies 14 therebetween. After the appropriate compression is achieved, the proximal and distal ends of the cooling plates 30, reaction subassemblies 14, and endplates 36 are welded together. The fasteners 54 and clamp plates 37 may then be removed to weld the medial and lateral ends of the cooling plates 30, reaction subassemblies 14, and endplates 36 together. The welding may use different types of welding methods including, without limitation, TIG, MIG, laser welding, and electron beam welding. As will be discussed below, this microchannel module 10 and others similarly fabricated may be utilized to create various microchannel unit operations.

Referring to FIGS. 14-24, a first exemplary microchannel unit operation 100 makes use of at least one microchannel module 10 mounted to an exoskeleton operative to direct inputs to the microchannel module and outputs from the microchannel module, as well as provide compression against sealed portions of the microchannel module. For purposes of explanation only, it will be presumed that the microchannel module 10 has been fabricated for use with a Fischer-Tropsch process, although the inventive reactor could be used with other high pressure reactions. Accordingly, the fabrication and discussion of the component parts of the first exemplary microchannel unit operation 100 will be described in terms of a Fischer-Tropsch microchannel unit operation. But those skilled in the art will understand that the following fabrication and integration of a microchannel module 10 may be readily adapted to numerous other processes without significant alteration.

Figure 14:
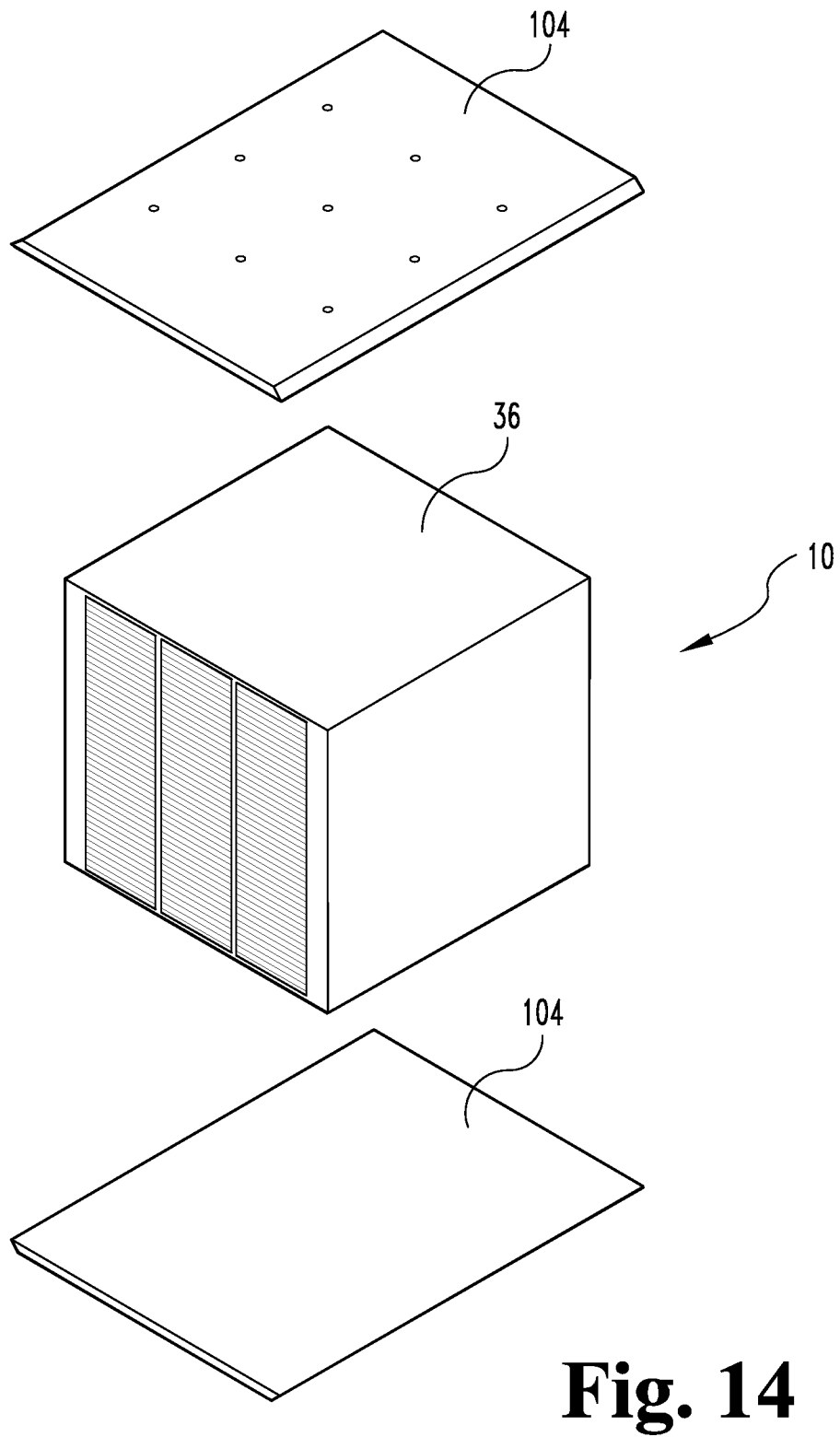
FIG. 14 is an exploded view of the microchannel module of FIG. 1 in addition to plates to be mounted to the module.

Referencing FIG. 14, an exemplary microchannel module 10 is utilized as the core of the Fischer-Tropsch microchannel unit operation 100. This includes fabricating the microchannel unit operation to include at least one microchannel reactor adapted to carry out a Fischer-Tropsch reaction. Consistent with this approach, the top and bottom of the microchannel module 10 include solid endplates 36 to which are mounted respective rectangular plates 104 having generally the same width as the microchannel module, but having a length greater than the microchannel module to overhang the open sides of the microchannel module comprising the microchannel reactors. In other words, the microchannel module 10 includes a plurality of reactor microchannels that are open on opposing sides of the module. It is these open, opposed sides that the plates 104 overhang, as opposed to the open sides of the module 10 that are part of the coolant panels 30. In exemplary form, the plates 104 may be fabricated from stainless steel or other metal and include exemplary dimensions of 33.1 inches in length, 24.6 inches in width, and 0.75 inches in thickness. In this exemplary embodiment, the plates 104 are welded to the endplates 36 of the microchannel module 10 at the outer seams where the plates and endplates come together. Exemplary welds that may be used to secure the plates 104 to the endplates 36 include, without limitation, fillet welds created using any standard welding process (TIG, MIG, laser, etc).

Figure 15:
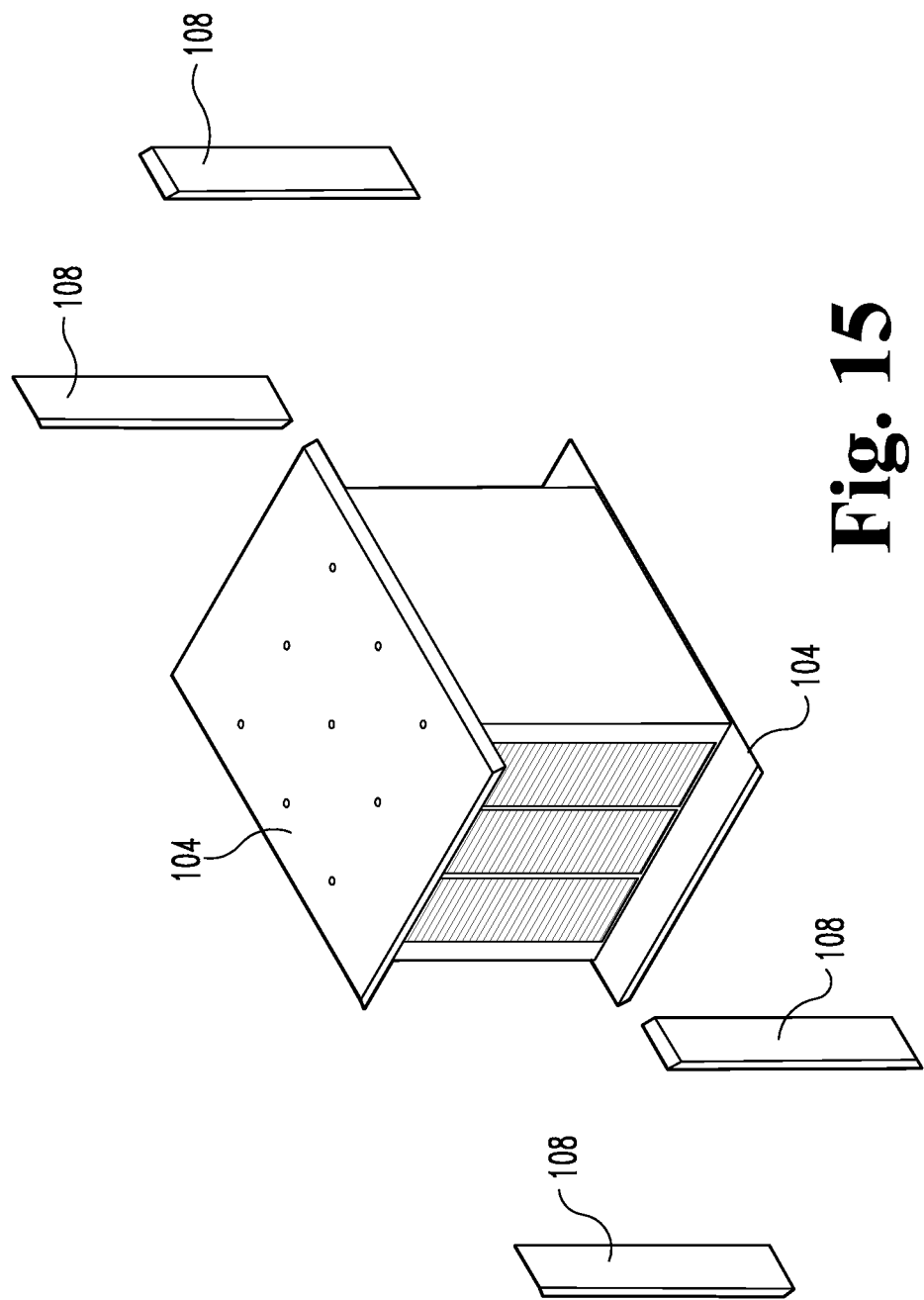
FIG. 15 is an exploded view showing supports that are mounted to the assembly of FIG. 14.

Referring to FIG. 15, after the plates 104 have been mounted to the microchannel module 10, four rectangular supports 108 are mounted to the microchannel module 10 and to the plates. Each of the supports 108 may be fabricated from stainless steel or other metal and include exemplary dimensions of 24 inches in length, 4.5 inches in width, and 0.75 inches in thickness. The supports 108, when coupled to the plates 104 and module 10, provide a series of perpendicular supports extending from the module 10 and the plates. More specifically, each support 108 is mounted to a respective corner of the module 10 and a peripheral side of a respective plate 104 to create an enclosed, rectangular periphery at each side of the module providing a single rectangular opening on each side for egress to and from the microchannel reactors. In this exemplary embodiment, the supports 108 are welded to the plates 104 and corners of the microchannel module 10 at the outer seams where the plates, corners, and supports come together. Exemplary welds that may be used to secure the supports 108 to the plates 104 and corners of the module 10 include, without limitation, full penetration welds created using any standard welding process (TIG, MIG, laser, etc).

Figure 16:
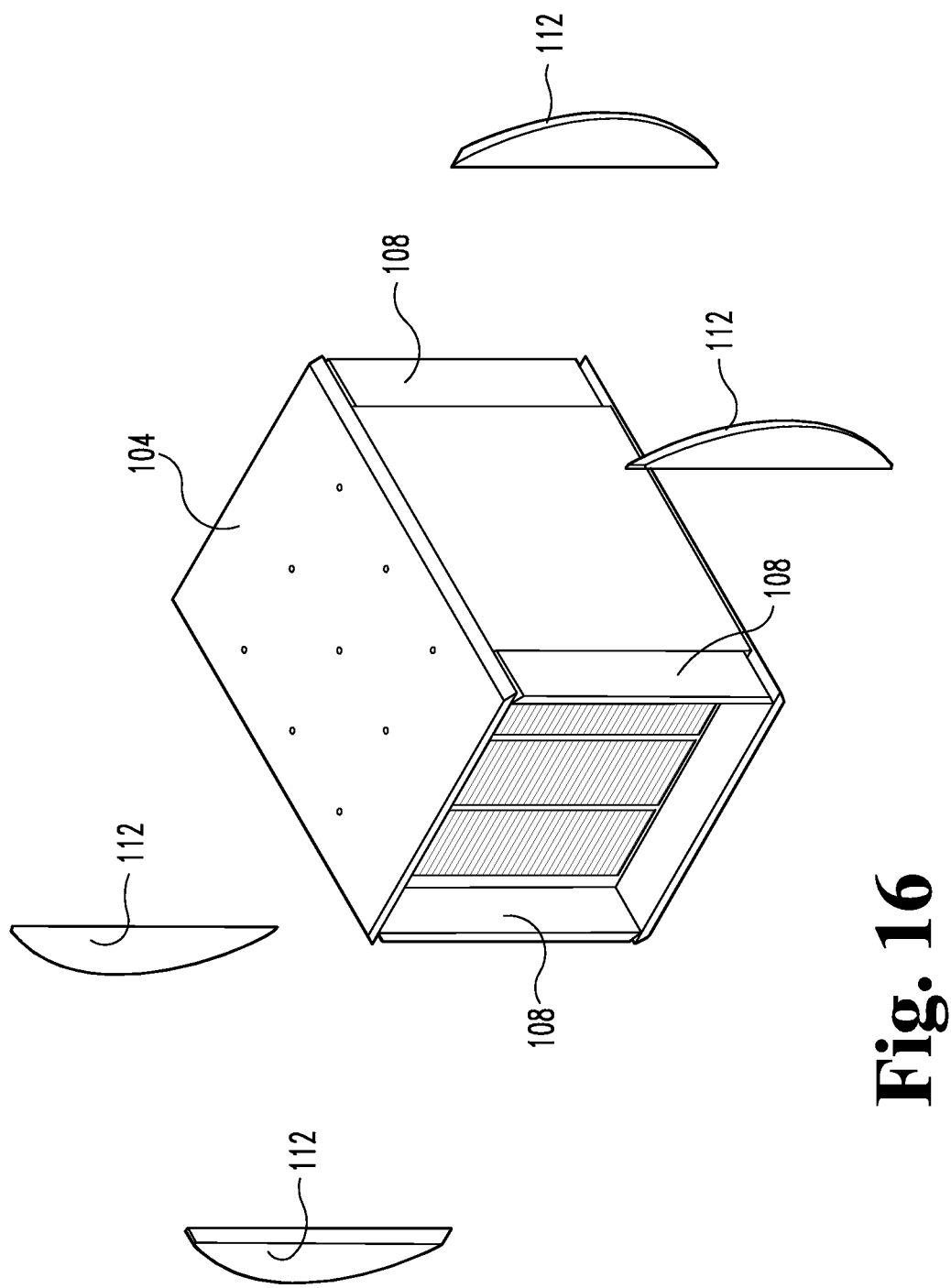
FIG. 16 is an exploded view showing end walls that are mounted to the assembly of FIG. 15.

Referring to FIG. 16, after the supports 108 are mounted to the plates 104 and corners of the module 10, four end walls 112 are mounted to the supports. In exemplary from, each of the end walls 112 includes a linear side that is mounted to a respective support 108 to extend perpendicularly away from the support to partially define what will be respective, single openings on opposite sides of the module 10 for egress to and from the microchannels of the coolant panels 30. The linear side of each end wall is joined by a uniform arcuate side to create a solid wall that resembles a semicircular shape. It should be noted that one may choose to use other shapes for pressure containment, however, a curved shape requires generally less material. In exemplary form, each end wall 112 may be fabricated from stainless steel or other metal and include exemplary dimensions of 24 inches in length along the straight side, 27 inches in length along the arcuate side, and 0.75 inches in thickness. More specifically each end wall 112 is inset approximately 1 inch with respect to a corresponding support 108 and welded to the support along the linear side. The ends where the linear side and arcuate side merge are also welded to the plates 104. Exemplary welds that may be used to secure the end walls 112 to the plates 104 and supports 108 include, without limitation, full penetration welds created using any standard welding process (TIG, MIG, laser, etc). When completed, the end walls 112 on the same side of the module 10 comprise bookends that are generally parallel to one another.

Figure 17:
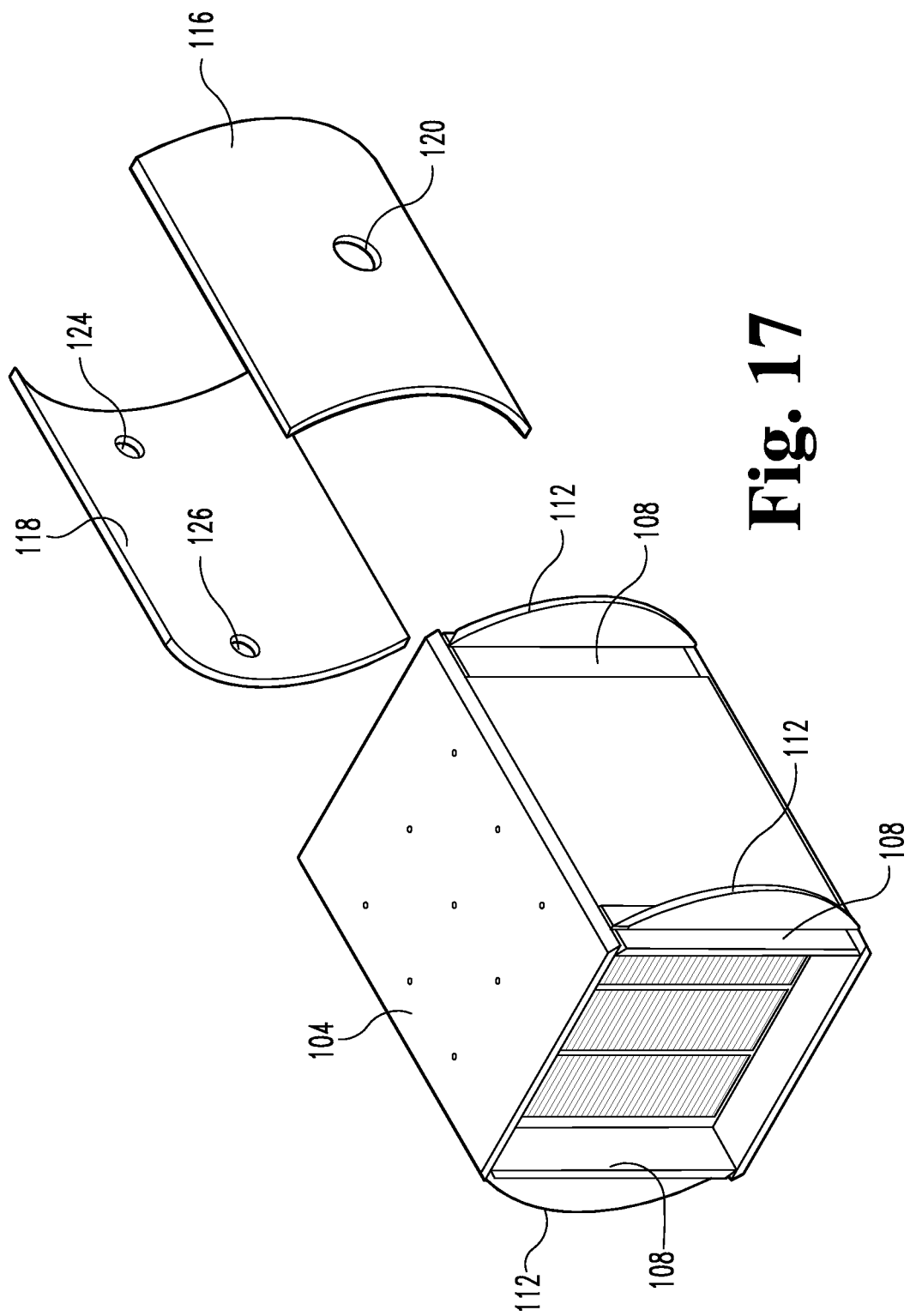
FIG. 17 is an exploded view showing arcuate walls that are mounted to the assembly of FIG. 16.
Figure 18:
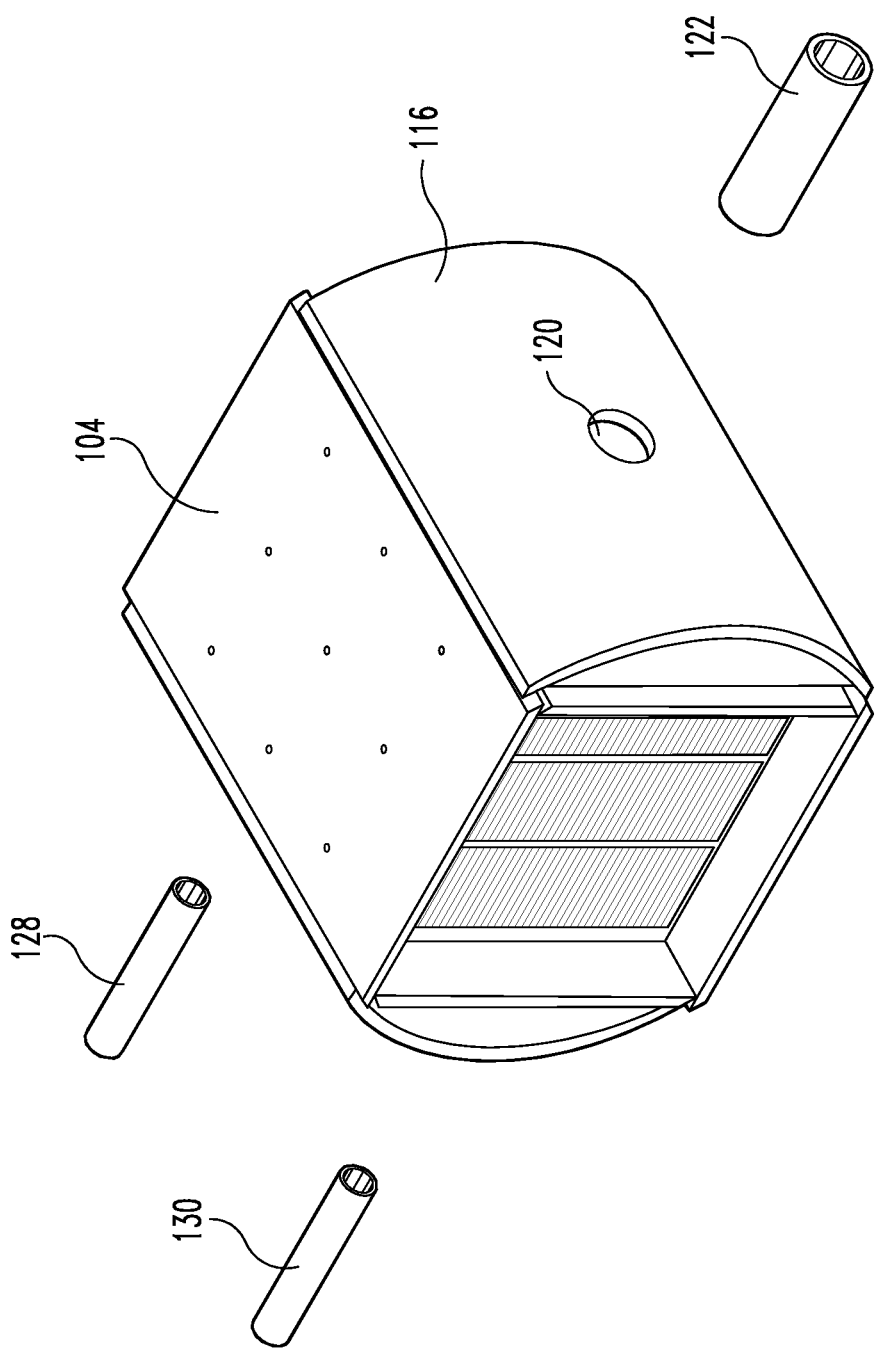
FIG. 18 is an exploded view showing pipes that are mounted to the assembly of FIG. 17.
Figure 19:
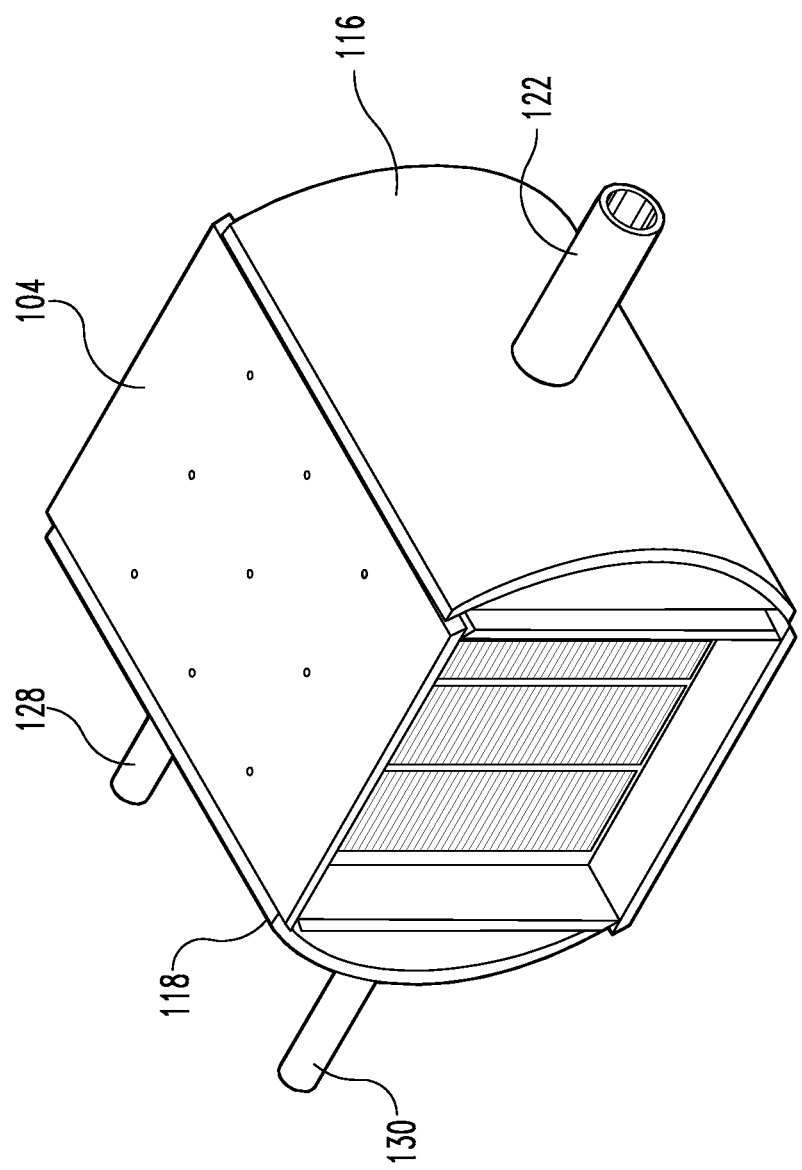
FIG. 19 is an elevated perspective view of the assembly of FIG. 18.
Figure 20:
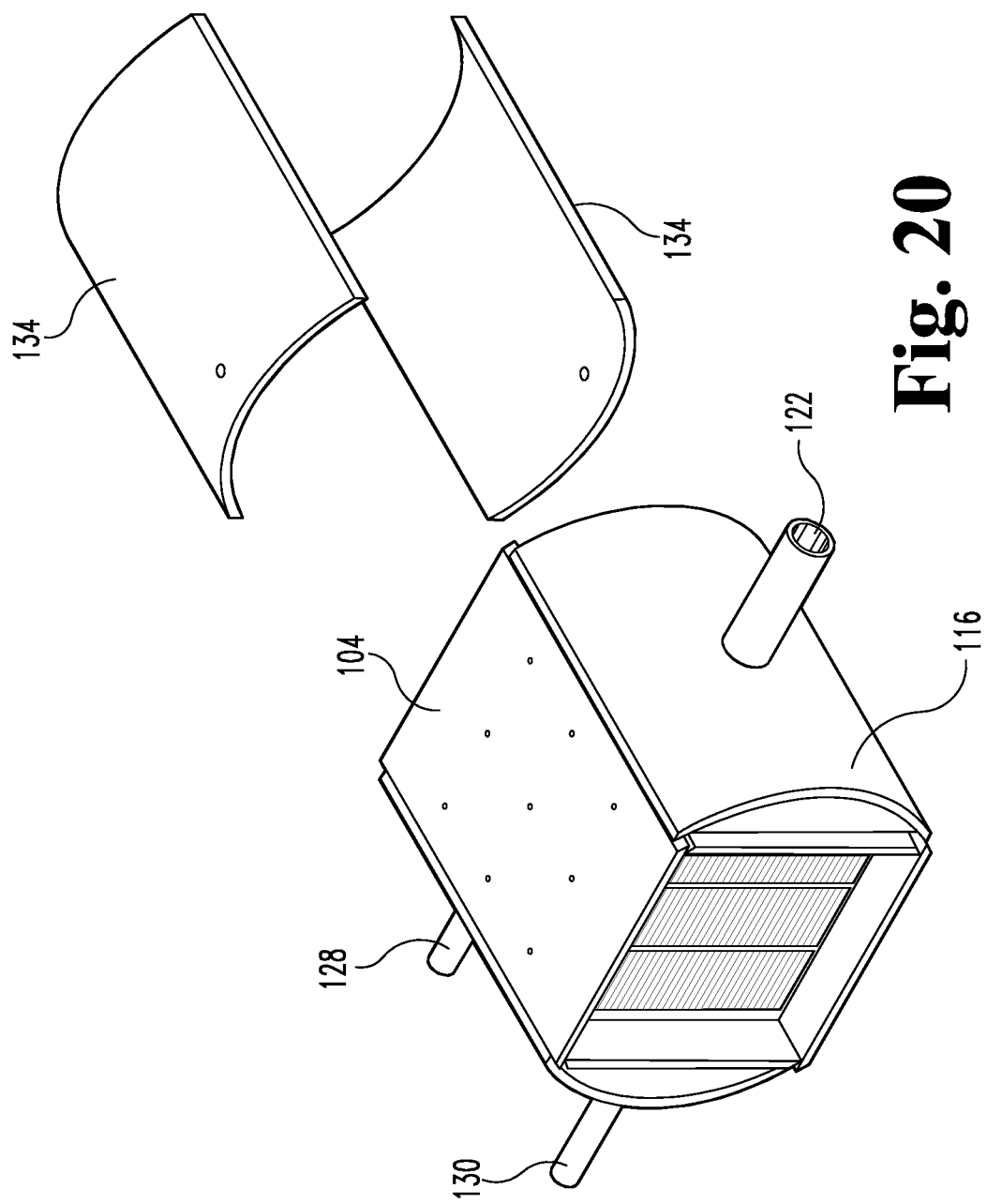
FIG. 20 is an exploded view showing two arcuate walls that are mounted to the assembly of FIG. 19.
Figure 21:
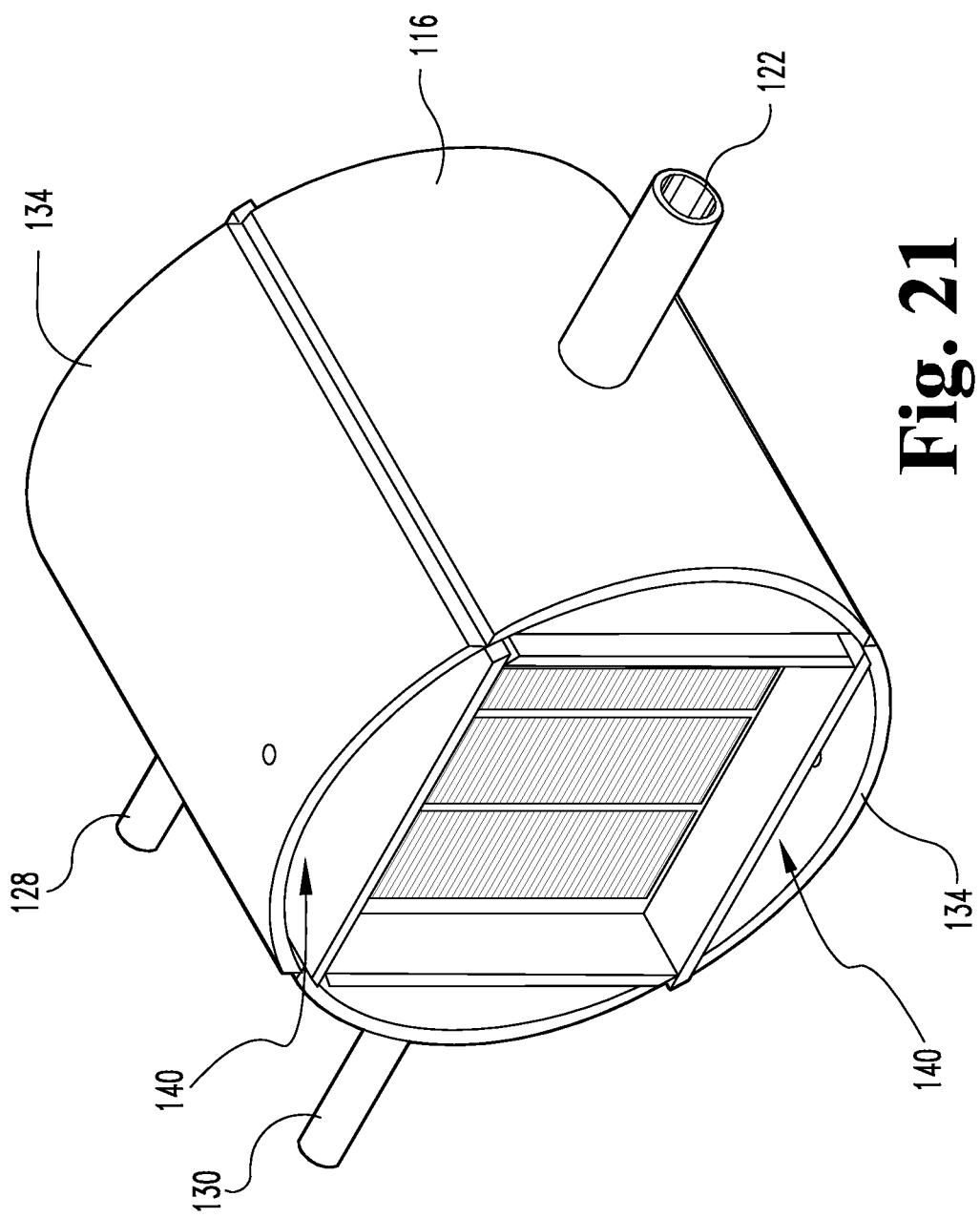
FIG. 21 is an elevated perspective view of the assembly of FIG. 20.
Figure 22:
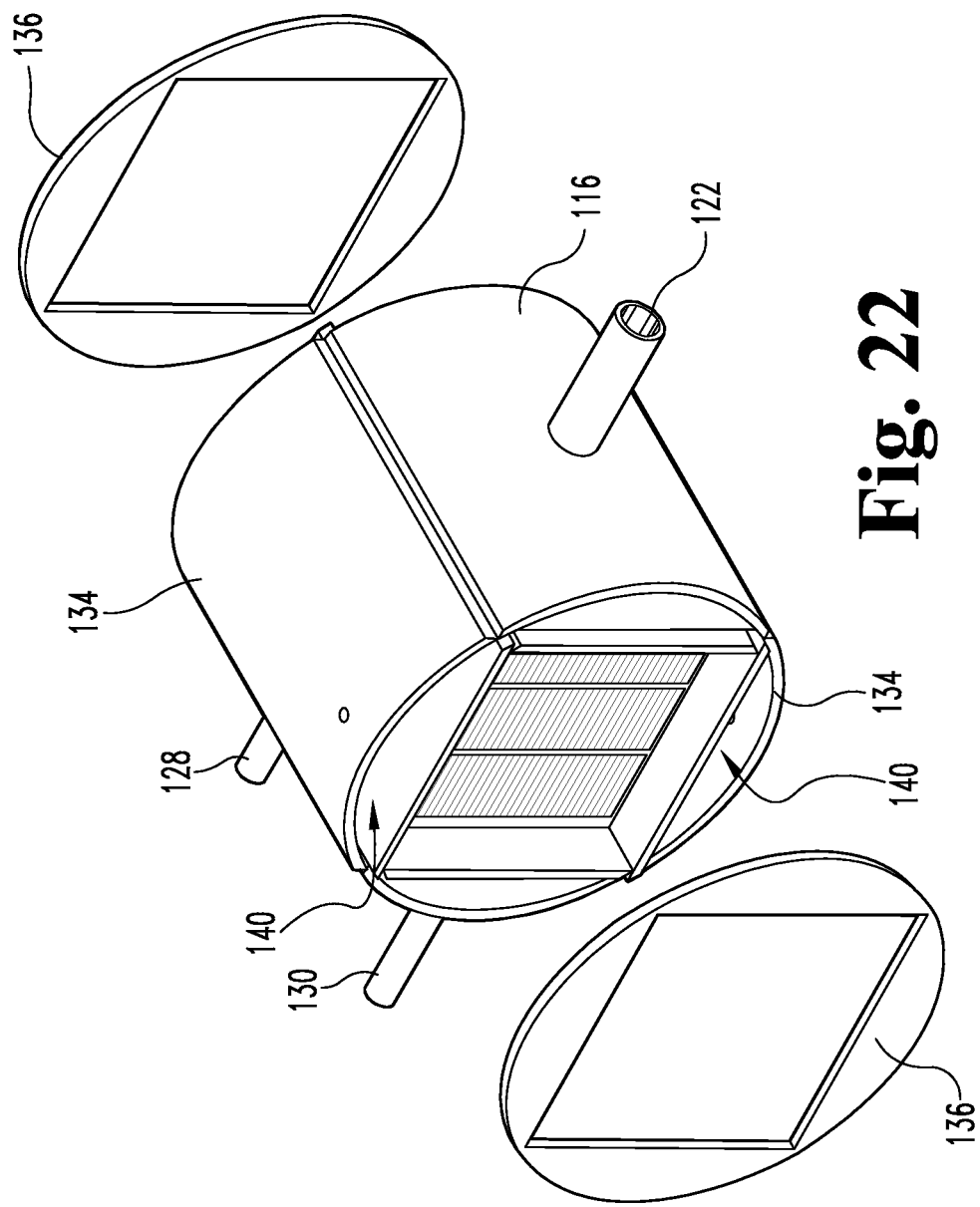
FIG. 22 is an exploded view showing end caps that are mounted to the assembly of FIG. 21.
Figure 23:
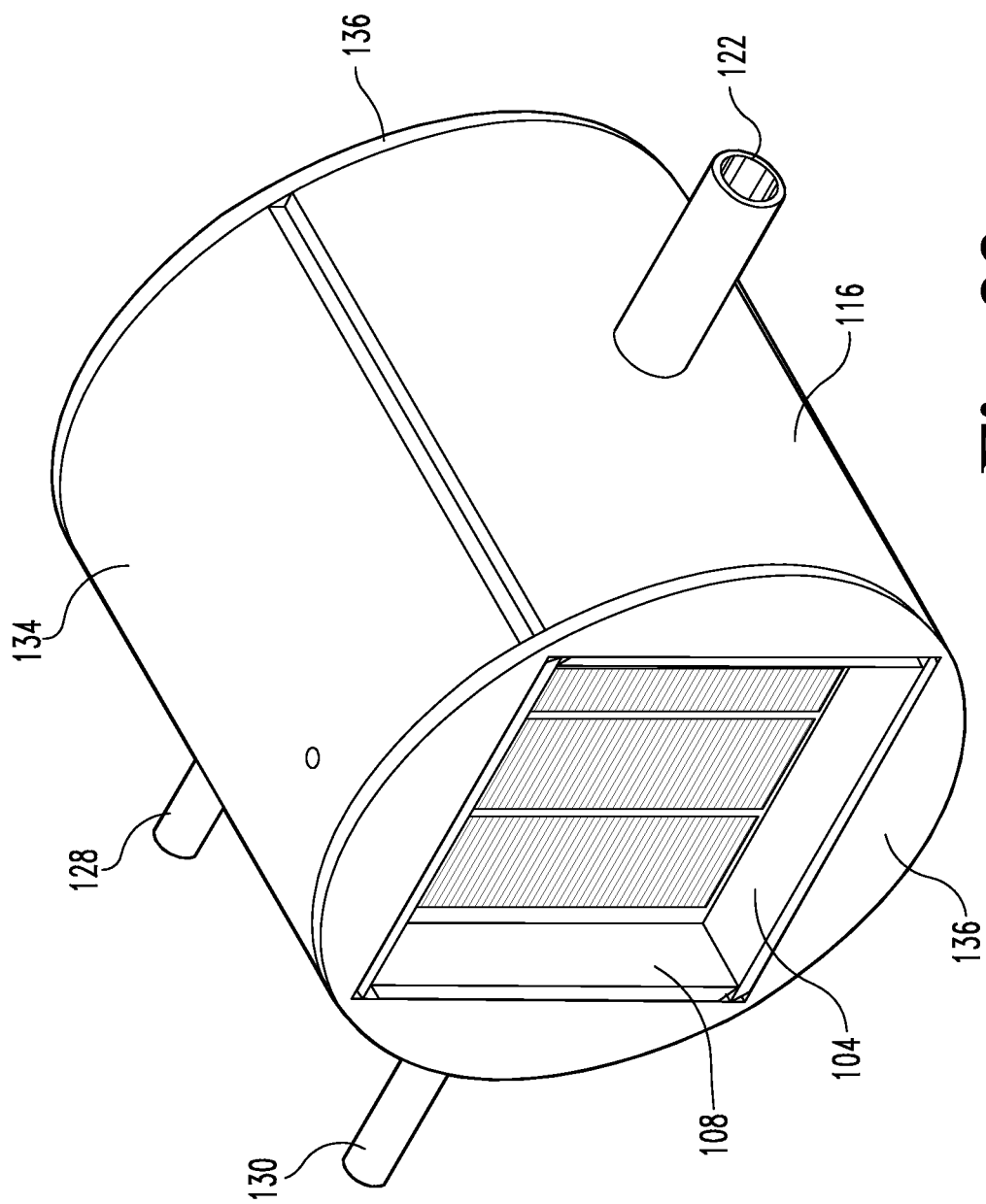
FIG. 23 is an elevated perspective view of the assembly of FIG. 22.

Referencing FIGS. 17-19, subsequent to end wall 112 installation, a pair of exemplary arcuate, rectangular walls 116, 118 are mounted to opposite sides of the module 10. More specifically, the first arcuate, rectangular wall 116 includes a through orifice 120 to accommodate an inlet pipe 122 operative to direct coolant into fluid communication with the microchannels of the coolant panels 30. In exemplary form, the wall 116 may be fabricated from stainless steel or other metal and includes exemplary dimensions of 31 inches in length, 35 inches in diameter, and 0.75 inches in thickness. Moreover, the inlet pipe 122 may be fabricated from stainless steel or other metal and include exemplary dimensions of 12 inches in length, 4 inches in diameter, and 0.5 inches in thickness.

In order to provide this fluid communication, the perimeter of the inlet pipe 122 is welded to the perimeter of the wall 116 defining the orifice 120 in order to close off the orifice on the side of the inlet pipe. Alternatively, the rectangular wall 116 may include a built-in nozzle with a flange that is connected to a pipe flange. The wall 116 is also mounted to the top and bottom plates 104, as well as to the two end walls 112 that are bookends on the coolant inlet side of the module 10. In this exemplary embodiment, the wall 116 is welded the top and bottom plates 104 along the seam where the plates 104 meet the wall. In addition, the wall 116 is also welded to the arcuate sides of the end walls 112 along the seam where the walls meet. Exemplary welds that may be used to secure the wall 116 to the end walls 112 and the plates 104 include, without limitation, full penetration welds created using any standard welding process (TIG, MIG, laser, etc). When the welding of the wall 116 is completed, a fluid tight seal is formed so that fluid coming into the microchannels of the coolant panels 30 can only come through the inlet pipe 122. It should be noted that the length of the wall 116 is not as great as the aggregate length of the module 10 in combination with the supports. Accordingly, the wall 116 is inset 1 inch from the ends of the supports 108.

On the opposite side of the module 10, from the inlet wall 116, the outlet wall 118 includes a pair of orifices 124, 126 to accommodate a vapor outlet pipe 128 and a liquid outlet pipe 130 operative to direct coolant liquid and vapor coolant out of the microchannels of the coolant panels 30. In exemplary form, the wall 118 may be fabricated from stainless steel or other metal and includes exemplary dimensions of 31 inches in length, 35 inches in diameter, and 0.75 inches in thickness. Moreover, the outlet pipes 128, 130 may be fabricated from stainless steel or other metal and include exemplary dimensions of 12 inches in length, 2 inches in diameter, and 0.375 inches in thickness.

In order to provide fluid communication between the pipes 128, 130 and the outlet of the microchannels of the coolant panels 30, the perimeter of the both pipes 128, 130 is welded to the perimeter of the wall 118 defining the respective orifice 124, 126 in order to close off the orifice on the side of the outlet pipe. The wall 118 is also mounted to the top and bottom plates 104, as well as to the two end walls 112 that are bookends on the coolant outlet side of the module 10. In this exemplary embodiment, the wall 118 is welded the top and bottom plates 104 along the seam where the plates 104 meet the wall. In addition, the wall 118 is also welded to the arcuate sides of the end walls 112 along the seam where the walls meet. Exemplary welds that may be used to secure the wall 118 to the end walls 112 and the plates 104 include, without limitation, full penetration welds created using any standard welding process (TIG, MIG, laser, etc). When the welding of the wall 118 is completed, a fluid tight seal is formed so that fluid coming out of the microchannels of the coolant panels 30 can only exit through the outlet pipes 128, 130. As with the other wall 116, this outlet wall 118 is inset 1 inch from the supports 108.

Referring to FIGS. 20-23, after the walls 116, 118 and pipes 122, 128, 130 have been mounted, a pair of covers 134 and end cap 136 are mounted to the assembly. In particular, each cover 134 comprises an arcuate rectangle having a widthwise dimension and a lengthwise dimension that closely approximates the widthwise and lengthwise dimensions of the plates 104. But, similar to the walls 116, 118, the covers 134 are inset 1 inch from the supports 108. In exemplary form, the covers 134 may be fabricated from stainless steel or other material and include exemplary dimensions of 31 inches in length, 35 inches in diameter, and 0.75 inches in thickness.

In particular, each cover 134 is oriented so its lengthwise dimension overlies the lengthwise portion of a respective plate 104, as well as the widthwise portion of the cover overlying the widthwise portion of the respective plate. The covers 134 are then positioned adjacent to a respective plate 104 and welded at the widthwise seam where the cover and respective endplate meet. After the covers 134 are mounted to the plates 104, the resulting structure creates a cylindrical profile having a circular cross-section open at the ends of the microchannel module 10 in communication with the reaction microchannels, as well as the resulting conduits 140 defined by the interior of the covers and the exteriors of the plates. In order to close the conduits and inhibit fluid communication between the interior of the conduits and the reaction microchannels, respective end caps 136 are mounted to the assembly.

Each end caps 136 may be fabricated from stainless steel or other metal and includes a circular shape having exemplary dimensions of 35 inches in diameter and 0.75 inches in thickness. Both end caps 136 include a rectangular opening having dimensions of 24 inches in length and 24 inches in width. In particular, the rectangular opening has generally the same rectangular dimensions as the perimeter formed cooperatively by the plates 104 and the supports 108 at the respective ends of the assembly. Each end cap 136 is sized to be match the circumference of the cylindrical shape defined by the covers 134 and the walls 116, 118 in order to close off the conduits 140 and provide a secondary closure for the coolant side. Accordingly, one face of each end cap 136 is welded to the longitudinal ends of the covers 134 and the walls 116, 118 to be substantially normal to these covers and walls. At the same time, each end cap 136 is welded to the exposed longitudinal ends of the plates 104 and the supports 108. The net result is that a single, fluid tight, rectangular opening exists at the respective longitudinal ends that feed into and out of the microchannel reactors of the microchannel subassemblies 14. At the same time, the end caps 136 are operative to cooperatively define a pair of sealed cavities with the plates 104 and the covers 134. These sealed cavities may be occupied by a pressurized fluid in order to apply a positive pressure on the exterior of the plates. This exemplary Fischer-Tropsch microchannel unit operation 100 is different from conventional approaches, in part, in that the sealed cavities on the outside of the module 10 are in fluid communication with a pressurized fluid. The pressurization fluid (e.g., water, nitrogen, Fisher-Tropsch reactant(s)) may be different between the cavities and may be supplied to the cavities to ensure that pressurized fluid is always maintained on the outside of the module 10.

Figure 24:
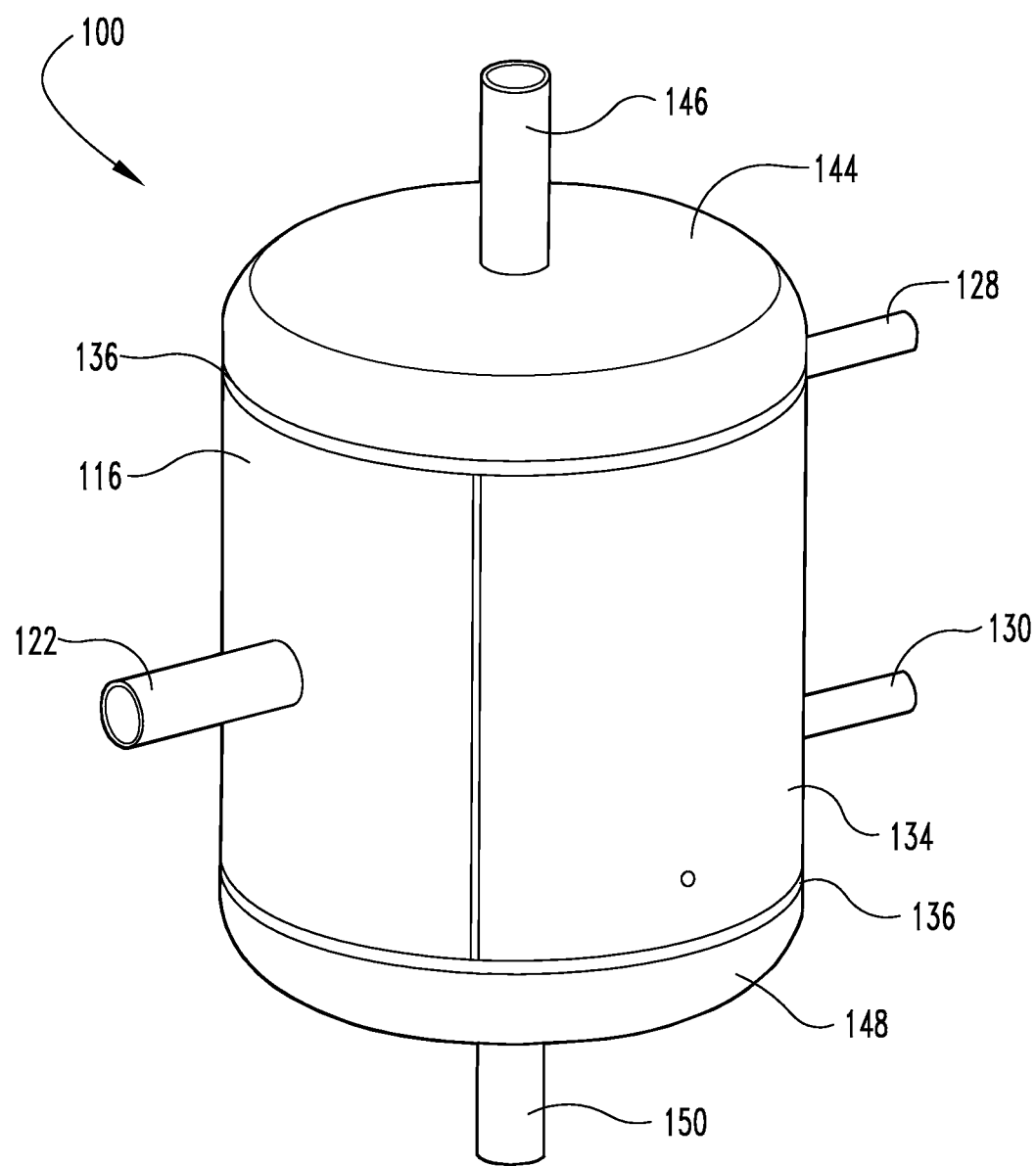
FIG. 24 is an elevated perspective view of the assembly of FIG. 23 with welded lids and associated piping.
Figure 25:
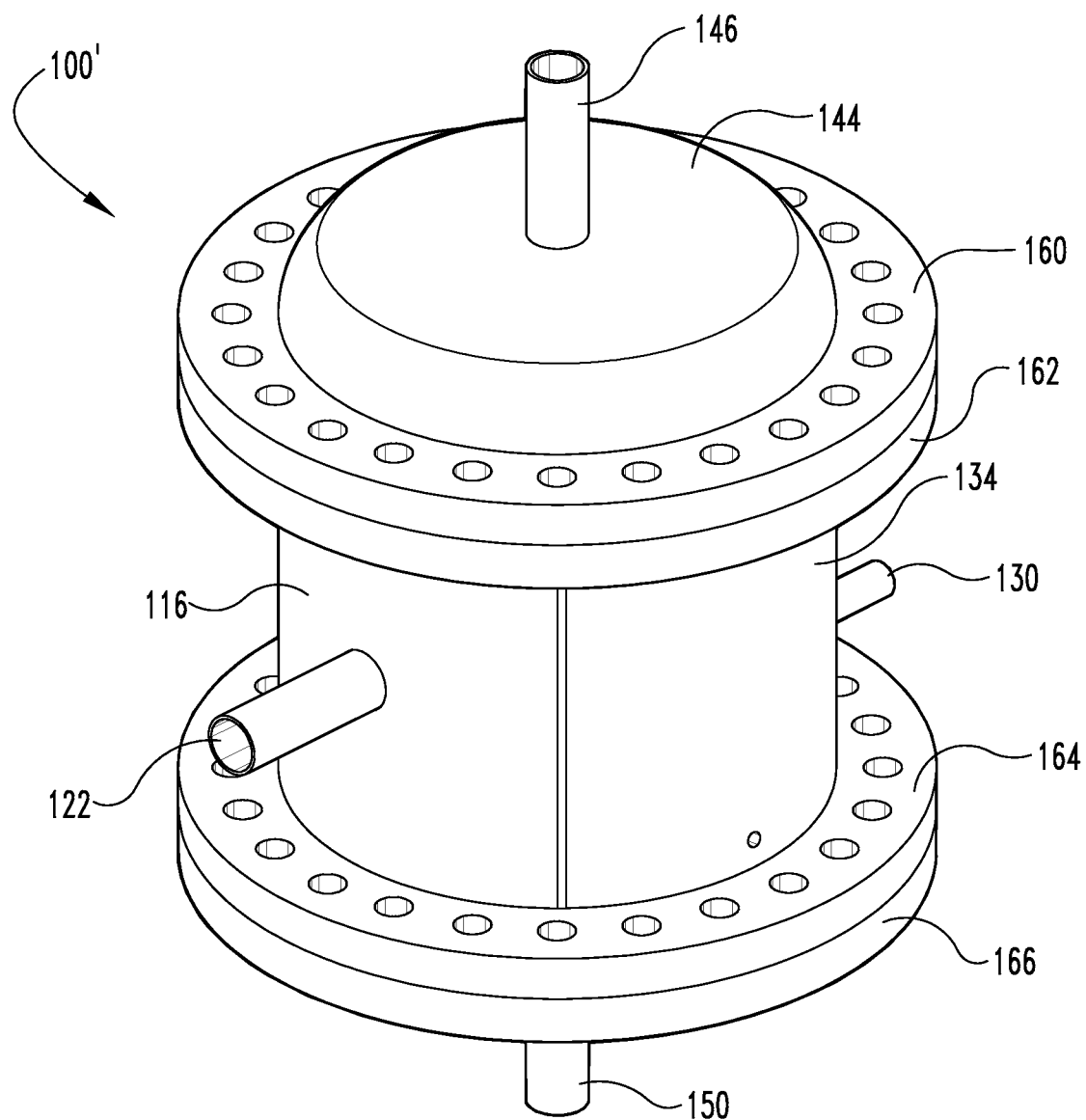
FIG. 25 is an elevated perspective view of the assembly of FIG. 23 with bolted flanged lids and associated piping.

Referring to FIGS. 24 and 25, adapting the Fischer-Tropsch microchannel unit operation 100 to receive inlet streams and distribute outlet streams from the unit operation may be accomplished using various techniques and structures. FIG. 24 shows a first exemplary structure 100 where the inlet end to the microchannel reactor subassemblies and the outlet from the microchannel reactor subassemblies is sealed with a welded connection. In particular, a first lid 144 having a having an orifice to receive an inlet pipe 146 is welded to each exposed end of the assembly. More specifically, the lid 144 comprises a dome-shaped structure having a circular opening at one end and the orifice extending through the dome. In exemplary form, the lid 144 may be fabricated from stainless steel or other metal and includes exemplary dimensions of 35 inches in diameter, 6 inches in height, and 0.75 inches in thickness. The circular opening of the lid 144 is welded to the opposing face (opposite the remainder of the assembly) of the end cap 136 to create a fluid tight seal therebetween. In order to ensure that only fluid from the pipe 146 reaches the interior of the reaction microchannels of the reaction subassemblies 14, the pipe is welded to the lid 144 to create a fluid tight seal therebetween. Likewise, the second lid 148, which is virtually identical to the first lid, includes an outlet orifice to which an outlet pipe 150 is welded to create a fluid tight seal. Similarly, the second lid 148 is welded to the opposite exposed end of the assembly to close off the outlet end of the module, thereby ensuring all fluid flowing through the reaction microchannels of the reaction subassemblies 14 that exit the module 10 are directed through the outlet pipe 150.

FIG. 25 shows a second exemplary structure 100' that is identical to the first exemplary structure 100, with the exception that a pair of flanges 160, 162, 164, 166 interpose the end caps 136 and the lids 144, 148. The circular opening of the first lid 144 is welded to a ring-shaped flange 160 having a series of openings adapted to receive fasteners (not shown), such as nuts and bolts, to removably secure the first lid to the remainder of the assembly. In order to do this, the assembly includes another ring-shaped flange 162, having corresponding openings adapted to receive fasteners, that is welded to the end cap 136. The basis for this removable structure, in part, stems from the desire to replace or regenerate the catalyst, or to inspect, refurbish, or repair the core, with the reaction subassemblies 14 after a predetermined period. While the first exemplary structure also allows replacement and regeneration of the catalyst, replacement of the catalyst may require cutting the lid 144 from the end cap 136. This second exemplary structure obviates any need to cut the lid from the end cap 136 by making the end cap removable simply by removing the fasteners from the flanges 160, 162 and removing the top flange 160 and end cap. Similar to the inlet side, the outlet lid 148 is welded to a ring-shaped flange 168 having a series of openings adapted to receive fasteners (not shown), such as nuts and bolts, to removably secure the lid 148 to the remainder of the assembly via a connection to a complementary flange 166 welded to the corresponding end cap 136. As with the top lid, the bottom lid 148 is readily removable from the remainder of the assembly simply by removing the fasteners holding the flanges 166, 168 together.

Figure 26:
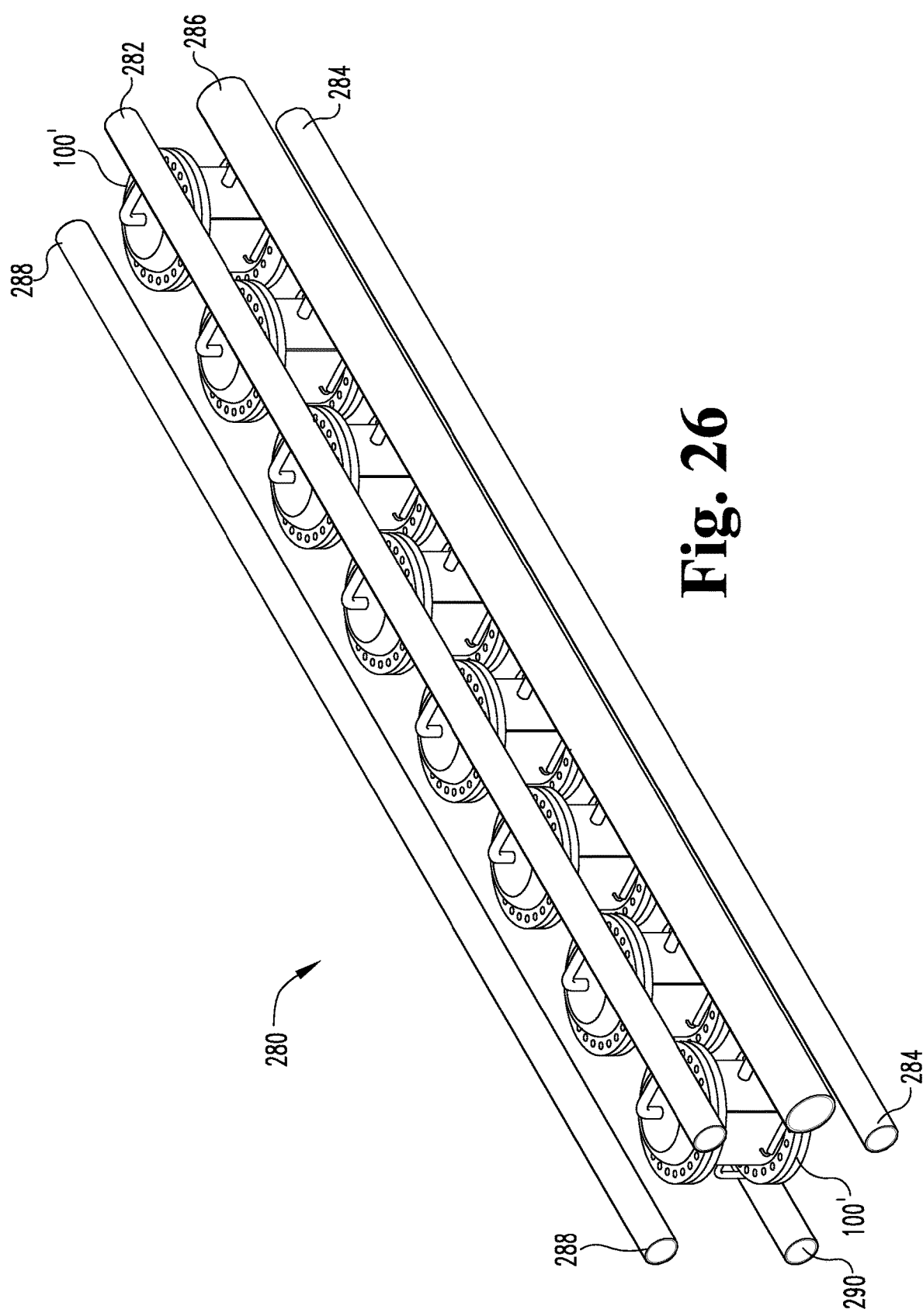
FIG. 26 is an elevated perspective view of an exemplary microchannel unit operation bank.

Referring to FIG. 26, the first and second exemplary structures 100, 100' may be fabricated in multiples and oriented in parallel to one another to create a bank of microchannel structure 280. For purposes of exemplary depiction only, the exemplary structure 100' is shown repetitively in FIG. 26 to create the bank. This bank 280 is connected to a common feed conduit 282 operative to distribute raw material to each inlet pipe 146, thereby delivering raw material to the interior of the reaction microchannels of the reaction subassemblies. Each of the outlet pipes 150 is also connected to a common product conduit 284 in order to gather product from the reaction microchannels of each exemplary structure 100, 100'. Similarly, the inlet pipes 122 of the exemplary structures 100, 100' are in fluid communication with a single cooling fluid conduit 286 operative to direct coolant into fluid communication with the microchannels of the coolant panels. Downstream from the microchannels of the coolant panels are the respective vapor outlet pipes 128 and liquid outlet pipes 130 to direct coolant liquid and vapor coolant out of the microchannels. In exemplary form, the vapor outlet pipes 128 are all in fluid communication with a common coolant vapor conduit 288, while all of the liquid outlet pipes 130 are in fluid communication with a common coolant liquid conduit 290. In this manner, a single conduit 288 carries the coolant vapor collected from the exemplary structures 100, 100', while a single conduit 290 carries the coolant liquid collected from the exemplary structures.

Figure 27:
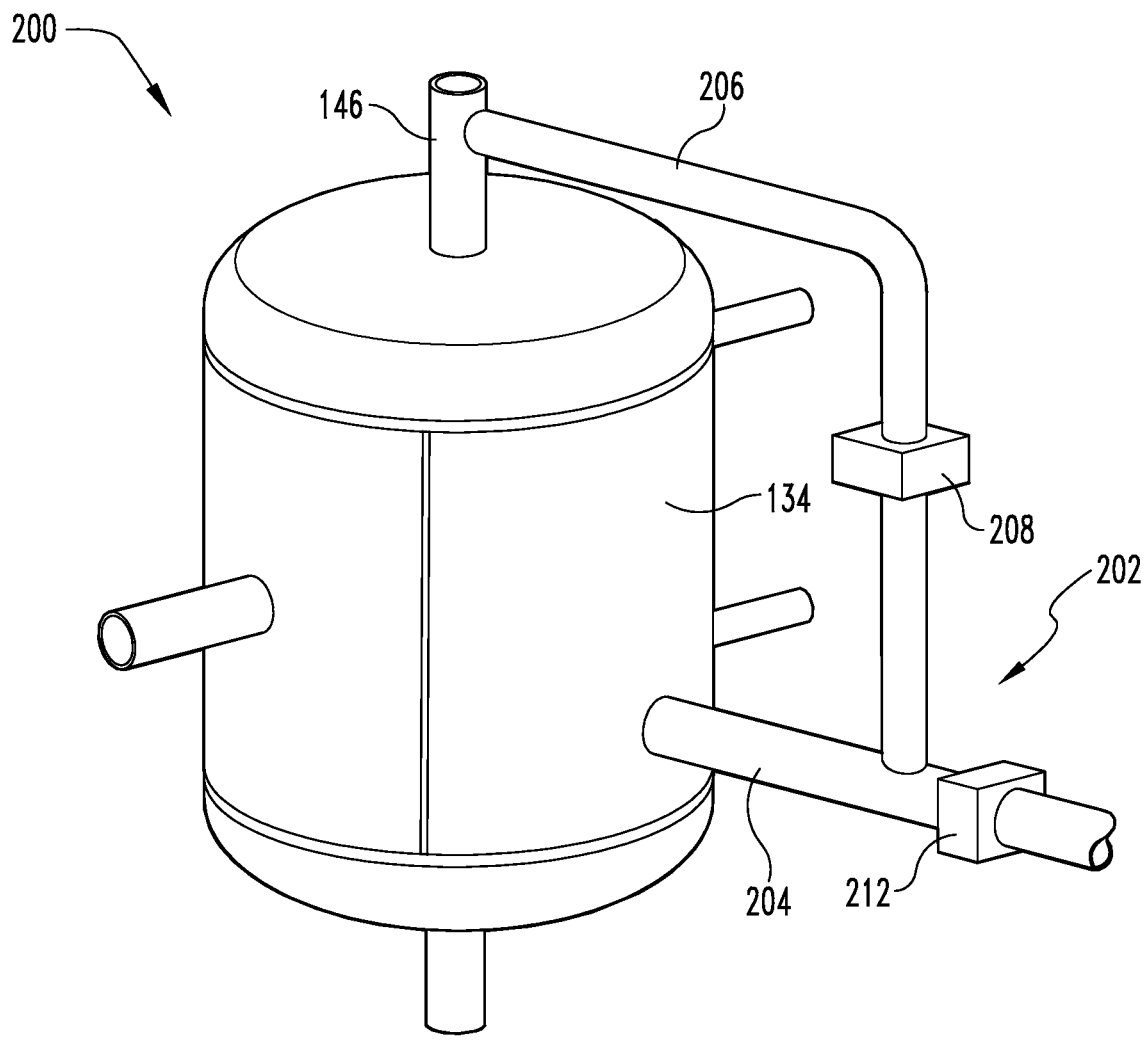
FIG. 27 is an elevated perspective view of the assembly of FIG. 24 with a pressure diversion system to maintain external pressure to the microchannel module.
Figure 28:
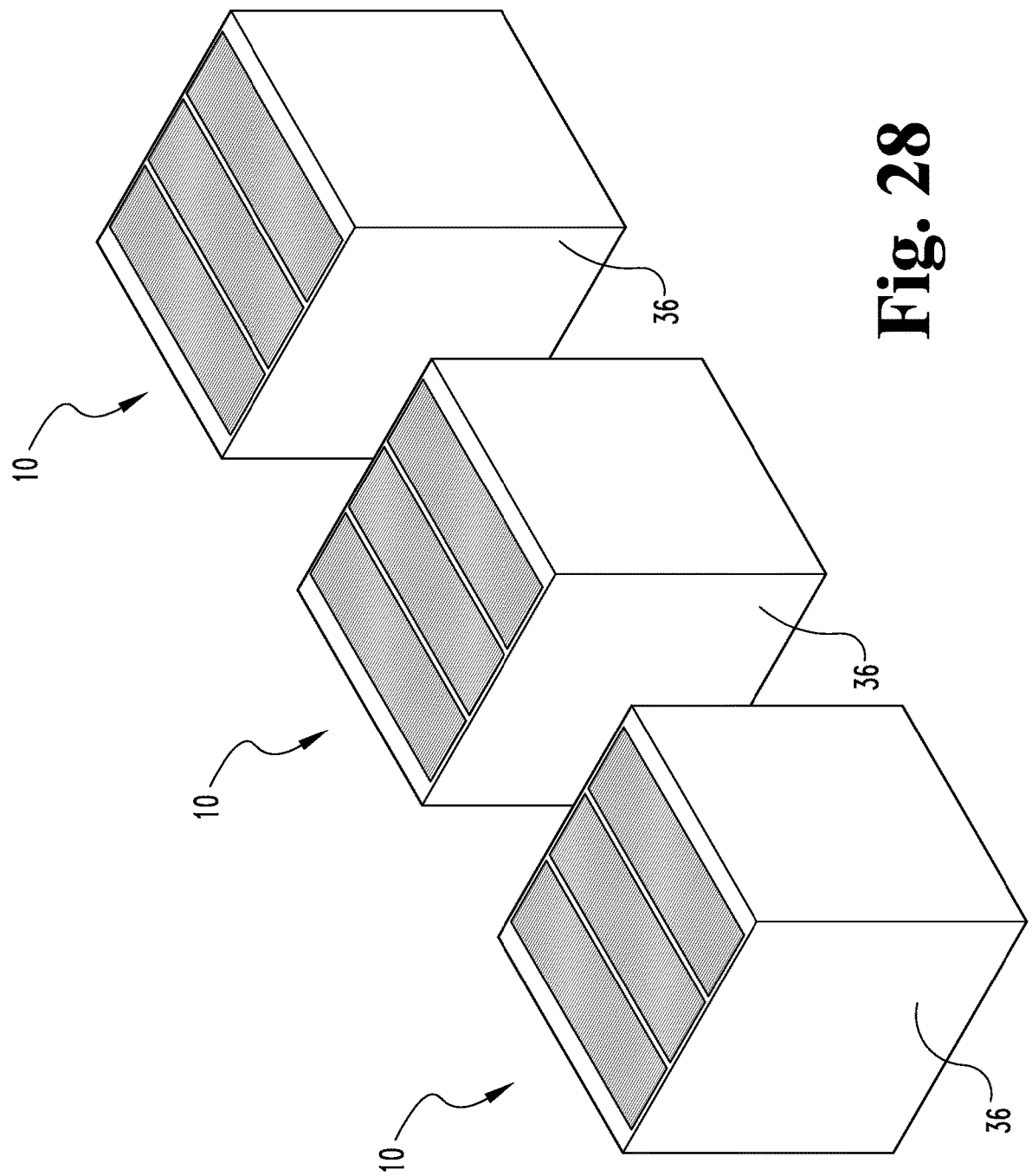
FIG. 28 is an elevated perspective view of a series of completed microchannel modules.
Figure 29:
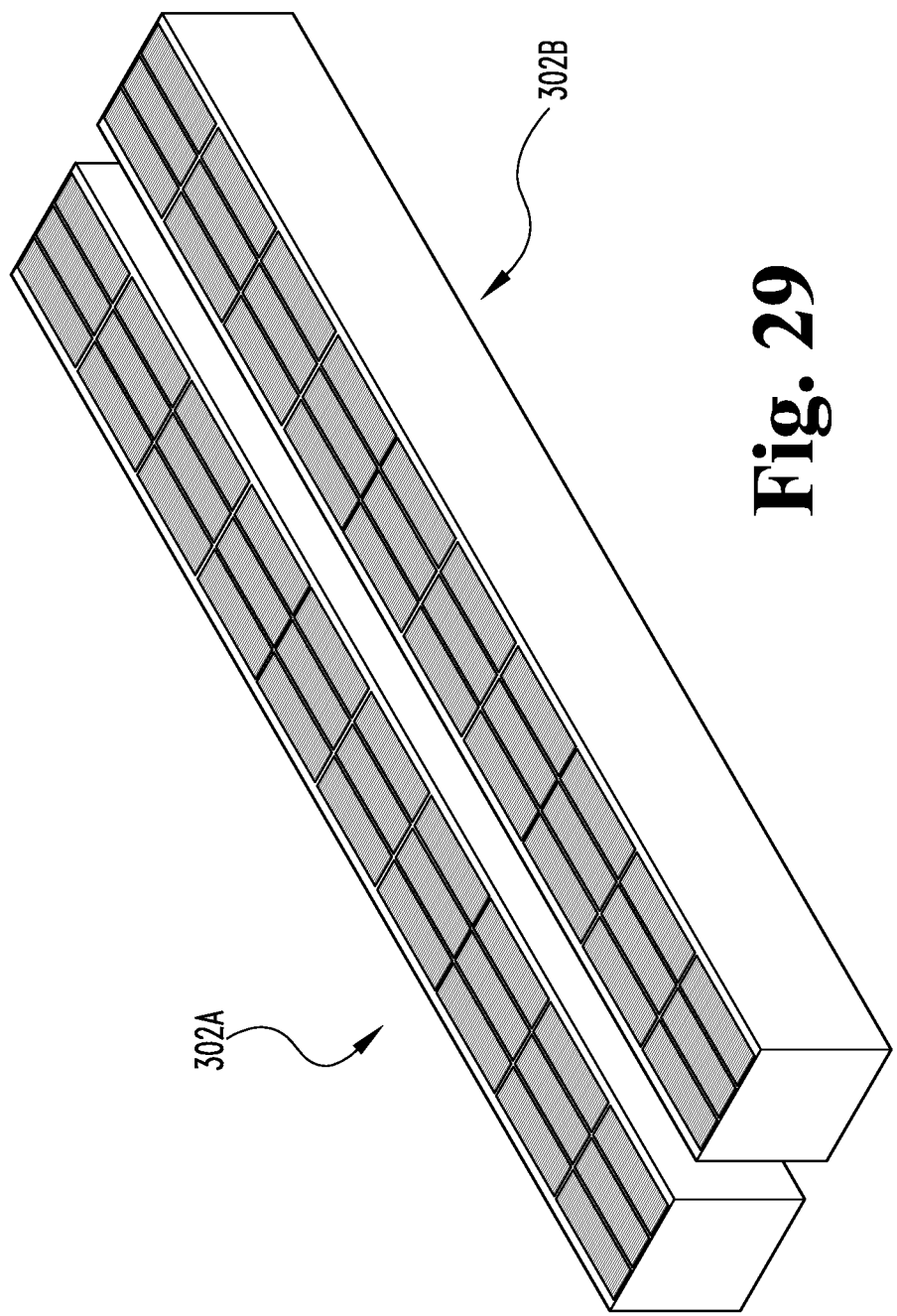
FIG. 29 is an elevated perspective view of a pair of microchannel module banks.

Referring to FIG. 27, in an alternate exemplary embodiment 200, either exemplary structure 100, 100' may include a positive pressure structure 202. For purposes of exemplary depiction only, the exemplary structure 100 is shown in FIG. 27 with the positive pressure structure. This positive pressure structure 202 includes an inlet pipe 204 supplying a pressurized fluid to the interior of the cavities by way of a respective egress orifice through the covers 134. By way of example, and not limitation, the pressurized fluid may be in inert fluid such as nitrogen that is directed into the cavities at a pressure greater than the pressure within the reaction microchannels of the reaction subassemblies 14. In this manner, the pressurized fluid provides a positive pressure upon the exterior of the microchannel module 10. But in a circumstance where, for whatever reason, the pressure of the pressurized fluid is no longer at or above the pressure occurring within the reaction microchannels of the reaction subassemblies 14, a diverter pipe 206 in fluid communication with the inlet pipe 146 will direct reactants flowing through the inlet pipe through the diverter pipe and through a check valve or pressure regulator 208, the outlet side of which is in fluid communication with the inlet pipe 204. It should also be noted that the inlet pipe 204 also includes a check valve 212 upstream from the connection to the outlet side of the first check valve 208. While FIG. 27 may be alleged to only show the inlet pipe 204 in communication with one of the cavities, it should be understood that the inlet pipe 204 is in communication with both cavities on opposite sides of the module 10. In this manner, if any or all cavities exhibit pressure less than the pressure within the diverter pipe, the contents of the diverter pipe will flow through the inlet pipe 204 and into the cavity or cavities in question.

In operation, presuming the reactor microchannel are operating at a pressure "X" and the pressurized fluid is supplied at a pressure "Y", which is higher than pressure X, then the first check valve 208 would be closed to inhibit pressurized fluid from entering the diverter pipe 206 and into communication with the reactant inlet pipe 146. But, for whatever reason, if pressure Y drops below pressure X, the first check valve 208 is opened to allow a portion of the reactant stream from the reactant inlet pipe 146 to flow into the diverter pipe 206, through the first check valve, and through the inlet pipe 204 to the interior of the cavities so that the pressure within the cavities is at least as great as the pressure within the reaction microchannels of the reaction subassemblies 14. But when pressure Y drops below pressure X, the second check valve 212 is closed to ensure that pressure within the cavities is maintained and the reactants are not able to bleed out upstream from the second check valve.

Referring to FIGS. 28-32, a third exemplary embodiment of a microchannel unit operation 300 makes use of a plurality of microchannel modules 10 mounted end to end with the inlet sides for the coolant subassemblies 12 all face the same direction, as well as the inlet sides of the microchannel reactor subassemblies 14 all facing the same direction. More specifically, the endplates 36 of each module 10 are adjacent one another in a compression fit. In exemplary form, ten microchannel modules 10 are oriented end to end so that the top endplate 36A of a first module 10A is adjacent and aligned to completely overlap the bottom endplate 36B of a second module 10B. This pattern is repeated for any number of modules, but in this example, ten modules. After the modules have been oriented end to end, the seams between the endplates 36 of adjacent modules are welded to couple the adjacent modules together to create a microchannel module bank 302. In particular, each of the microchannel modules 10 of the first bank 302A have been fabricated so that in a clockwise direction the module includes an inlet side for the coolant subassemblies 12, an outlet side for the microchannel reactor subassemblies 14, an outlet side for the coolant subassemblies, and an inlet side for the microchannel reactor subassemblies 14. Conversely, the microchannel modules 10 of the second bank 302B have been fabricated so that in a clockwise direction the module includes an inlet side for the coolant subassemblies 12, an inlet side for the microchannel, reactor subassemblies 14, an outlet side for the coolant subassemblies, and an outlet side for the microchannel reactor subassemblies 14.

Figure 30:
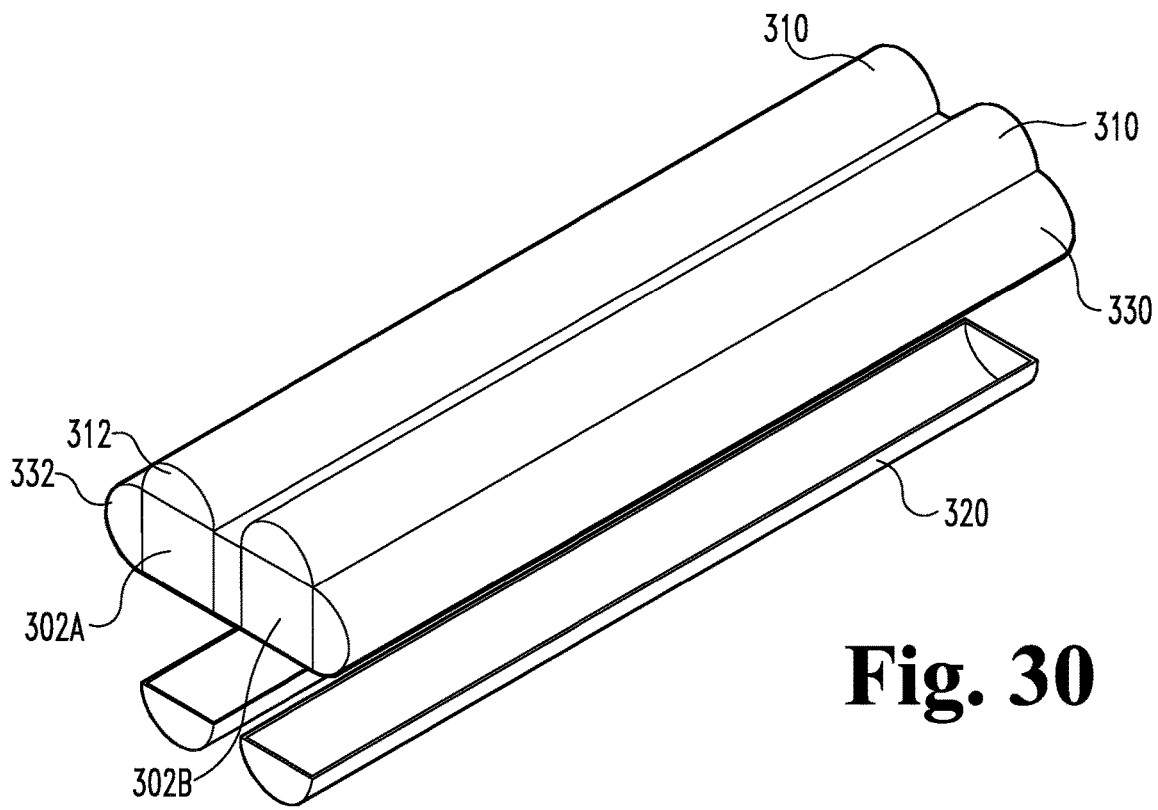
FIG. 30 is a partially exploded view of a partially completed exemplary microchannel unit operation shown with common inlet and outlet conduits for the microchannel module banks.
Figure 32:
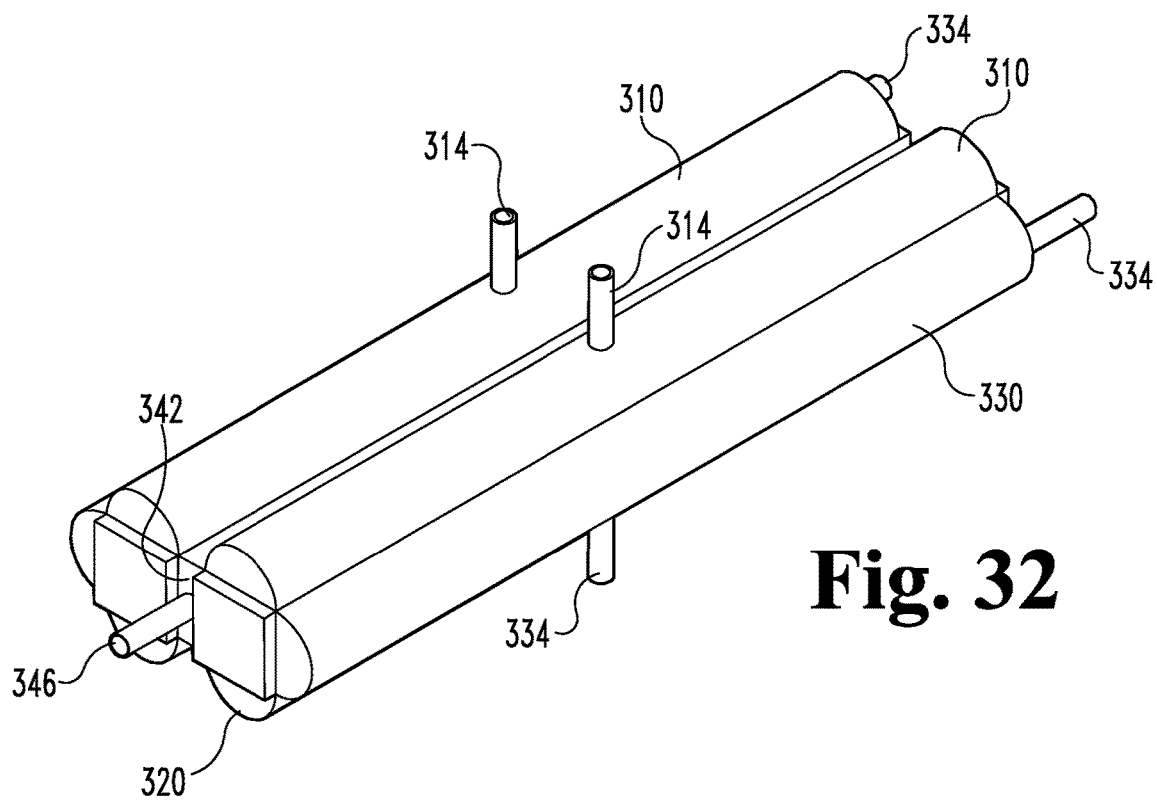
FIG. 32 is an elevated perspective view of the completed exemplary microchannel unit operation of FIG. 31.
Figure 31:
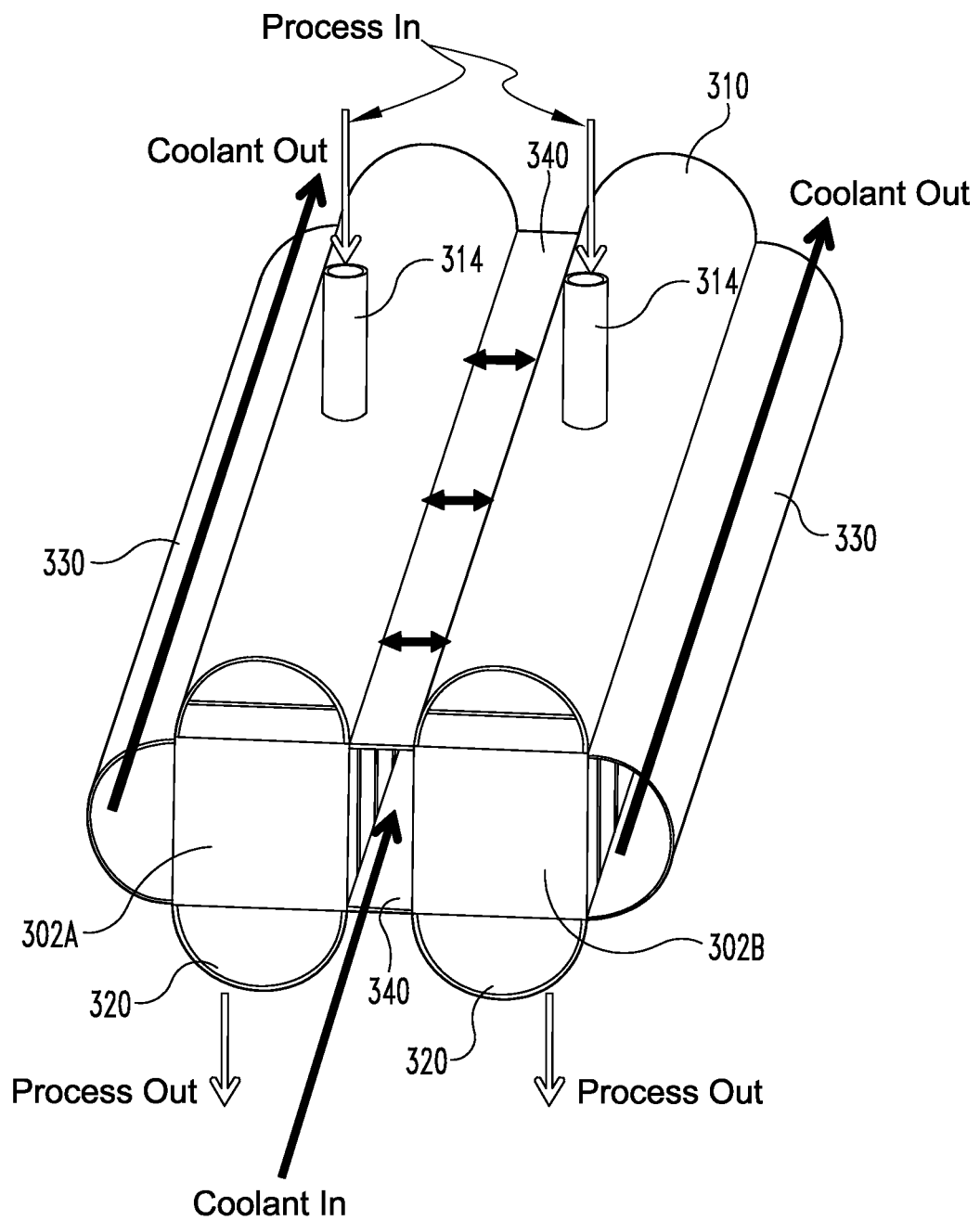
FIG. 31 is an elevated perspective view from the front of the partially completed exemplary microchannel unit operation shown in FIG. 30.

Referring to FIG. 30, the microchannel module banks 302A, 302B are aligned in parallel to one another and spaced apart from one another so that the inlet sides of each of the coolant subassemblies 12 face one another. This orientation also has means that the outlet sides of each of the coolant subassemblies 12 face in opposite directions. Moreover, this orientation results in the inlet side for the microchannel reactor subassemblies 14 both facing in a first direction, and the outlet side for the microchannel reactor subassemblies 14 both facing in a second direction opposite that of the first direction.

Fabrication of the third exemplary microchannel unit operation 300 includes welding a pair of semicircular linear conduits 310, with semicircular end walls 312, to each of the microchannel module banks 302A, 302B adjacent the inlet side of the microchannel reactor subassemblies 14 (see FIG. 1). In particular, each of the linear conduits 310 has a widthwise dimension that roughly equals the widthwise dimension of the respective microchannel module banks 302A, 302B so that welding of the conduits at the seams where the conduits meet the edges of the module banks creates a fluid tight seal therebetween. At the same time, the end walls 312 are welded to the longitudinal ends of the module banks 302A, 302B to ensure that all fluid entering the inlet side of the microchannel reactor subassemblies 14 has been conveyed via the linear conduits 310. Each linear conduit 310 also includes an inlet pipe 314 welded thereto and operative to supply reactant to the inlet side of the microchannel reactor subassemblies 14.

A second pair of semicircular linear conduits 320, with semicircular end walls 322, is welded to each of the microchannel module banks 302A, 302B adjacent the outlet side of the microchannel reactor subassemblies 14. In particular, each of the linear conduits 320 has a widthwise dimension that roughly equals the widthwise dimension of the respective microchannel module banks 302A, 302B so that welding of the conduits at the seams where the conduits meet the edges of the module banks creates a fluid tight seal therebetween. At the same time, the end walls 322 are welded to the longitudinal ends of the module banks 302A, 302B to ensure that all fluid exiting the outlet side of the microchannel reactor subassemblies 14 has been conveyed via the linear conduits 320. Each linear conduit 320 also includes an outlet pipe 324 welded thereto and operative to carry away product from the outlet side of the microchannel reactor subassemblies 14.

A third pair of semicircular linear conduits 330, with semicircular end walls 332, are welded to each of the microchannel module banks 302A, 302B adjacent the outlet side of the coolant subassemblies 12. In particular, each of the linear conduits 330 has a widthwise dimension that roughly equals the widthwise dimension of the respective microchannel module banks 302A, 302B so that welding of the conduits at the seams where the conduits meet the edges of the module banks creates a fluid tight seal therebetween. At the same time, the end walls 332 are welded to the longitudinal ends of the module banks 302A, 302B to ensure that all fluid exiting the outlet side of the coolant subassemblies 12 has been conveyed via the linear conduits 330. Each linear conduit 330 also includes an outlet pipe 334 welded thereto and operative to carry away coolant from the outlet side of the coolant subassemblies 12.

A pair of longitudinal plates 340 are welded across the tops and bottoms of the remaining, otherwise exposed inlet sides of the coolant subassemblies 12, to create a fluid tight seal, as are an inlet cap 342 and a rear cap (not shown) mounted to the front and rear to close off the remaining openings and create a fluid tight seal. The plates 340 and caps 342 cooperate to inhibit fluid from entering the inlet side of the coolant subassemblies 12 except through a coolant inlet pipe 346 welded to the inlet cap 342.

Referring to FIGS. 33-37, a further exemplary microchannel unit operation 400 is cylindrical and provides coaxial coolant delivery and reactant delivery. More specifically, the cylindrical shape is the result of a series of microchannel coolant and reaction subassemblies 402, 404 that alternate in a circular arrangement. In this exemplary embodiment 400, the microchannel coolant subassemblies 402 each comprise a shim or laminae 408 with preformed channels 410 (the channels may be formed by etching) that is joined with a top plate 412. In exemplary form, the preformed channels 410 are linear and extend horizontally. In exemplary form, the coolant shim 408 comprises a rectangular piece having constant dimensions of a width of 24 inches, a length of 24 inches, and a variable thickness that changes to accommodate for the difference in circumference on the interior of the unit operation 400 and the exterior of the unit operation. Alternatively, the coolant shim 408 may comprise a rectangular piece having a constant thickness and dimensions of a width of 24 inches and a length of 24 inches. By way of example, and not limitation, the shim 408 may have a frustopyramidal horizontal cross-section or a rectangular horizontal cross-section.

Figure 36:
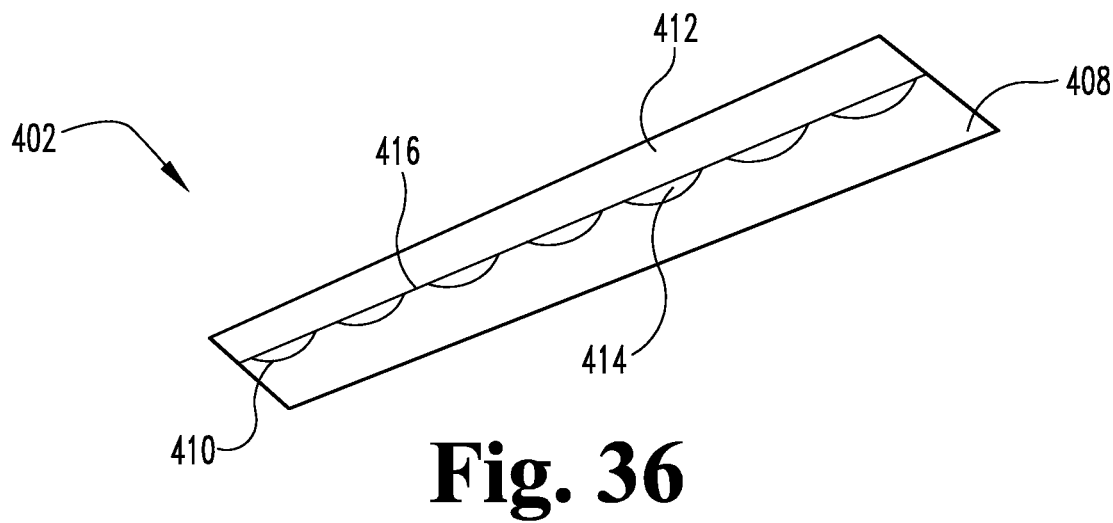
FIG. 36 is an end view of an exemplary coolant subassembly.

Referring specifically to FIG. 36, a graphical depiction shows how the cross-section of an exemplary the coolant microchannel 414 may change between the interior and the exterior of the coolant subassembly 402. In exemplary form, the coolant microchannel has a cross-section that is defined by the bottom, flat surface of the top plate 412 and the interior, concave surface of the shim 408 that delineates the preformed channels 410. Between the interior and the exterior of the unit operation 400, the profile of the coolant channel 414 generally remains the same shape, but the cross-section of the coolant channel 414 increases proportionally to the increase in thickness of the shim in the radial direction.

Alternatively, the exemplary coolant microchannel may extend radially (as opposed to parallel to the axial center) from the center of the unit 400 in parallel with the reaction microchannels 422 discussed below. In such a circumstance, the exemplary coolant microchannels may exhibit a constant radial cross-section (and just have the material defining the microchannel increase as the radial distance increases) or may have a cross-section that increase as the radial distance from the center increases. The profile of the exemplary coolant microchannels that extend radially may take on various forms such as, without limitation, rectangular, square, circular, and oblong.

One of the advantages of the approach of FIGS. 33-37 is that the microchannel unit operation 400 is "self-supporting". In contrast, current rectangular unit operations counterbalance the pressure in any process layer by the pressure in the layers adjacent to it on either side. A potential problem arises at the ends where the outermost process layer is only counterbalanced on one side, but nothing on the other side (e.g., ambient conditions). To balance this pressure, it is known to use external supports to keep the unit operation from deforming. But if you arrange the process layers in a circular fashion, as with the exemplary unit operation 400, there is no "outlayer" and therefore every process has adjacent layers on both sides to balance the pressure. This may result in the absence of external supports and less material used to construct the unit operation, which may result in the unit operation weighing less and increasing its process throughput per unit displacement. Moreover, the less material used to construct the unit operation, less the cost for a comparable unit operation.

Figure 35:
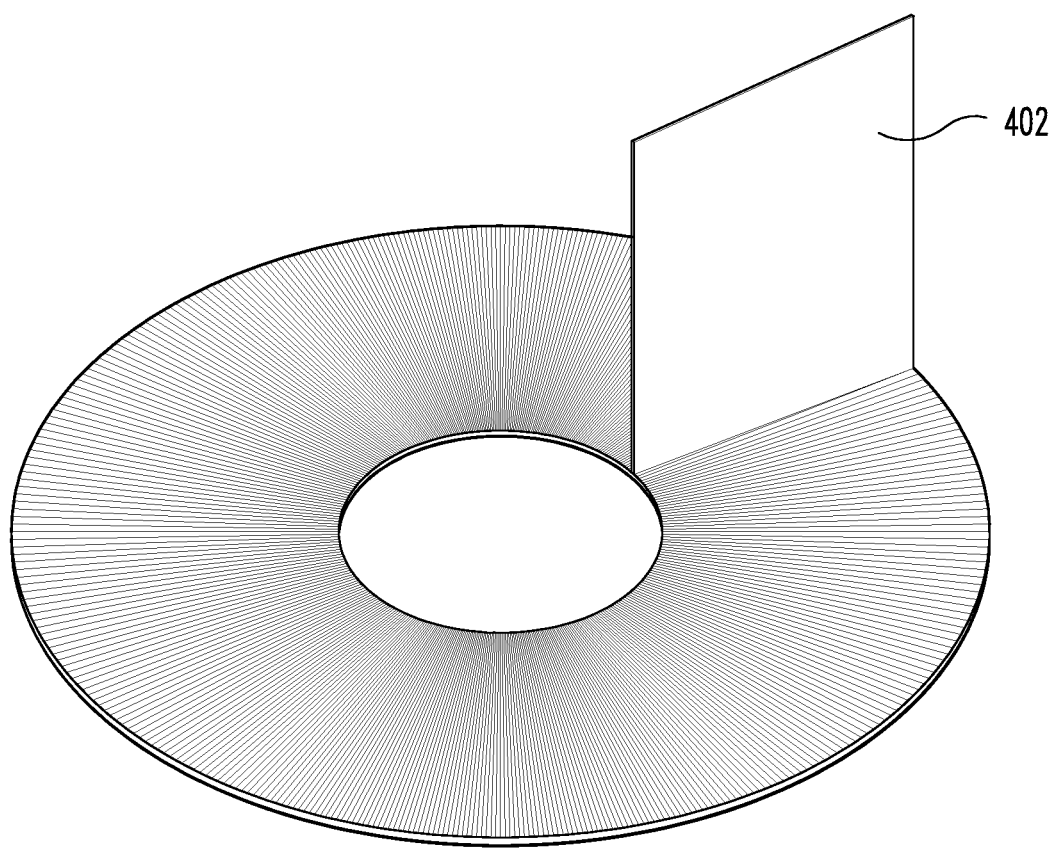
FIG. 35 is an elevated perspective view of a partially completed microchannel unit operation showing vertical placement of one of the coolant subassemblies therein.

Referencing FIGS. 35 and 36, a joining process, preferably a laser welding process is carried out to attach the top plate 412 to the shim 408, thus forming a lengthwise weld between the top plate and a rib 416 of the coolant shim 408 that extends the entire length of the rib. This welding process operates to create separate coolant channels 414 that extend generally parallel to one another in a radial direction from the axial center of the unit operation 400. Interposing the microchannel coolant subassemblies 402 are the reaction subassemblies 404.

Figure 33:
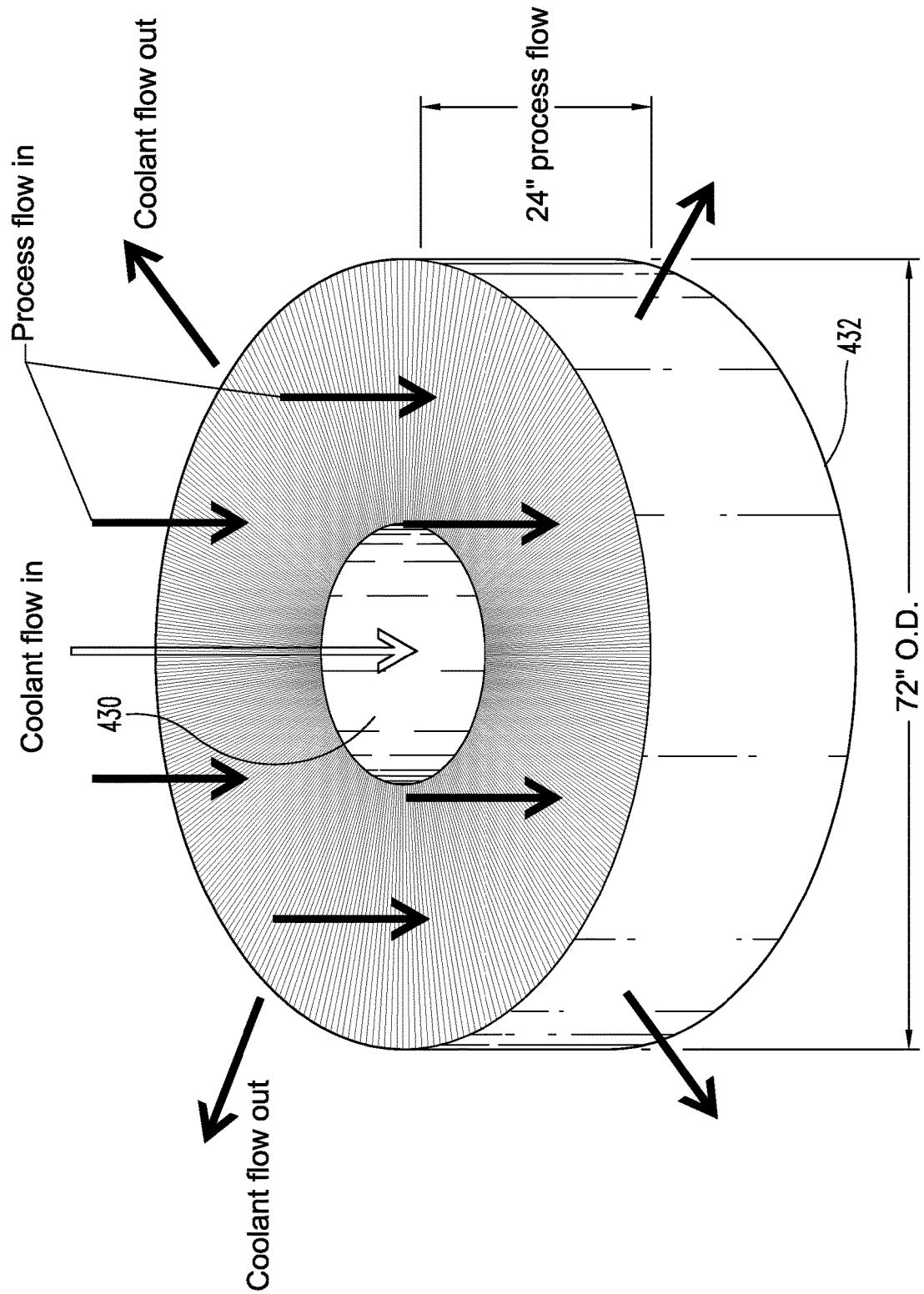
FIG. 33 is an elevated perspective view of a partially completed, further exemplary microchannel unit operation.
Figure 34:
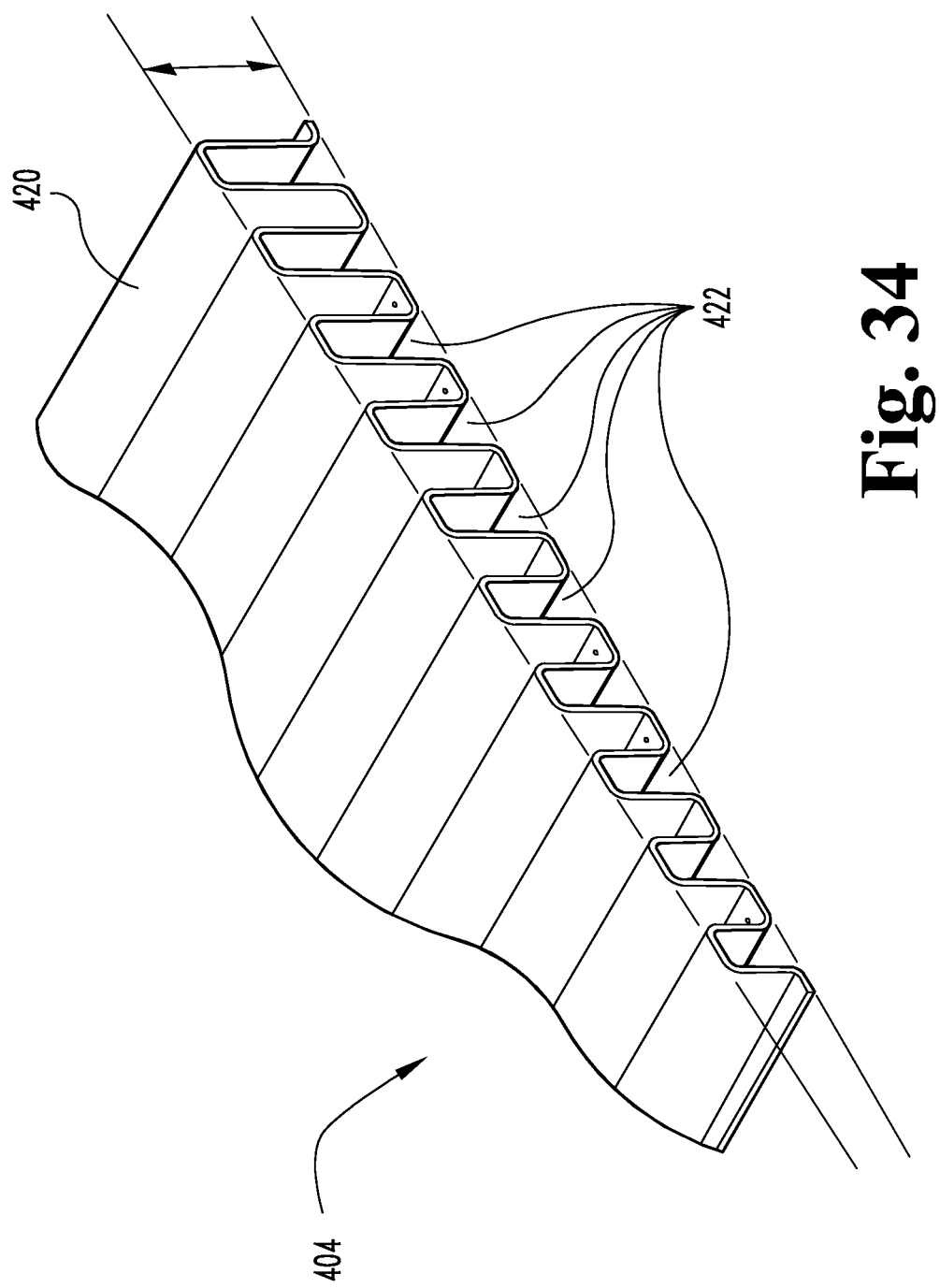
FIG. 34 is an elevated perspective view of an exemplary reaction subassembly from the partially completed microchannel unit operation of FIG. 33.

Referring to FIGS. 33, 34 and 36, the reaction subassemblies make use of the top plate 412 from a first adjacent coolant subassembly 402 and the shim 408 from a second adjacent coolant subassembly in order to sandwich a corrugated insert 420 therebetween. In exemplary form, the corrugated insert 420 comprises a waveform having a series of repeating units having a block U-shaped profile that extends vertically to define generally rectangular cross-sectioned cavities 422, perpendicular to the horizontal coolant channels 414 of the coolant subassemblies 402. This block U-shaped profile increases as the distance from the axial center of the unit operation increases. By way of example, the insert 420 includes dimensions of a width of 24 inches, a length of 24 inches, and a variable thickness corresponding to the distance from the axial center. In this exemplary embodiment, the thickness gradually increases from 0.063 inches at the interior of the unit operation 400 to 0.313 inches at the exterior of the unit operation. By way of example, and not limitation, the insert 420 has outer boundaries that resemble a frustopyramidal horizontal cross-section. Within the cavities 422 of the insert 420 may be located a catalyst (not shown) such as, without limitation, a FT catalyst. This catalyst may be coated on the walls of the insert 420 and/or be located within the cavities 422 in particulate form.

Referring back to FIG. 33, the interior and the exterior of the unit operation 400 includes corresponding interior and exterior cylindrical bands 430, 432 to facilitate packing of the coolant and reaction subassemblies 402, 404. The interior coolant band 430 includes a plurality of through openings (not shown) that are aligned with the openings to the coolant microchannels 414 nearest the radial center in order to provide fluid communication between the interior of the interior band and the coolant microchannels. The exterior coolant band 432 includes a plurality of through openings (not shown) that are aligned with openings egressing from the coolant microchannels 414, farthest from the radial center, in order to provide fluid communication between the exterior of the exterior band and the coolant microchannels.

Figure 37:
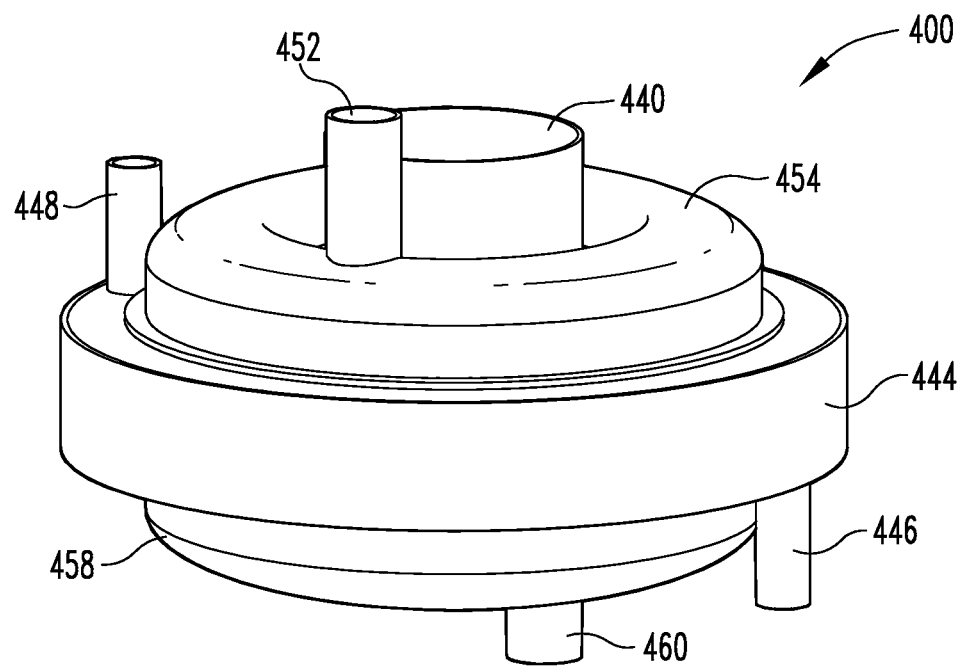
FIG. 37 is an elevated perspective view of the completed microchannel unit operation of FIG. 33.

Referring to FIG. 37, a single coolant inlet pipe 440 is welded to the interior cylindrical band 430 in order to supply coolant to the interior of the cylindrical band and thereafter through the coolant microchannels 414. In order to gather coolant exiting the coolant microchannels 414, a ring-shaped envelope 444 is welded to the exterior of the cylindrical band 432 in order to provide a sealed cylindrical cavity enveloping the cylindrical band and gathering all of the coolant that exits the microchannels. In exemplary form, the envelope 444 includes a pair of pipes 446, 448 that respectively carry the liquid phase and the vapor phase of coolant exiting the coolant channels. Raw materials is delivered to the reactant subassemblies using a feed pipe 452 welded to a hollow, ring-shaped cap 454, which is itself welded to the top rims of the cylindrical bands 430, 432. In this manner, a fluid tight seal is created between the interior of the feed pipe 452 and the reaction microchannels. At the same time, this fluid tight seal prohibits mixing of the inlet coolant stream with the raw material(s) flowing into the reaction microchannels. Similarly, the outlet side of the reaction microchannels includes a hollow, ring-shaped cap 458, which is itself welded to the bottom rims of the cylindrical bands 430, 432 to create a fluid tight seal and capture all of the materials flowing out of the reaction microchannels. This cap 458 has an orifice partially defined by an outlet pipe 460 welded to the cap to convey the outlet stream from the cap.

Figure 38:
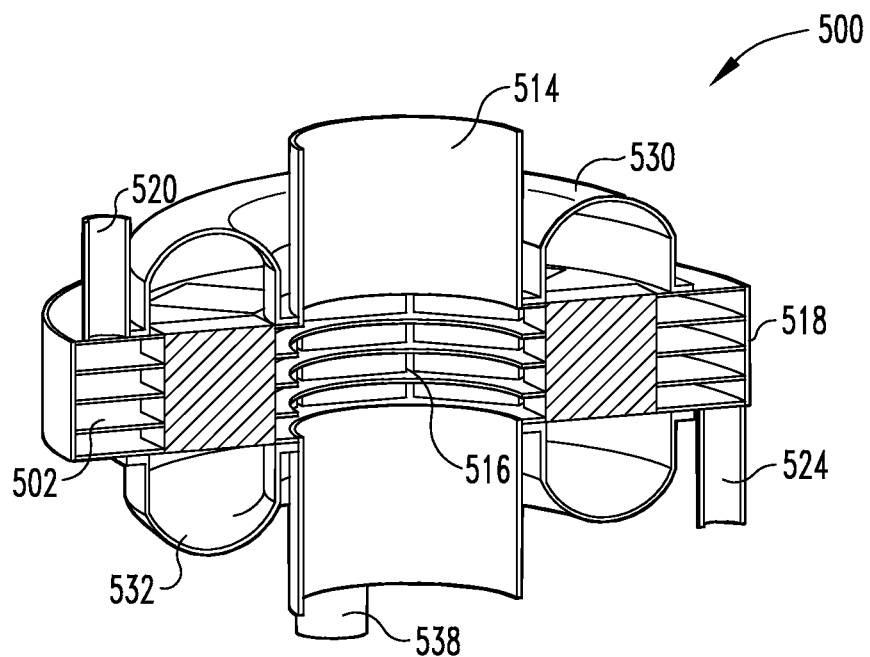
FIG. 38 is an elevated perspective, cross-sectional view of an even further exemplary microchannel unit operation incorporating a bank of microchannel modules.
Figure 39:
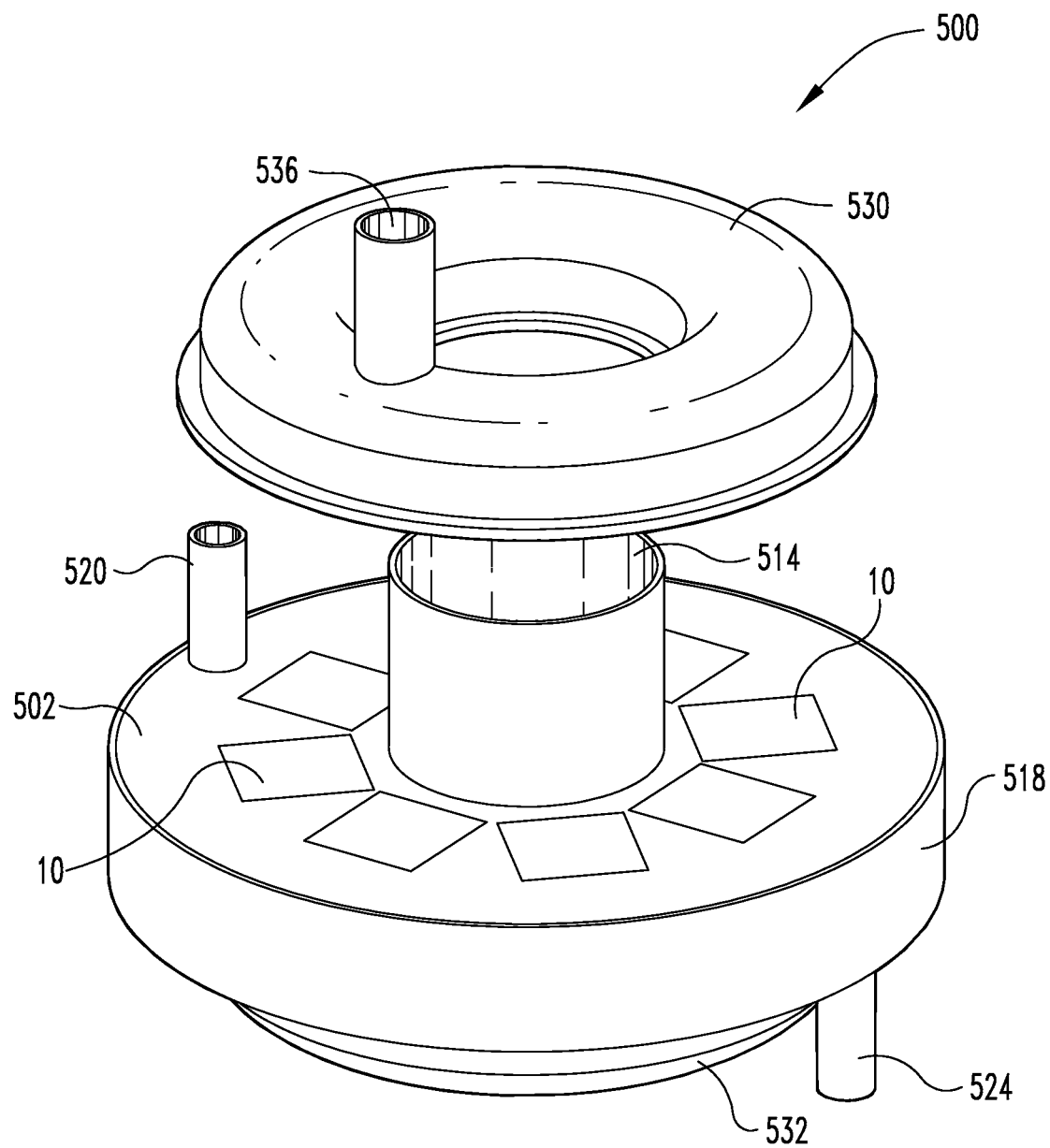
FIG. 39 is a partially exploded view of the microchannel unit operation of FIG. 38.
Figure 40:
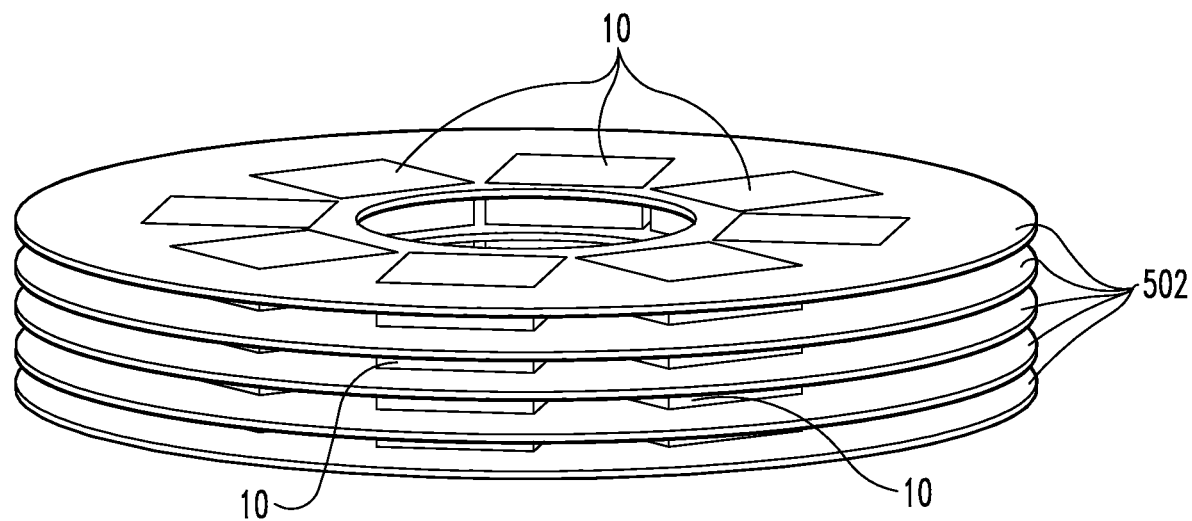
FIG. 40 is an elevated perspective view of the microchannel modules and retention rings incorporated into the microchannel unit operation of FIG. 38.
Figure 42:
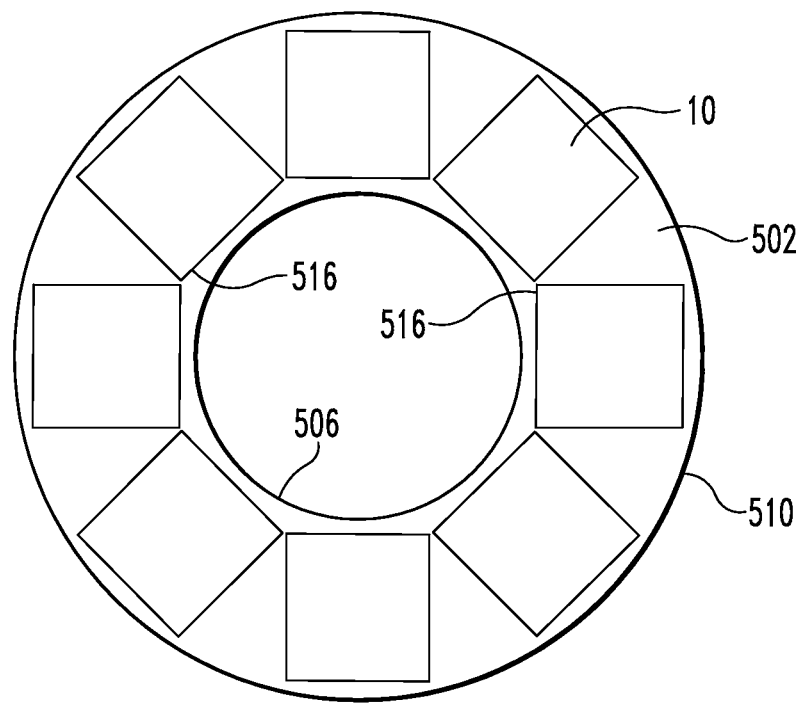
FIG. 42 is an overhead view of the microchannel modules and retention rings of FIG. 40.
Figure 41:
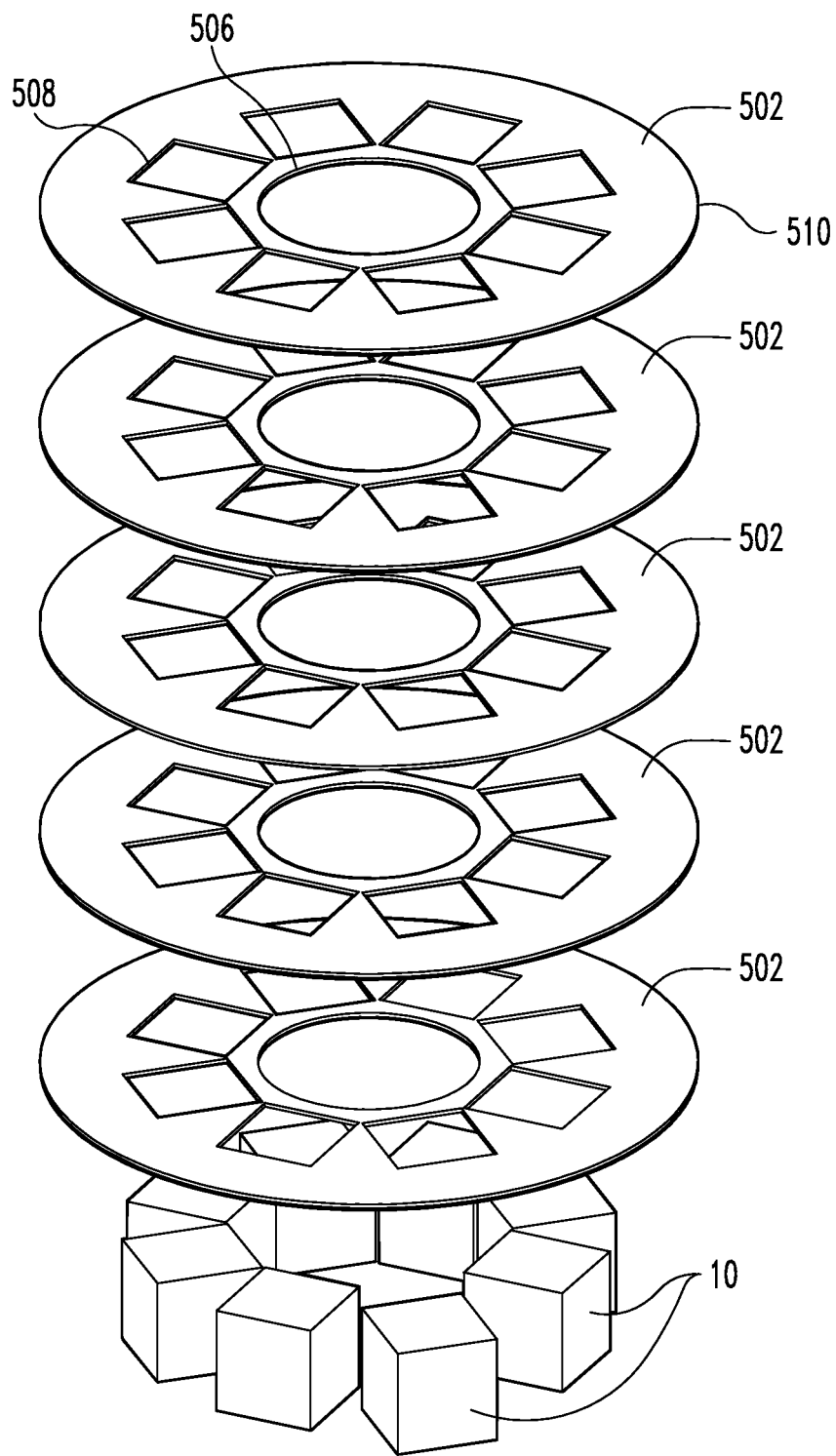
FIG. 41 is an exploded view of the microchannel modules and retention rings of FIG. 40.

Referring to FIGS. 38-42, a plurality of microchannel modules 10 are incorporated into an even further exemplary microchannel unit operation 500. This exemplary microchannel unit operation 500 incorporates eight microchannel modules 10 using a series of retention rings 502 that are vertically spaced apart from one another and welded to the microchannel modules. As shown in FIGS. 40 and 41, five retention rings 502 are equally spaced apart from one another, where the top of the five rings is mounted at the perimeter top edge of each of the modules 10 and the bottom of the five rings is mounted at the perimeter bottom edge of each of the modules. In order to facilitate mounting to the modules 10, each of the retention rings 502 has the same shape. This shape is circular and includes a diameter of 144 inches and a thickness of 0.75 inches. An axially centered circular hole 506 is formed through each retention ring 502. Circumferentially interposing the circular hole 506 are eight square holes 508 that are sized to match the exterior perimeter of the modules 10. In exemplary form, the square holes have a side length of 24 inches. Each of the square holes 508 is equidistantly spaced apart from the other holes 508, but the holes are closer to the circular hole 506 than to the circumferential perimeter 510 of the rings. As will be discussed in more detail below, this additional spacing from the holes 508 to the circumferential edge provides for additional space in order to separate the coolant vapor from the coolant liquid exiting the microchannel coolant subassemblies.

Referencing FIG. 38, in order to ensure fluid communication between an inlet coolant pipe 514 and the interior of the coolant microchannels, a series of vertical dividers 516 interpose the rings 502 and cooperate with the rings to define a rectangular opening that is in sealed fluid communication with the interior of the inlet coolant pipe 514, but is not in ready communication with the exterior of the microchannel module. In this exemplary embodiment, the coolant bathes the microchannel modules 10 and the exterior of the modules is in intimate contact with the coolant exiting the modules, except for the faces in communication with the reactor microchannels. In this exemplary embodiment, the inlet coolant pipe 514 extends through the circular hole 506 of each ring 502 and includes a series of circumferential openings adapted to align with the coolant microchannel subassembly openings of the modules. In this manner, the inlet pipe 514 supplies the coolant to all of the modules 10 at the same time.

In order to capture the coolant exiting the modules 10, the rings 502 are circumferentially bounded by a circular band 518. The top ring 502 also includes a perimeter opening (not shown) that is circumscribed by a coolant vapor outlet pipe 520 in order to collect and draw off coolant vapor exiting the modules 10. Likewise, the bottom ring 502 includes a perimeter opening (not shown) that is circumscribed by a coolant liquid outlet pipe 524 in order to collect and draw off coolant liquid exiting the modules 10.

Referring to FIGS. 38 and 39, interposing the inlet coolant pipe 514 and the outlet coolant pipes 520, 524 are a pair of caps 530, 532 operative to distribute reactants to the reactor microchannels take products away that exit the reactor microchannels. More specifically, each cap 530 includes a circular, semi-cylindrical shape that is convex on the outside and concave on the interior. The interior is in fluid communication with the inlet side of each of the reactor microchannels of the modules 10 and receives reactants via a sealed fluid connection with an inlet pipe 536. After the reactants have been reacted within the reactor microchannels, the outlet from these microchannels is collected in the second cap 532. Similar to the inlet cap 530, the outlet cap 532 comprises a circular, semi-cylindrical shape that is convex on the outside and concave on the interior. In order to outlet products from the outlet cap 532, an outlet pipe 538 is welded to the outlet cap to create a fluid tight seal therebetween and communication between the interior of the outlet cap and the interior of the outlet pipe. In particular, each cap 530, 532 is welded circumferentially to the respective ring 502 in order to ensure a fluid tight seal between the cap and ring. In this manner, fluid entering or exiting the reactor microchannels is not mixed with the coolant fluid.

Figure 43:
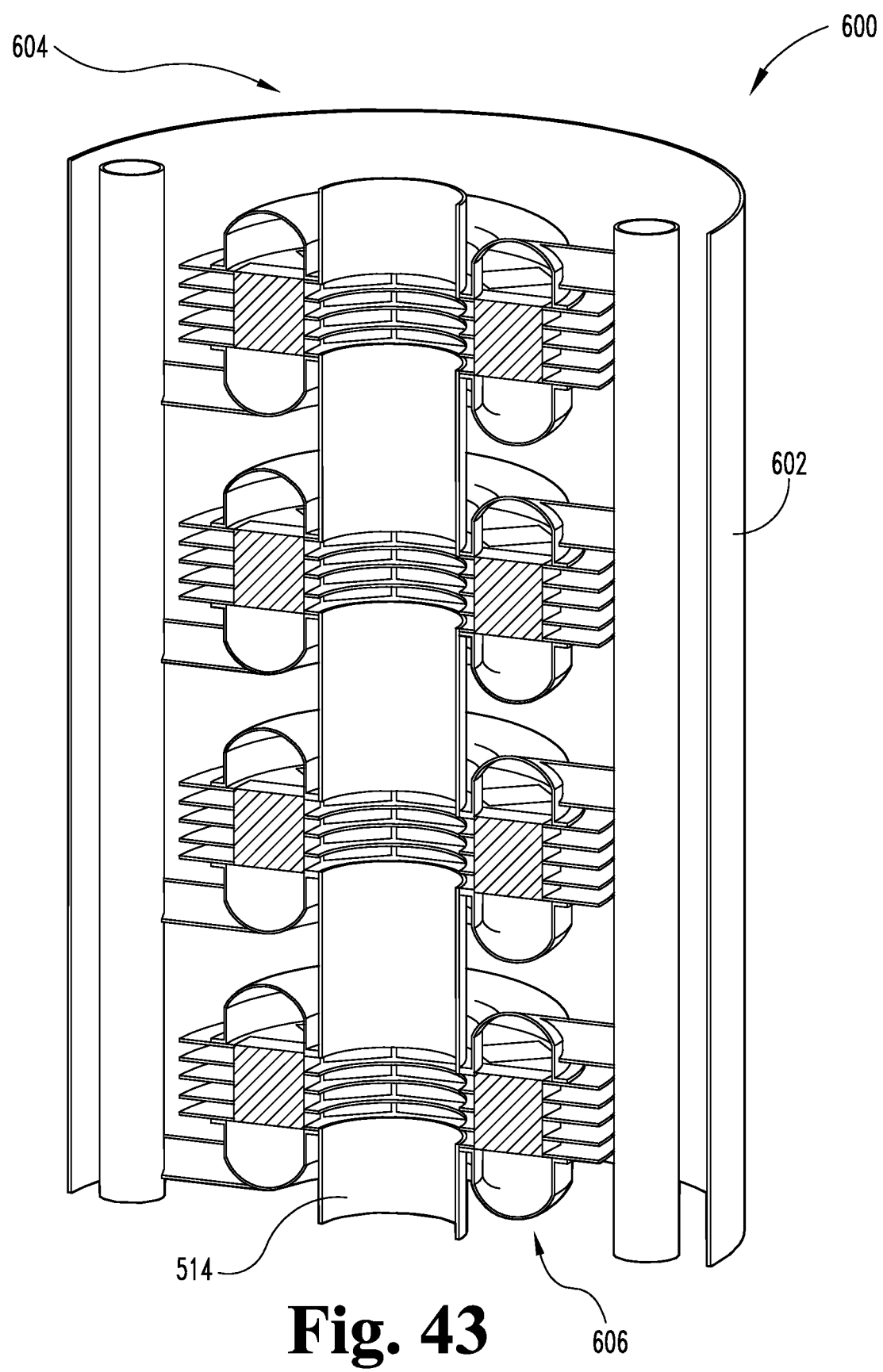
FIG. 43 is an exemplary tower incorporating a plurality of exemplary microchannel unit operations shown in FIG. 38.

Referencing FIG. 43, an exemplary tower 600 incorporates a plurality of microchannel unit operations 500, with some minor modifications. Instead of using circular band 518 to bound the rings 502, the tower makes use of a cylindrical housing 602 that includes a coolant vapor outlet 604 at the top and a coolant liquid outlet 606 at the bottom. Similarly, the same coolant inlet pipe 514 supplies coolant to each of the unit operations 500. And the tower 600 also uses a common reactant inlet pipe 536 for each of the unit operations 500, while a common product outlet pipe 538 is similarly used for each of the unit operations. Otherwise, the components and operation of the unit operations remains unchanged.

Figure 44:
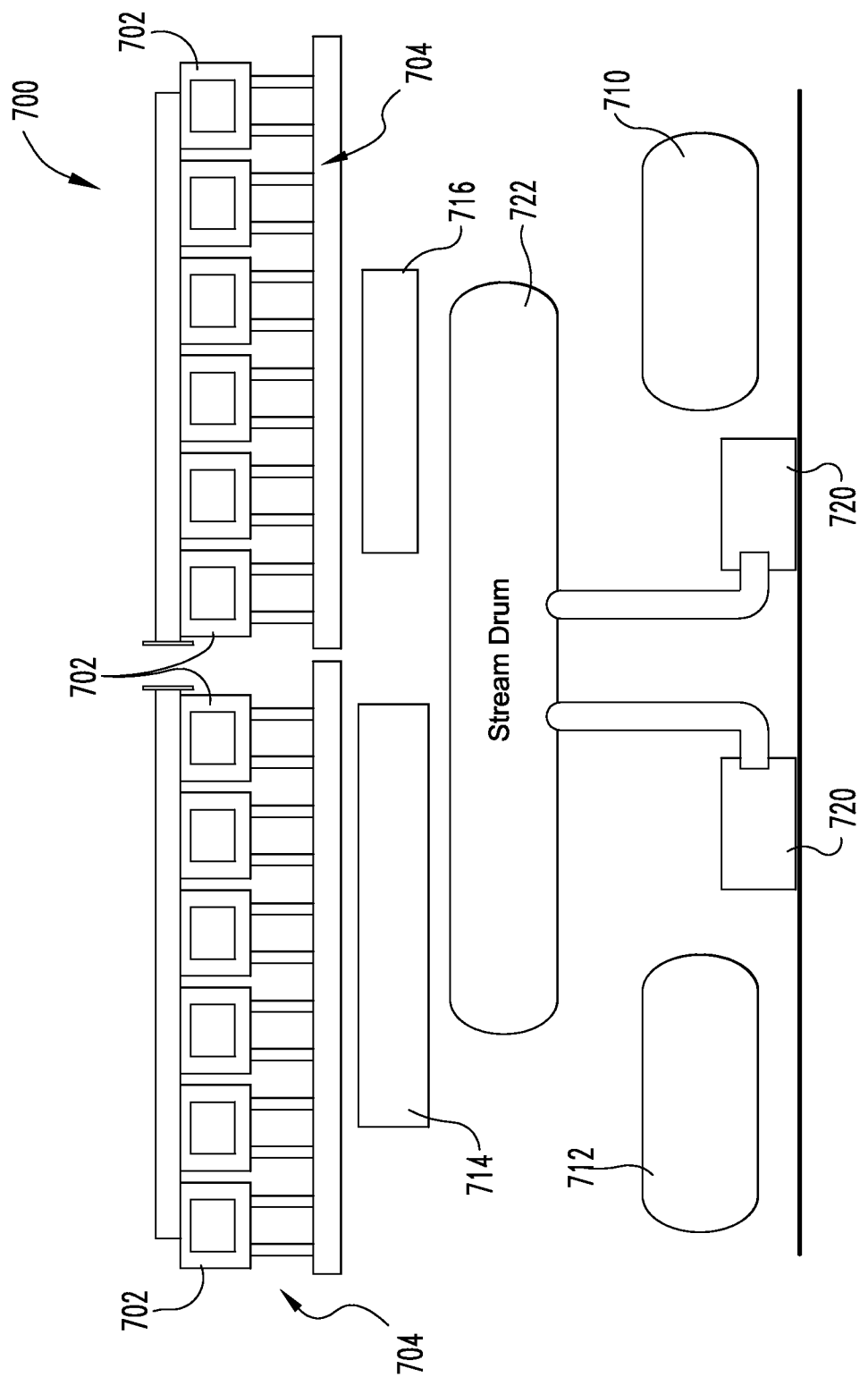
FIG. 44 is an exemplary layout schematic showing how the exemplary embodiments may be integrated with commercially available components.
Figure 46:
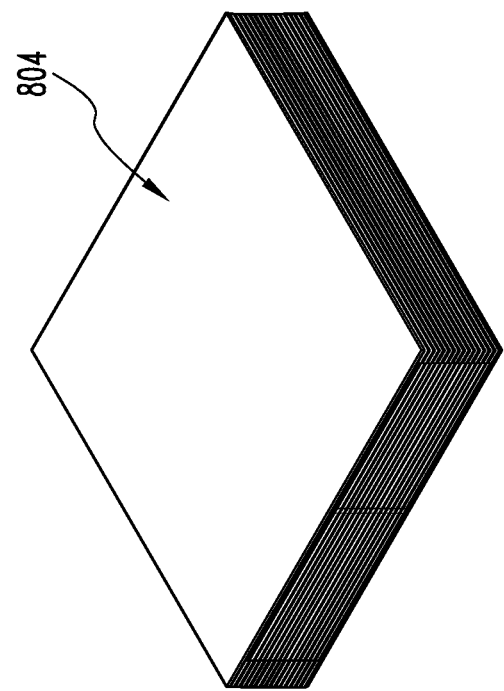
FIG. 46 is an elevated perspective view of the sub-stack of FIG. 45.
Figure 45:
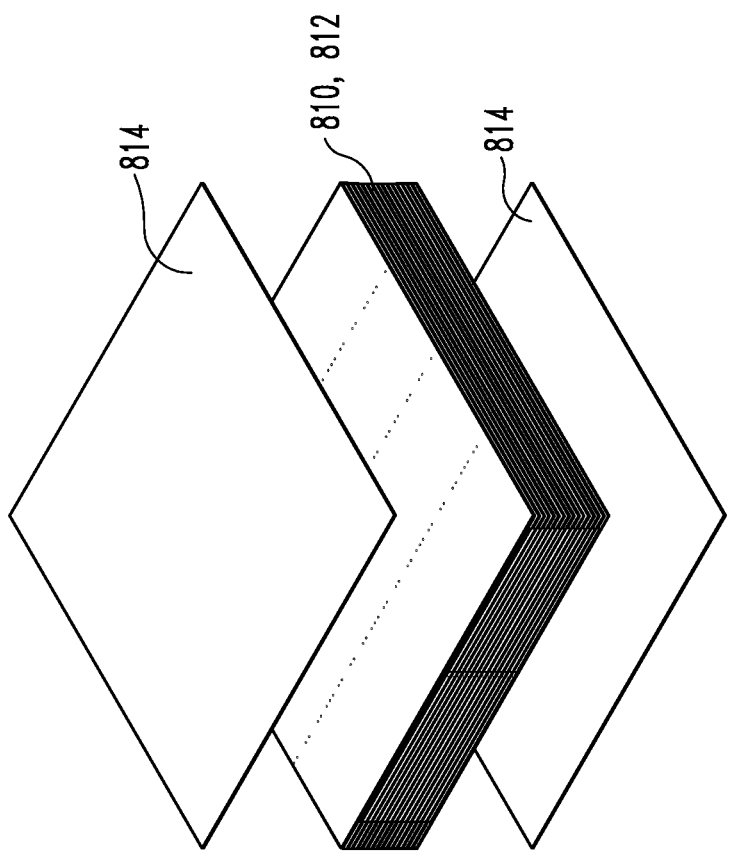
FIG. 45 is an exploded view of a sub stack
Figure 48:
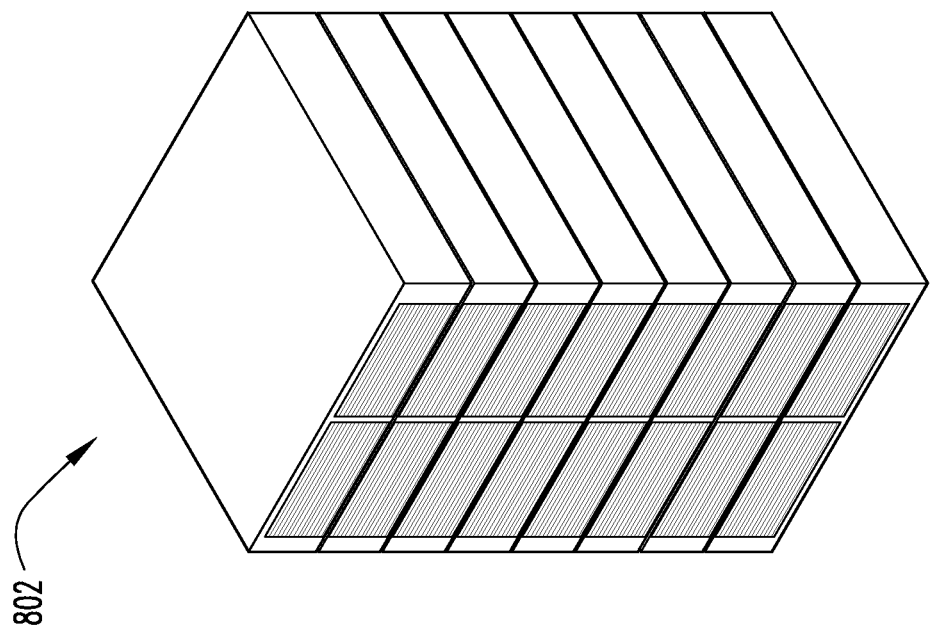
FIG. 48 is an elevated perspective view of an exemplary core.
Figure 47:
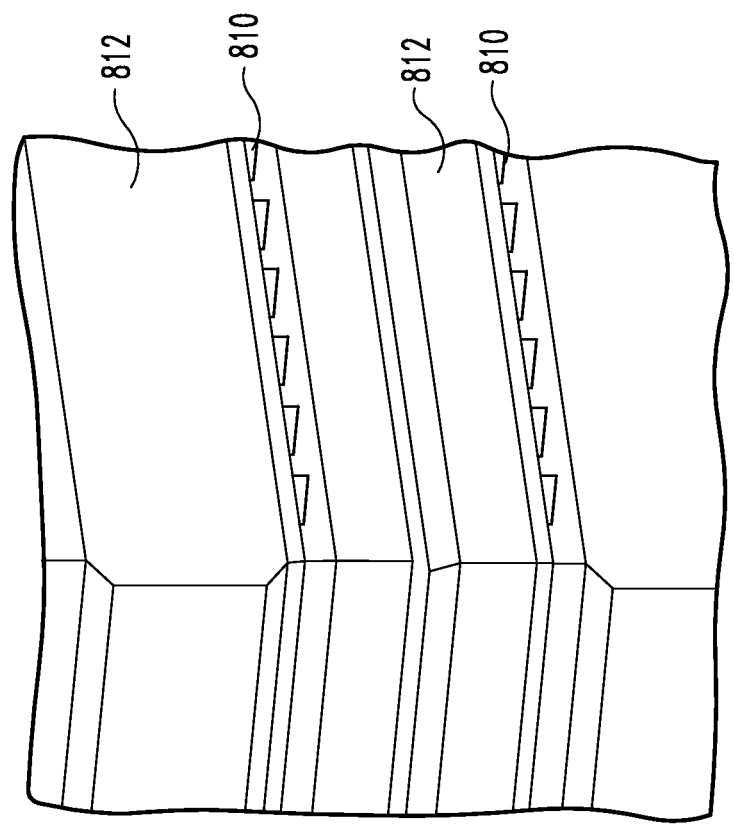
FIG. 47 is a magnified view of a corner of the sub-stack of FIG. 45.

Referring to FIG. 44, an exemplary schematic 700 shows how the exemplary embodiments may be integrated with commercially available components to provide a working FT plant. In exemplary form, one or more modules 10 (see FIG. 1) may be incorporated into a microchannel unit operation 702. In exemplary form, the modules are FT reactor microchannels with coolant channels interposing the reactor microchannels. These unit operations 702 may be arranged in a bank 704 to comprise a plurality of unit operations. Each bank 704 may be fabricated as a standalone assembly or incorporated into a larger microchannel assembly. In exemplary form, a plurality of banks 704 are fabricated and positioned on a readily portable structure, such as a skid. This portable structure includes the requisite piping connections to receive at least one coolant inlet stream, at least one coolant outlet stream, at least one FT reactant stream, and at least one FT product stream. In exemplary form, the FT product stream may be directed to a FT liquid-vapor separator 710 and/or a FT wax vapor-liquid separator 712. Each of these devices 710, 712 may also be connected to a respective FT wax condenser 714 and a FT liquid condenser 716. In order to cool the coolant exiting the banks 704, the outlet coolant stream may be directed by a coolant pump 720 through a steam drum 722 and thereafter returned to the inlet coolant side of the banks. Obviously, the schematic does not include all of the requisite piping, but is shown merely to show how the microchannel devices disclosed herein may be incorporated with commercially available process equipment to comprise a small footprint FT plant, with the same or greater FT product output.

Referring to FIGS. 45-48 and 53, an exemplary microchannel reactor 800 includes a plurality of cores 802, where each core 802 comprises a plurality of sub-stacks 804. Each sub-stack 804 comprises a plurality of stacks 806 that are fabricated in accordance with the process previously described to fabricate the microchannel module device 10, which included a plurality of microchannel coolant and reaction subassemblies 12, 14 (with the exception that each exemplary reaction subassembly 812 includes two waveforms 44 instead of the three waveforms described as part of the previous reaction subassembly 14).

In exemplary form, each stack 806 comprises alternating microchannel coolant and reaction subassemblies 810, 812 that are thirty layers thick (fifteen microchannel coolant subassemblies 810 and fifteen reaction subassemblies 812). The edges of the subassemblies 810, 812 are chamfered to allow for perimeter welding to joint the subassemblies to one another. At the top and bottom of each stack 806, a metal spacer sheet 814 is mounted thereto, having a thickness of approximately 0.125 inches, to construct a sub-stack 804. Upon completion of each sub-stack 804, the exemplary dimensions are 24.0 inches in length, 24.0 inches in width, and 5.0 inches in height.

A plurality of sub-stacks 804, in exemplary form eight sub-stacks, are stacked together so that the coolant subassembly's 810 inlets are all arranged on a single side, while the coolant subassembly's 810 outlets are all arranged on an opposite side. Similarly, the plurality of sub-stacks 804 are stacked together so that the reaction subassembly's 812 inlets are all arranged on a single side, while the reaction subassembly's 812 outlets are all arranged on an opposite side. In this manner, the direction of fluid flow into and out of each sub-stacks 804 is the same, thereby making fluid distribution to the subassemblies 810, 812 simplified. Each of the metal spacer sheets 814 is chamfered to provide for peripheral welding of adjacent spacer sheets to join the sub-stacks 804 to one another to create the core 802. In this exemplary embodiment, the core 802 has exemplary dimensions of 24.0 inches in length, 24.0 inches in width, and 40.0 inches in height.

Figure 50:
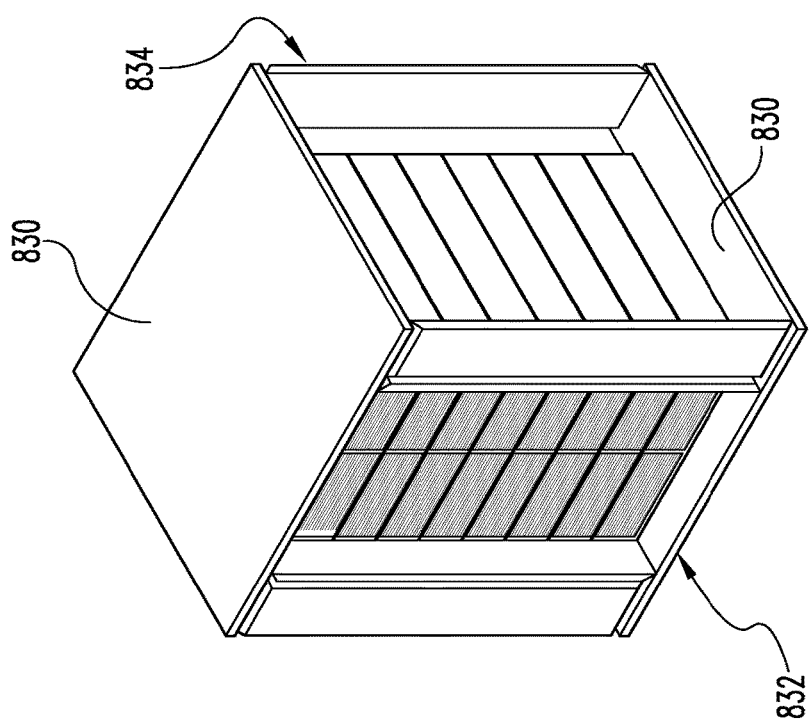
FIG. 50 is an elevated perspective view of the assembled core and boundary supports.
Figure 49:
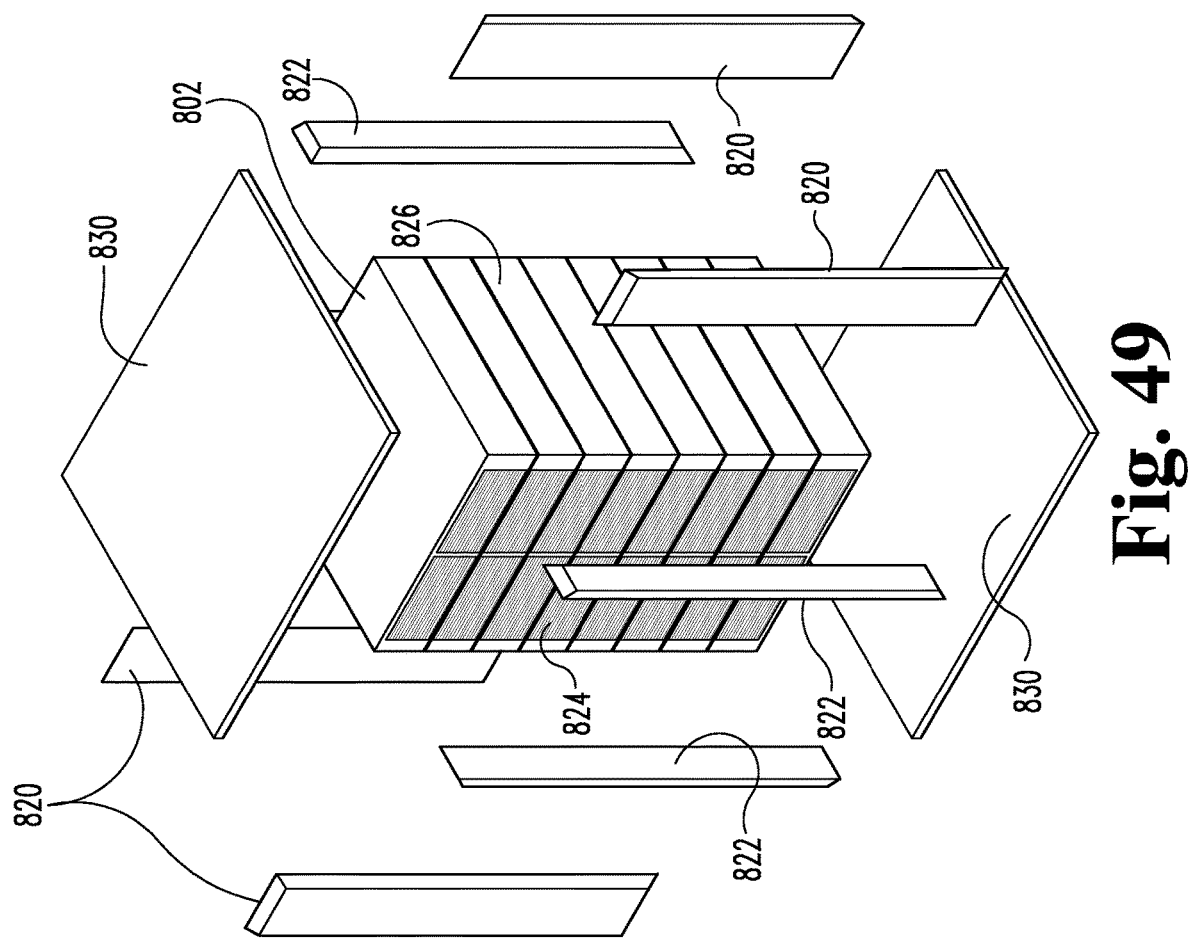
FIG. 49 is an exploded view of the exemplary core of FIG. 48 with boundary supports.

Referring to FIGS. 49 and 50, the exemplary core 802 is mounted to a series of rectangular boundary supports 820, 822 having chamfered edges and having lengths that are substantially the same dimension as the core's thickness. In this embodiment, there are four coolant boundary supports 820 each having a length of 40.0 inches, a width of 6.5 inches and a thickness of 1.5 inches. There are also four reactant boundary supports 822 each having a length of 40.0 inches, a width of 4.0 inches and a thickness of 1.0 inches. Each of the four reactant boundary supports 822 is vertically oriented along its length and positioned to extend perpendicularly away one of the reactant faces 824. In particular, the far edge of each reactant face 824 is welded along the length of one side of a corresponding reactant boundary support 822. In addition, each of the four coolant boundary supports 820 is vertically oriented along its length and positioned to extend perpendicularly away from a corresponding reactant boundary support 822. More specifically, a lengthwise end (not welded to the core 802) of each reactant boundary support 822 is welded to a lengthwise end of a corresponding coolant boundary support 820, thereby extending perpendicularly with respect to a respective coolant face 826. Corresponding top and bottom rectangular plates 830 are mounted to the respective flat top and bottom surfaces of the core 802 and oriented so that the lengthwise dimension of each plate overlaps each reactant face 824 of the core by 4.0 inches and the widthwise dimension overlaps each coolant face 824 the core by 6.5 inches. Likewise, the respective ends of the rectangular boundary supports 820, 822 are mounted to the rectangular plates 830 to create a rectangular halo. In exemplary form, the reactant side rectangular halo 832 has a dimension of 42.0 inches in length, 24.0 inches in width, and 4.0 inches in height, while the coolant side rectangular halo 834 has a dimension of 42.0 inches in length, 32.0 inches in width, and 4.0 inches in height.

Figure 51:
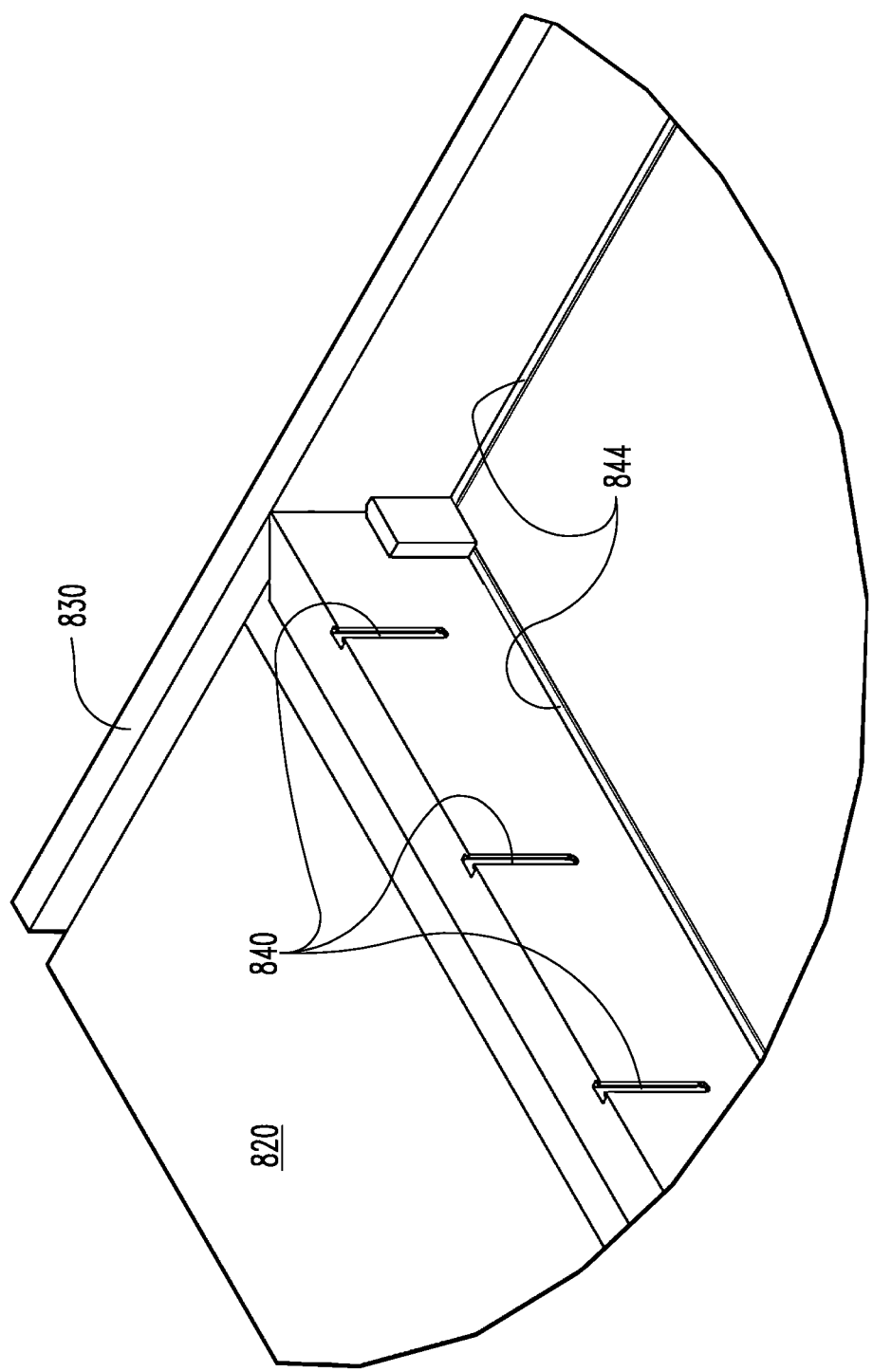
FIG. 51 is a magnified, elevated perspective view of a joint where a reactant boundary support is mounted to a bottom plate.

Referencing FIG. 51, each of the four reactant boundary supports 822 includes a series of T-shaped vertical channels 840 that are spaced apart from one another along the length of each support. In exemplary form, the channels 840 of complimentary reactant boundary supports 822 are adapted to face one another along the interior perimeter of the reactant side halo 832 and be aligned with one another. As will be discussed in more detail hereafter, each of these channels 840 is adapted to receive the end of a stainless steel bolt 856. The dimensions of the T-shaped vertical channel 840 are chosen to allow for the head and shaft of the bolt 856 to be vertically repositionable, but inhibit the head of the bolt from being rotated while received within the channel. Beneath the T-shaped vertical channels 840, a lengthwise rectangular notch 844 is formed within each support 822. In exemplary form, the notches 844 of complimentary reactant boundary supports 822 are adapted to face one another and be aligned with one another along the interior perimeter of the reactant side halo 832. Likewise, the top and bottom plates 830 also include lengthwise rectangular notch 844 along the interior perimeter of the reactant side halo 832.

Figure 52:
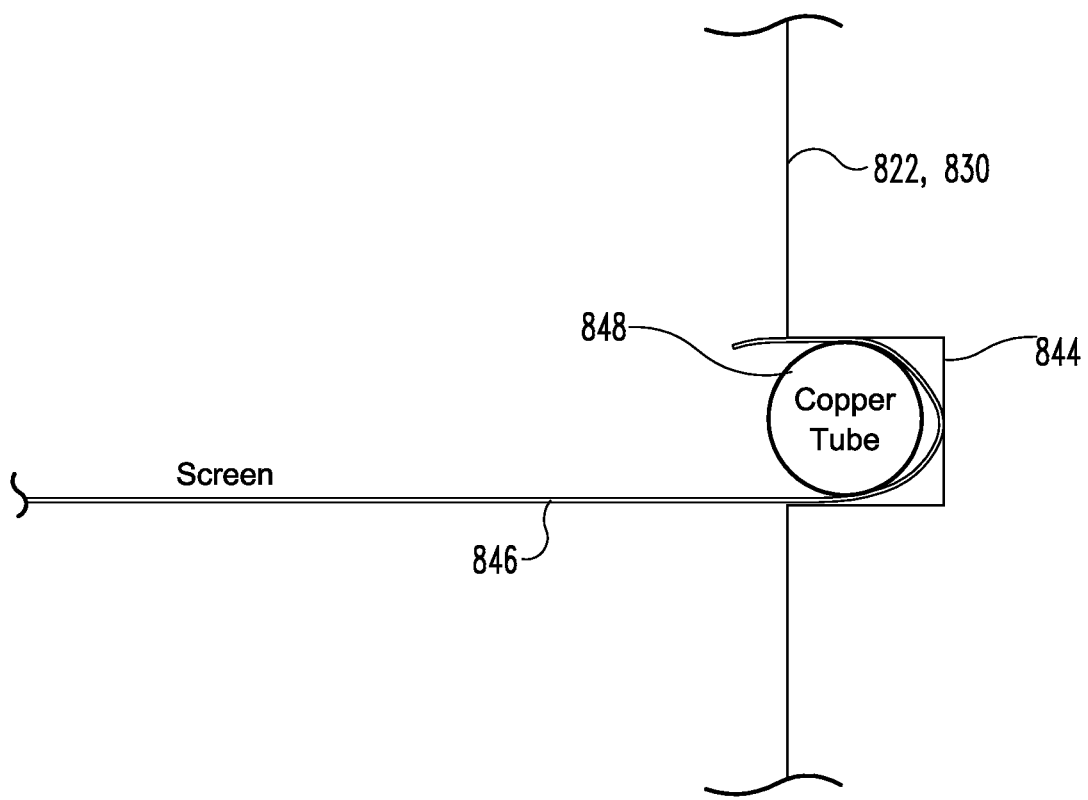
FIG. 52 is an illustration of a profile view showing how the screen is wrapped around a tube a secured within the peripheral notch using a friction fit.
Figure 53:
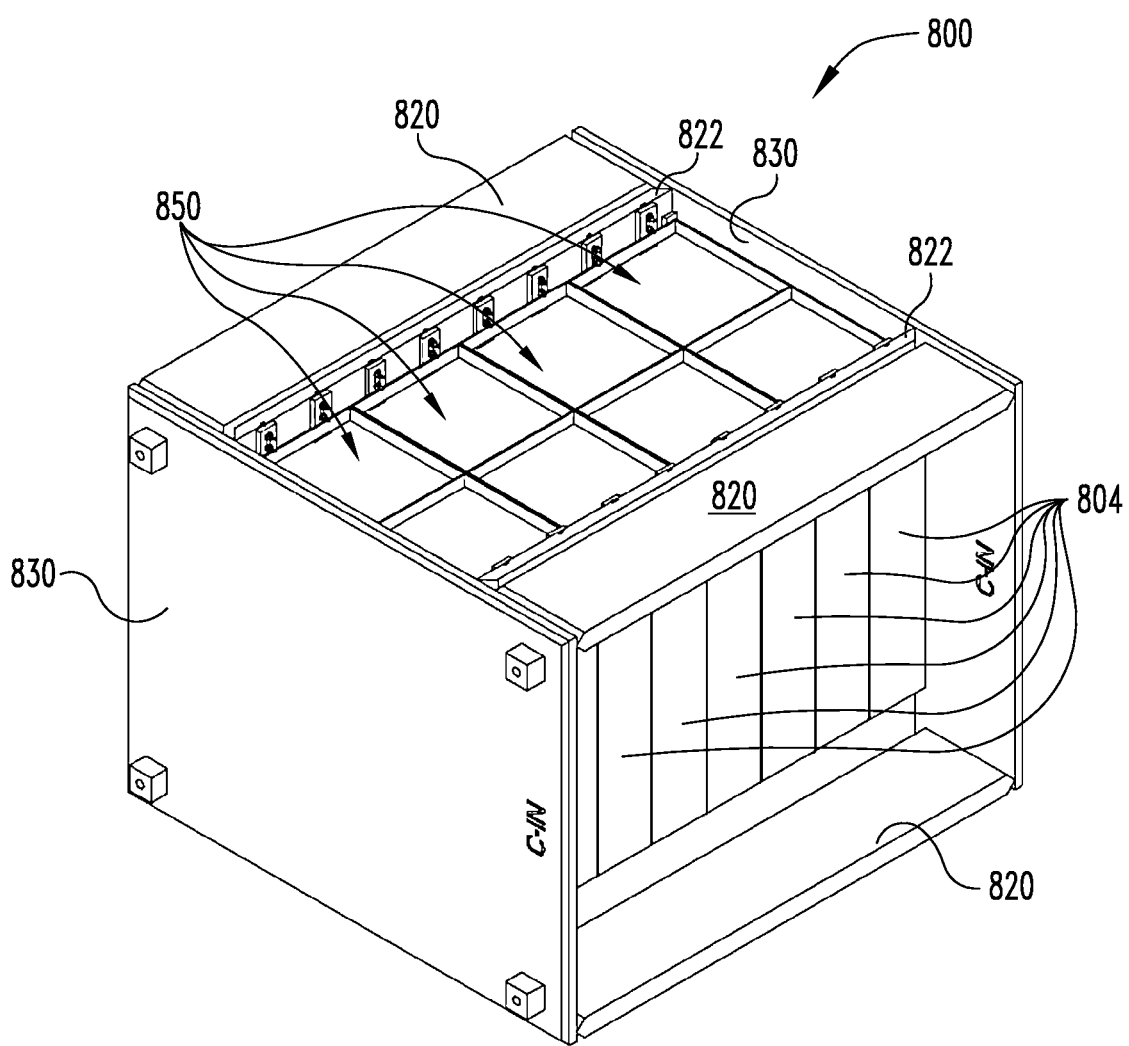
FIG. 53 is an elevated perspective view of an exemplary microchannel reactor.
Figure 54:
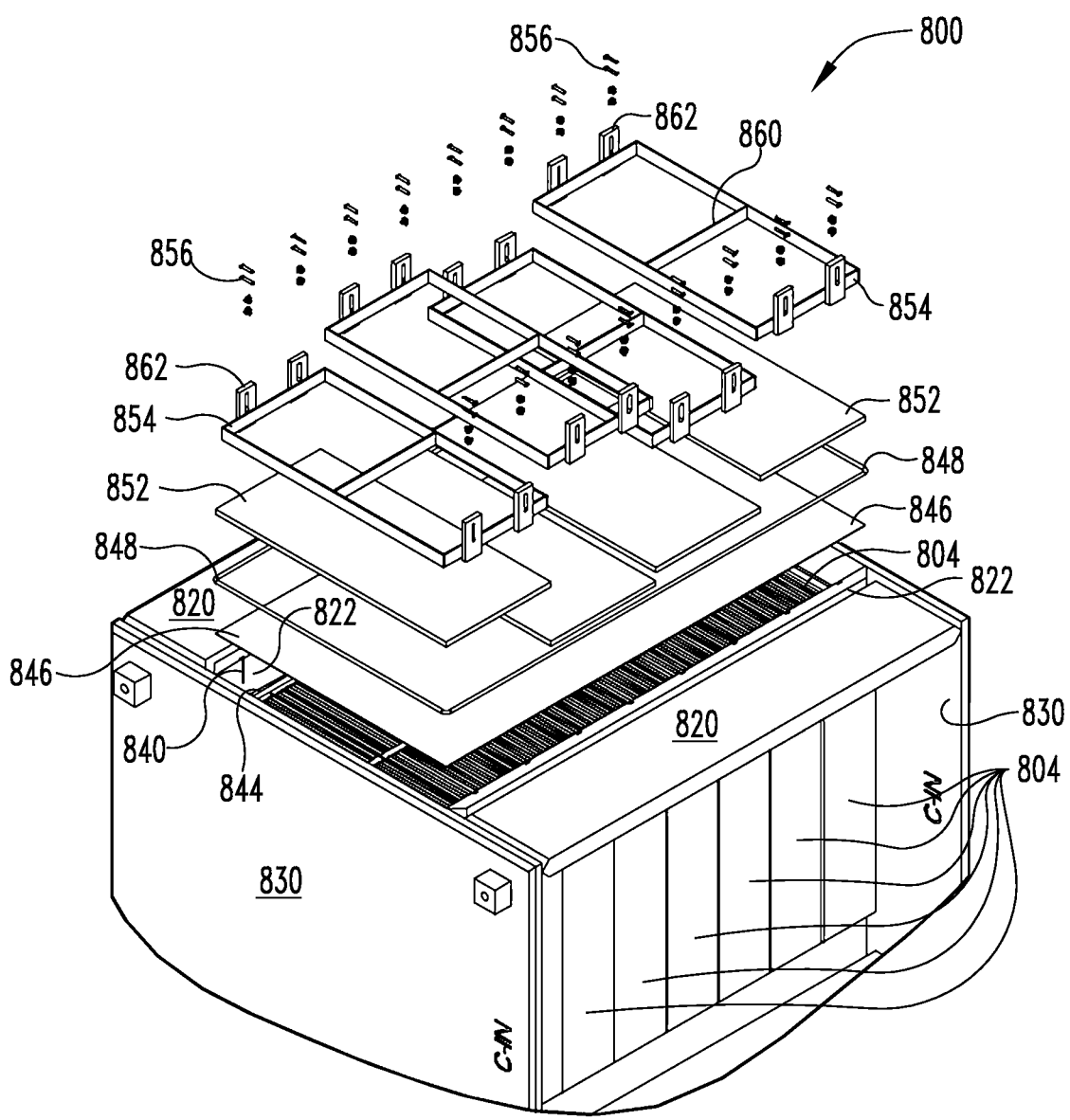
FIG. 54 is a partial exploded view of the exemplary microchannel reactor of FIG. 53.
Figure 55:
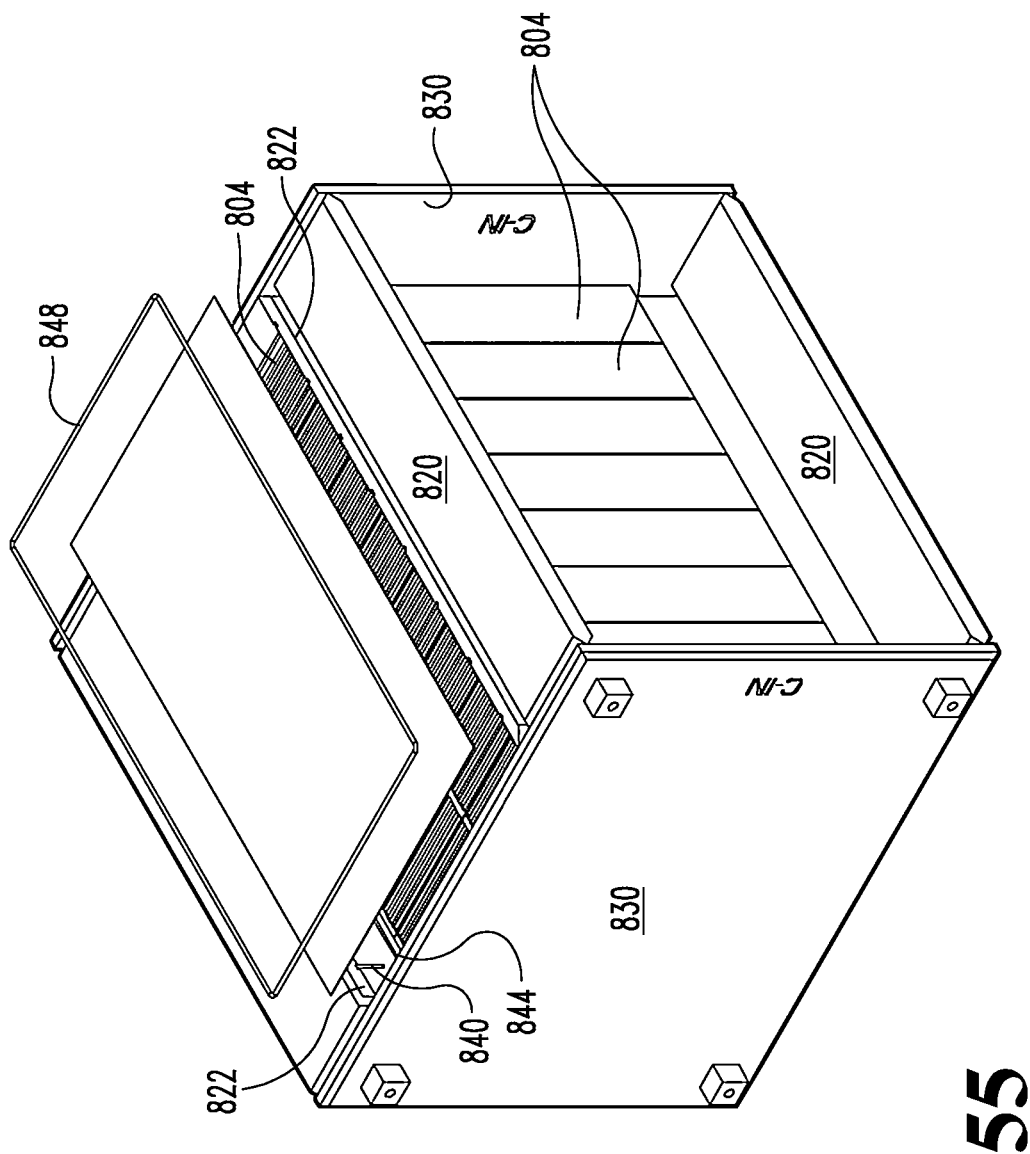
FIG. 55 is a partial exploded view of the exemplary microchannel reactor during a sequence in the build phase.
Figure 56:
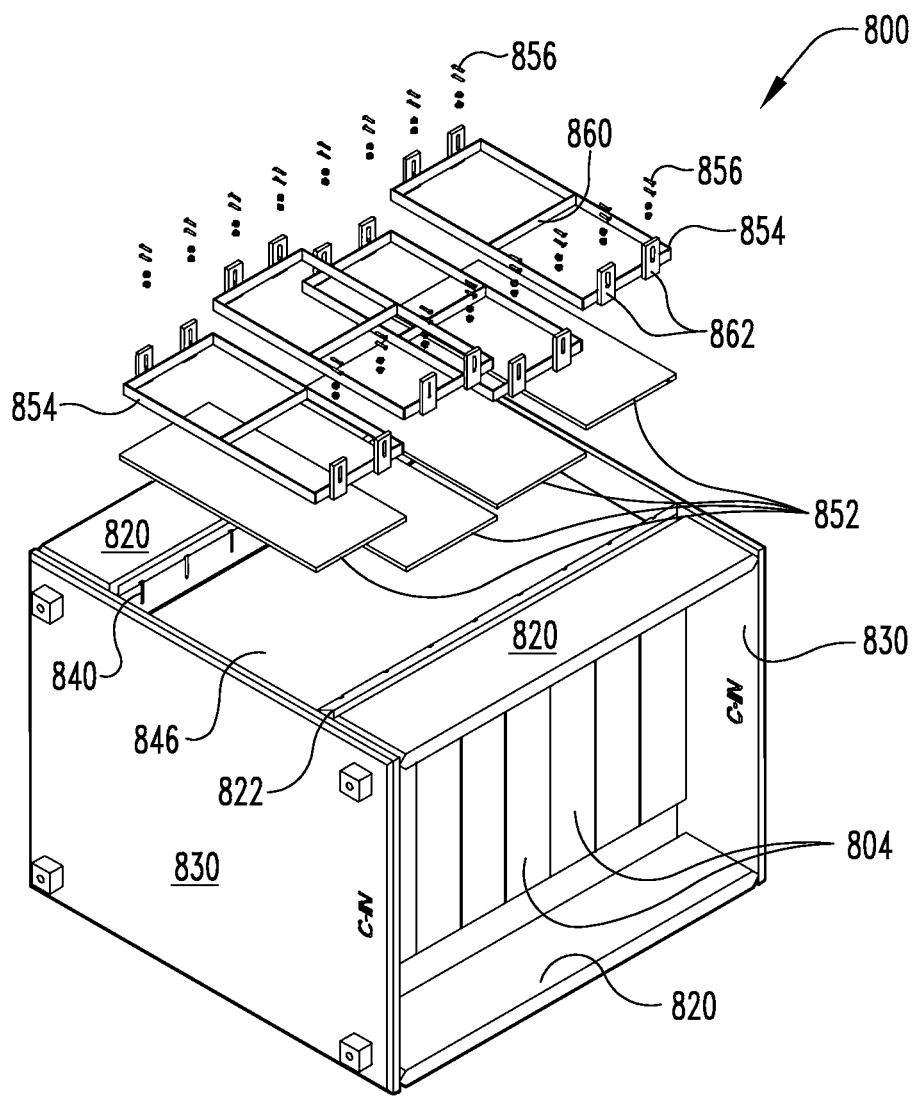
FIG. 56 is a partial exploded view of the exemplary microchannel reactor during a later sequence in the build phase.

As shown in FIG. 52, the rectangular notch 844 is sized to longitudinally receive a catalyst screen 846 that is partially wrapped around a hollow tube 848. In this exemplary embodiment, the screen 846 comprises a stainless steel mesh having an average particle opening of 0.023 inches (i.e., mesh size of 270×270, using 0.0014 diameter wire), while the tube 848 comprises 96 gauge (0.006 inches in wall thickness) copper pipe. In this manner, the diameter of the tube 848 and the thickness of the screen 846 are cooperate to occupy the widthwise dimension of the notch 844 so that when the tube (with the screen 846 wrapped therearound) is inserted into the notch, a significant amount of force is necessary to push the tube into the interior of the notch, thereby creating a friction fit to retain the screen generally taut in between opposed notches.

Referring to FIGS. 53-56, the exemplary microchannel reactor 800 includes a pair of retention subassemblies 850 in order to retain particulate catalyst within microchannels of the reaction subassemblies 812. It should be noted that the retention subassemblies 850 are mirror images of one another, with one subassembly positioned on the inlet side of the reaction subassemblies 812, while the second subassembly is positioned on the outlet side of the reaction subassemblies 812. Accordingly, a discussion of only one of the subassemblies 850 will be provided in furtherance of brevity.

In this exemplary embodiment, each retention subassembly 850 comprises a screen 846, a rectangular tube 848 frame, four porous foam inserts 852, and four retention frames 854, along with corresponding fasteners 856 to secure the frames to the reactant boundary supports 822. As discussed previously, the screen 846 is wrapped around the rectangular tube frame 848 and inserted into the notches 844 along the interior perimeter of the reactant side halo 832.

After the screen 846 is installed, the four porous foam inserts 852 are laid on top of the screen 846, adjacent one another, to cover the area of the screen coming in contact with the particulate catalyst (not shown). It should be noted that greater than four foam inserts 852 or less than four foam inserts may be used so long as the area of the screen 846 coming in contact with the particulate catalyst is substantially covered. In this exemplary embodiment, each foam insert 852 comprises foamed stainless steel having a pore size of 65 pours per linear inch and a tolerance of 0.006 inches for the length, width, and thickness. The foam inserts 852 act as a support for the more easily deformable screen 846.

In order to retain the inserts 852 in position, the exemplary retention subassemblies 850 include four retention frames 854 and corresponding fasteners 856 used to secure the retention frames to reactant boundary supports 822. In exemplary form, there is provided a single retention frame 854 for each foam insert 852, but it should be noted that this ratio is not required. In other words, multiple retention frames 854 may be provided for a single foam insert 852 or a single retention frame may be provided for multiple foam inserts. In this exemplary embodiment, the retention frames 854 are fabricated from stainless steel and comprise a rectangular shape and a vertical stiffening rib 860. At the ends of the rectangular frame 854 are a series of tabs 862 having longitudinal slots to accommodate throughput of a threaded end of a bolt 856. This longitudinal slot provides vertical adjustability of the bolt 856 with respect to the frame 854. In exemplary form, eight bolts and corresponding nuts are used to mount each frame 854 to the opposing reactant boundary supports 822. More specifically, each bolt head 856 is inserted into a corresponding T-shaped vertical channel 840 of a reactant boundary support 822 so that the threaded end of the bolt extends through the longitudinal slot of the tab 862. Thereafter, the frame 854 is pushed flush against the foam insert 852 and the nut 856 is tightened with respect to the bolt to retain the frame in this position. This process is repeated until each frame 854 is secured in position.

As will be discussed in more detail hereafter, catalyst housed within the reaction microchannels of the reaction subassemblies 812 may need to be replaced or regenerated. In either instance, this will most likely require removal of the catalyst from the reaction microchannels. But before this can be accomplished, at least one of the retention subassemblies 850 (preferably both subassemblies) will need to be removed to gain access to the catalyst. In order to remove each subassembly 850, one would follow the opposite process discussed previously for installing the subassembly. Namely, the frames 854 would be removed, thereafter the foam inserts 852 would be removed, and then the screen 846 would be removed last, thus providing direct access to the catalyst within the reactant microchannels.

Referencing FIGS. 57-63, multiple microchannel reactors 800 may be mounted to one another as part of a microchannel unit 870. The following is a discussion describing how one may utilize multiple microchannel reactors 800 to fabricate a microchannel unit 870.

Figure 57:
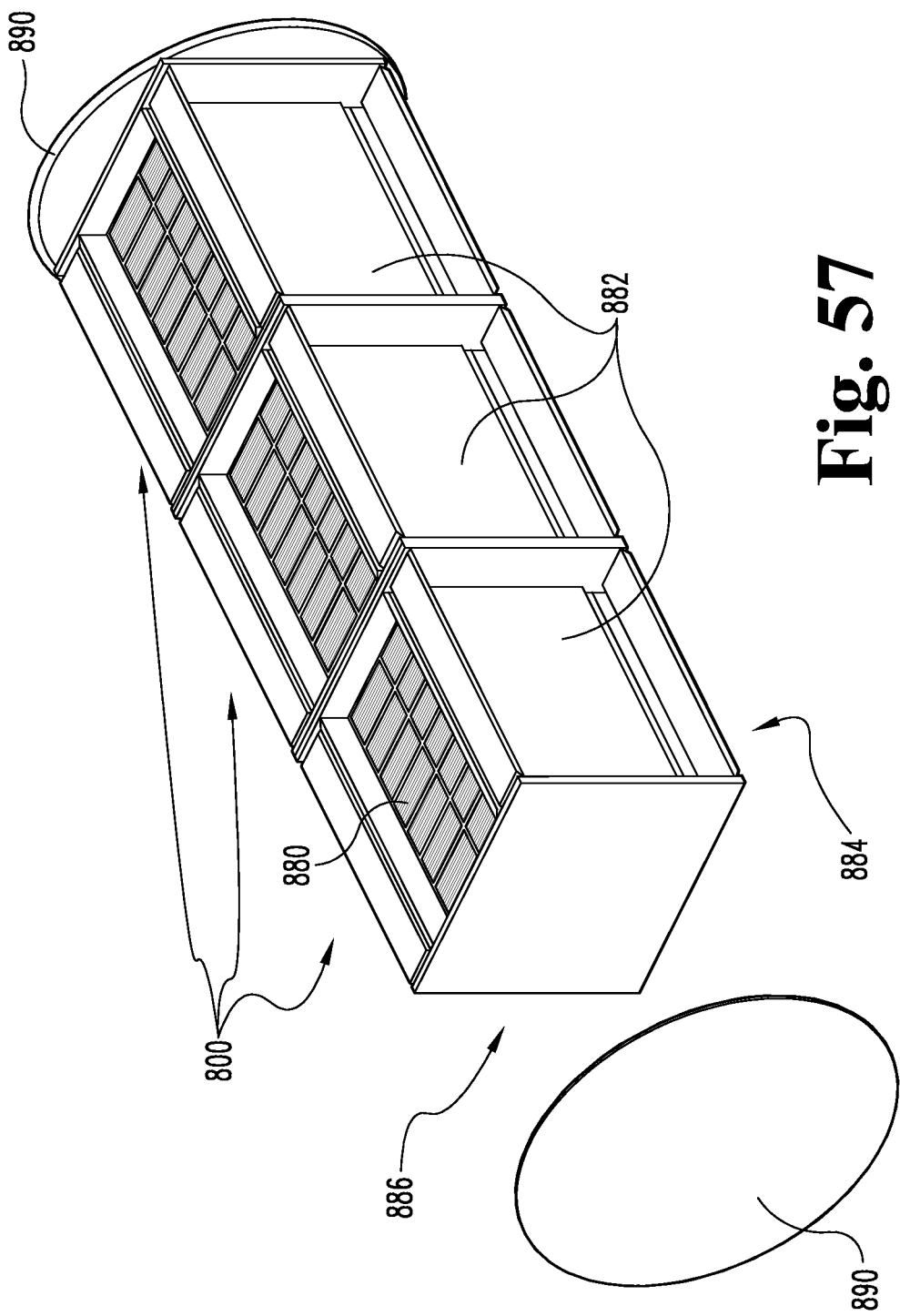
FIG. 57 is an elevated perspective view of a series of joint microchannel reactors just prior to joining of the second circular end plate.

Referring to FIG. 57, three microchannel reactors 800 are positioned end to end and mounted to one another (shown without the retention subassemblies 850). In exemplary form, each microchannel reactor includes four sides, with a first side comprising a reactant inlet side 880, a second side (angled 90 degrees with respect to the first side) comprising a coolant inlet side 882, a third side (angled 90 degrees with respect to the second side and 180 degrees with respect to the first side) comprising a product outlet side 884, and a fourth side (angled 90 degrees with respect to the third side and 90 degrees with respect to the first side) comprising a coolant outlet side 886. And the four sides are aligned so that when the microchannel reactors 800 are mounted to one another, all of the reactant inlets 880 are on the same side, as are the coolant inlets 882, the product outlets 884, and the coolant outlets 886. After aligning and mounting the microchannel reactors 800 to one another, circular end plates 890 are mounted to the exposed top and bottom of reactors. At this point, the configuration shown in FIG. 57 may follow a plurality of fabrication paths.

Figure 58:
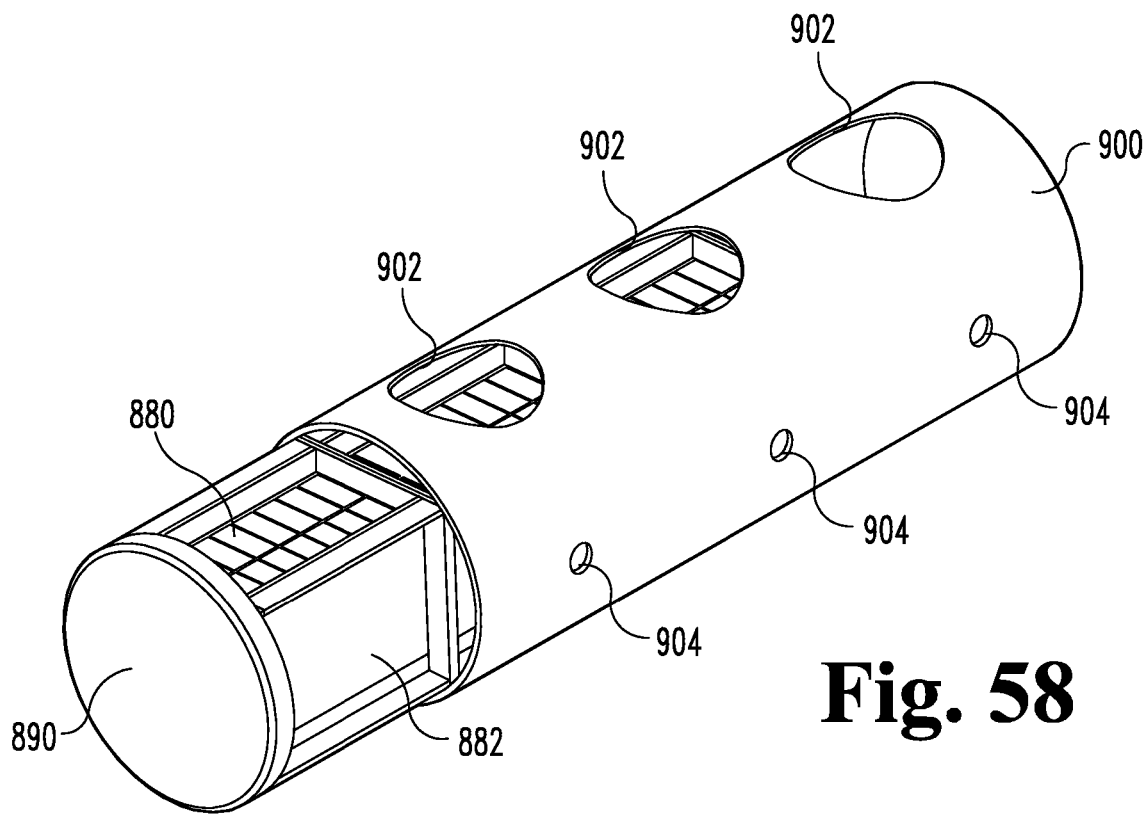
FIG. 58 is an elevated perspective view of the structure of FIG. 57, shown with a shell.

A first of these fabrication paths is documented in FIG. 58. In exemplary form, the microchannel reactors 800 and circular end plates 890 are inserted axially into a cylindrical shell 900 so that the longitudinal ends of the shell are substantially flush with the circular end plates. This cylindrical shell 900 has a longitudinal, horizontal circular cross-section and is pre-processed to include a series of openings 902, 904. A first of these openings 902 is repeated six times and comprises a rather large circular opening. These openings 902 are longitudinally spaced apart on opposing sides (three on each side) of the shell 900 in order to provide three openings to the reactant inlet side 880 of the three microchannel reactors 800 and three opening to the product outlet side 884 of the microchannel reactors. A second of these openings 904 is repeated nine times and comprises a smaller circular opening. These openings 904 are longitudinally spaced apart on opposing sides of the shell 900 in order to provide three openings to the coolant inlet side 882 of the three microchannel reactors 800 and six opening to the coolant outlet side 886 of the microchannel reactors. After the shell is properly positioned, as described above, the shell is mounted to the microchannel reactors 800 and circular end plates 890 so that fluid entering the three openings 902 nearest the reactant inlet side 880 is not in communication with either the coolant inlet side 882 or the coolant outlet side 886. Similarly, fluid entering the three openings 904 nearest the coolant inlet side 882 is not in communication with either the reactant inlet side 880 or the product outlet side 884. Consequently, each of the four sides 880-886 is isolated from one another except communication existing within the microchannel reactors 800. The completed assembly is shown in FIG. 61

Figure 59:
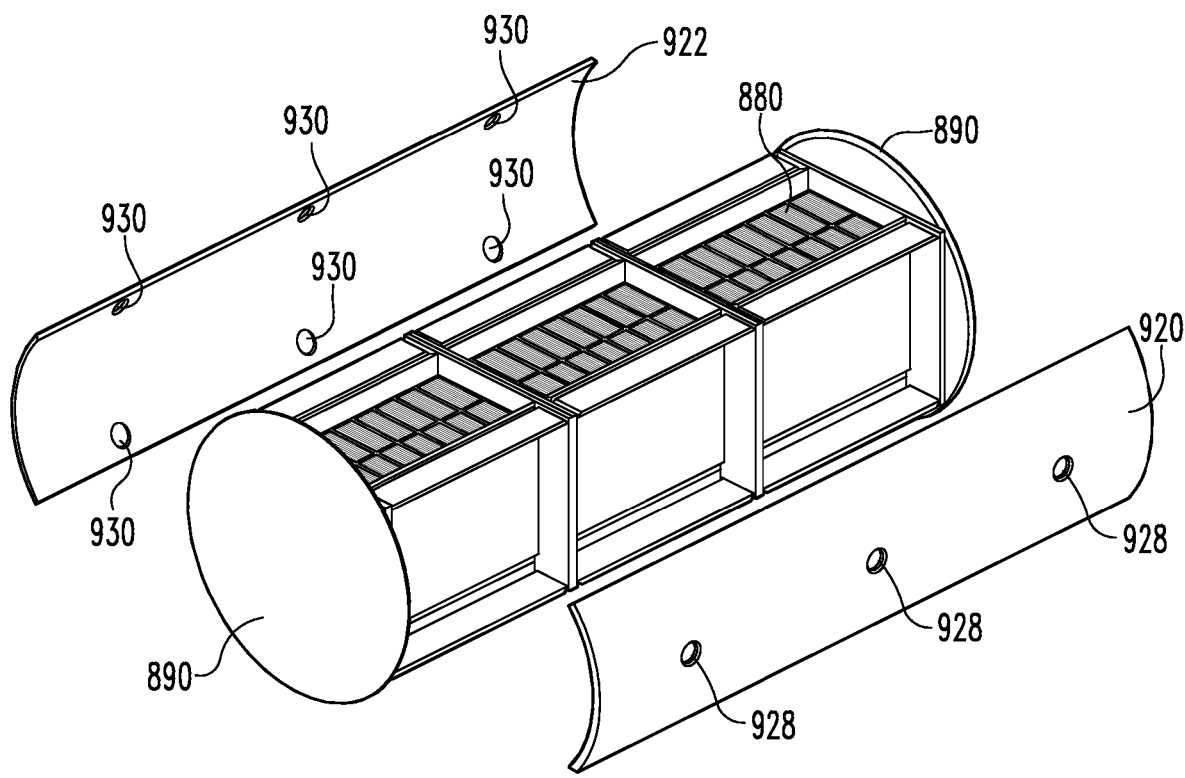
FIG. 59 is an elevated perspective view of the structure of FIG. 57, shown with a pair of side plates in an exploded fashion.
Figure 60:
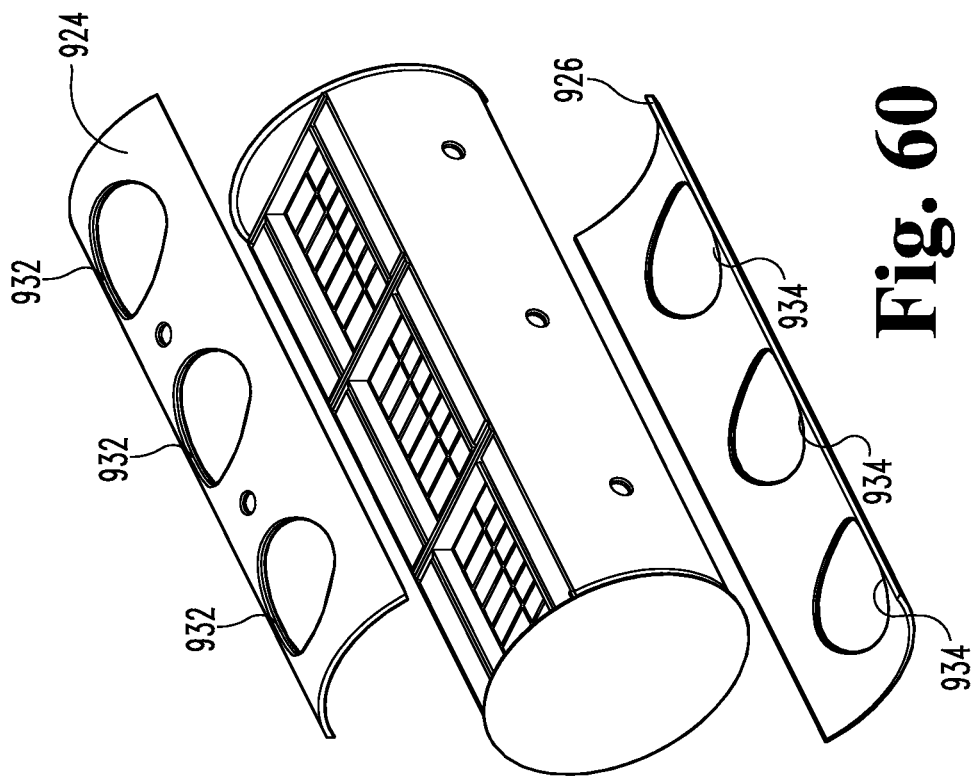
FIG. 60 is an elevated perspective view of the structure of FIG. 59, shown with the other pair of side plates in an exploded fashion.

A second of these fabrication paths is documented in FIGS. 59 and 60. In exemplary form, corresponding side plates 920-926 are mounted to the reactant inlet side 880, the coolant inlet side 882, the product outlet side 884, and the coolant outlet side 886. In particular, a first plate 920 has an arcuate profile and includes three openings 928 providing access to the coolant inlet side 882 of the three microchannel reactors 800. A second plate 922 also has an arcuate profile and includes six openings 930 providing access to the coolant outlet side 888 of the three microchannel reactors 800. A third plate 924 also has an arcuate profile and includes three larger openings 932 providing access to the reactant inlet side 880 of the three microchannel reactors 800. A fourth plate 926 also has an arcuate profile and includes three larger openings 934 providing access to the product outlet side 884 of the three microchannel reactors 800. Each of the corresponding side plates 920-926 is mounted to the microchannel reactors 800 and circular end plates 890 so that fluid entering the three openings 932 nearest the reactant inlet side 880 is not in communication with either the coolant inlet side 882 or the coolant outlet side 886. Similarly, fluid entering the three openings 928 nearest the coolant inlet side 882 is not in communication with either the reactant inlet side 880 or the product outlet side 884. Consequently, each of the four sides 880-886 is isolated from one another except communication existing within the microchannel reactors 800. The completed assembly is shown in FIG. 61 and is functionally the same as the completed assembly using the cylindrical shell 900.

Figure 61:
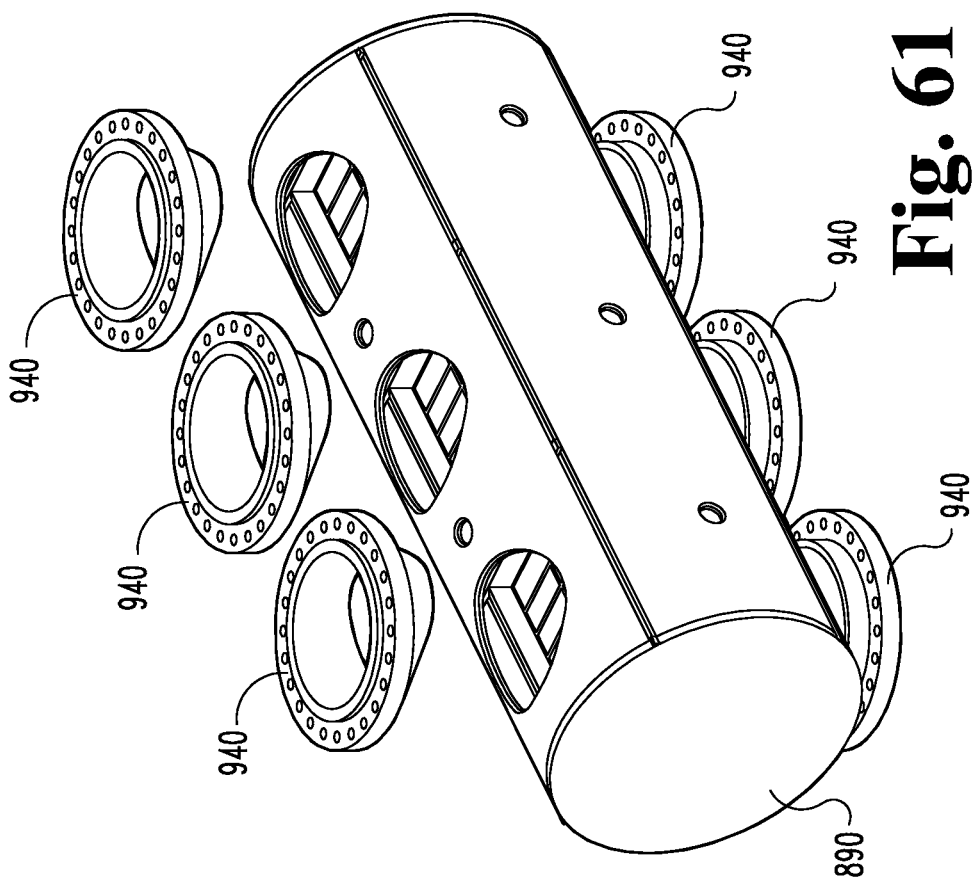
FIG. 61 is an elevated perspective view of the structure of either FIG. 60 or FIG. 58, shown with half of the manways installed and half of the manways in an exploded fashion.

Referencing FIG. 61, six manways 940 are respectively mounted to the six openings providing direct access to the microchannel reactors 800 reactant inlet side 880 and the product outlet side 884. In exemplary form, the manways 940 are welded to the periphery of the openings and include access points that are large enough to provide meaningful access to the reactant microchannels of each microchannel reactor.

Figure 62:
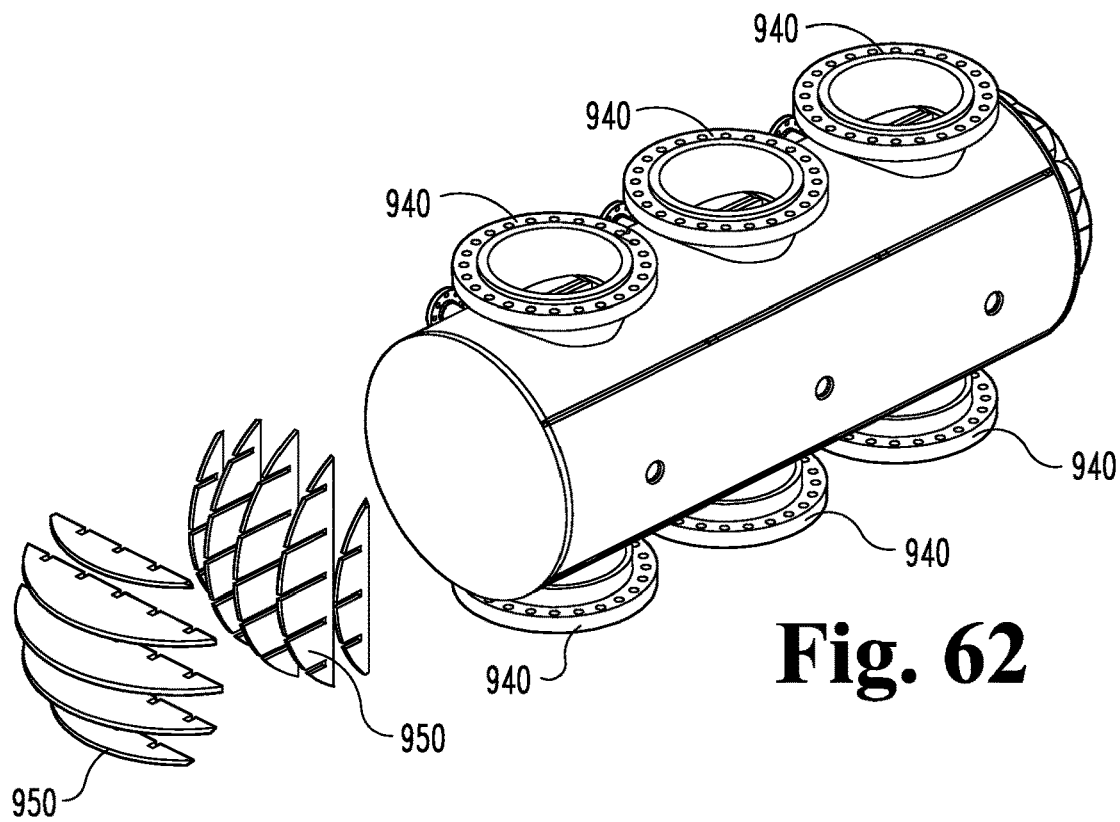
FIG. 62 is an elevated perspective view of the structure of FIG. 61, shown with the stiffening braces in an exploded fashion.

Referring to FIG. 62, the resultant structure shown in FIG. 61 is reinforced at its ends by mounting a series of stiffening braces 950 that are arranged to tie into one another and extend both vertically and side to side.

Figure 63:
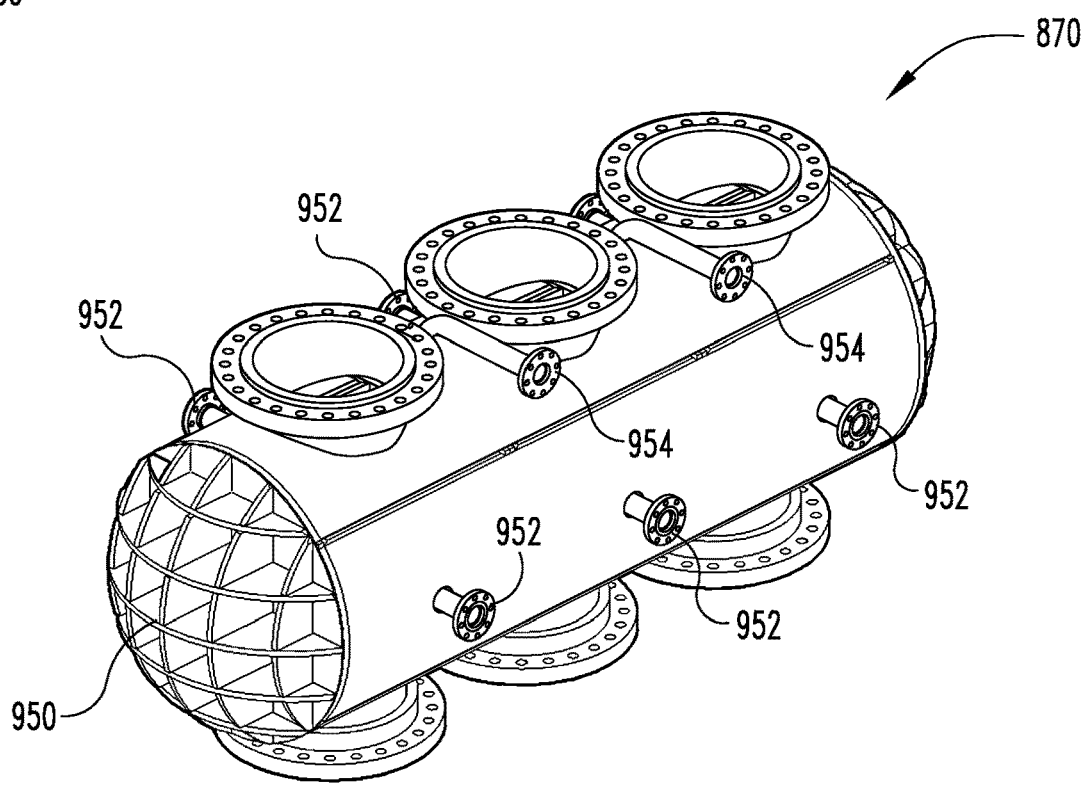
FIG. 63 is an elevated perspective view of an assembled microchannel unit.
Figure 64:
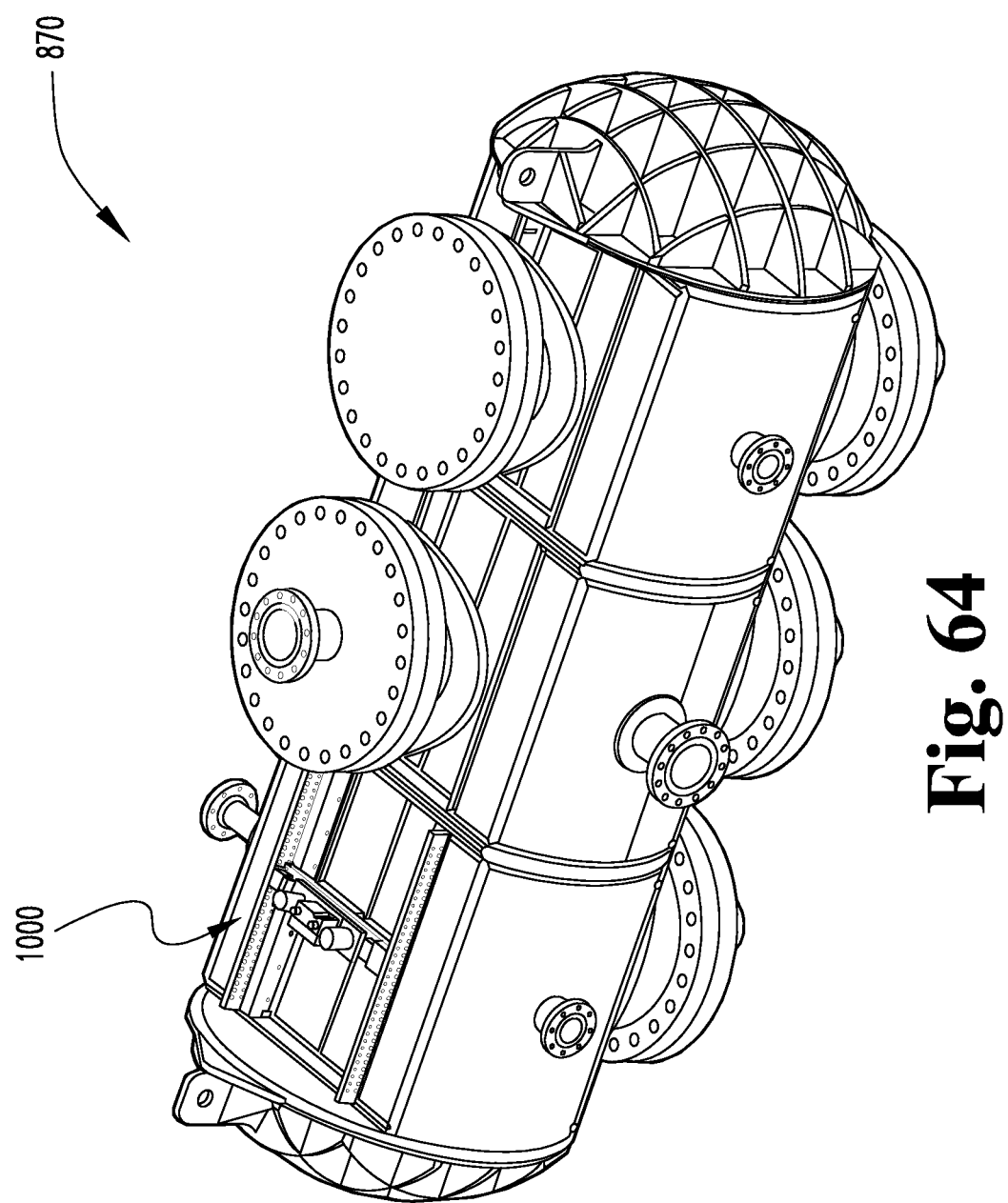
FIG. 64 is an elevated perspective, cut-away view of an exemplary microchannel unit showing the mounting location of an exemplary catalyst densification unit.
Figure 65:
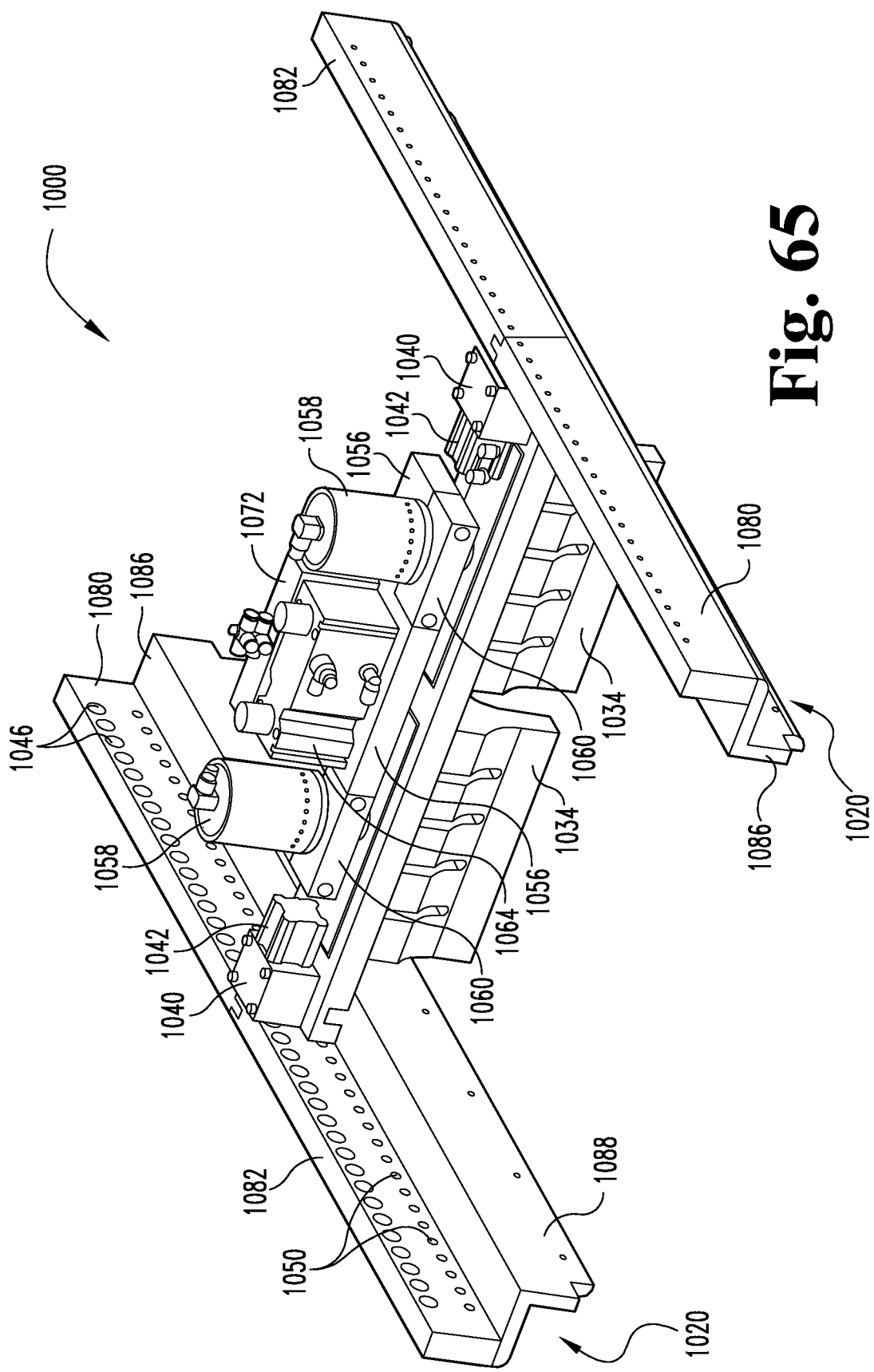
FIG. 65 is an elevated perspective view, from the front, of the exemplary densification unit of FIG. 66.

As shown in FIG. 63, the resultant structure of FIG. 62 has piping and associated flanges 952 mounted to deliver coolant to the microchannel reactors and carry away coolant from the microchannel reactors. In addition, piping and associated flanges 954 are mounted to the resultant structure of FIG. 62 to deliver reactant to the microchannel reactors and carry away product from the microchannel reactors.

Referring to FIGS. 64-68, each exemplary microchannel unit 870 may need to have the reaction microchannels of the reaction subassemblies 812 loaded with catalyst subsequent to assembly. In order to load catalyst into the reaction microchannels and dislodge spent catalyst from the reaction microchannels, the instant disclosure includes an ultrasonic densification unit 1000. By way of example, the ultrasonic densification unit 1000 is fabricated from component parts sized to allow insertion of the ultrasonic densification unit through one or more of the manways 940 on the reaction inlet side. This compact densification unit 1000 solves the problem of access to ultrasonic technology in the field to service a microchannel unit 870. More specifically, larger ultrasonic equipment may be used to initially pack catalyst, but this larger equipment is not feasible for use in the field to load fresh catalyst by service technicians and certainly not able to be inserted through a manway cover.

By way of example and not limitation, the ultrasonic densification unit 1000 can be assembled from multiple pre-assembled sections and installed in the interior of the microchannel unit 870. The microchannel unit is constructed in order to be adapted to use the ultrasonic densification unit. For example, the four reactant boundary supports 822 includes a series of T-shaped vertical channels 840 that are adapted to receive fasteners from two right side rail sections, two left side rail sections. In this example, five pre-assembled sections are used. These preassembled sections comprise two right side rail sections, two left side rail sections, and a carriage assembly. It should be noted that the ultrasonic densification unit 1000 may be assembled from less than or more than five pre-assembled sections.

Figure 66:
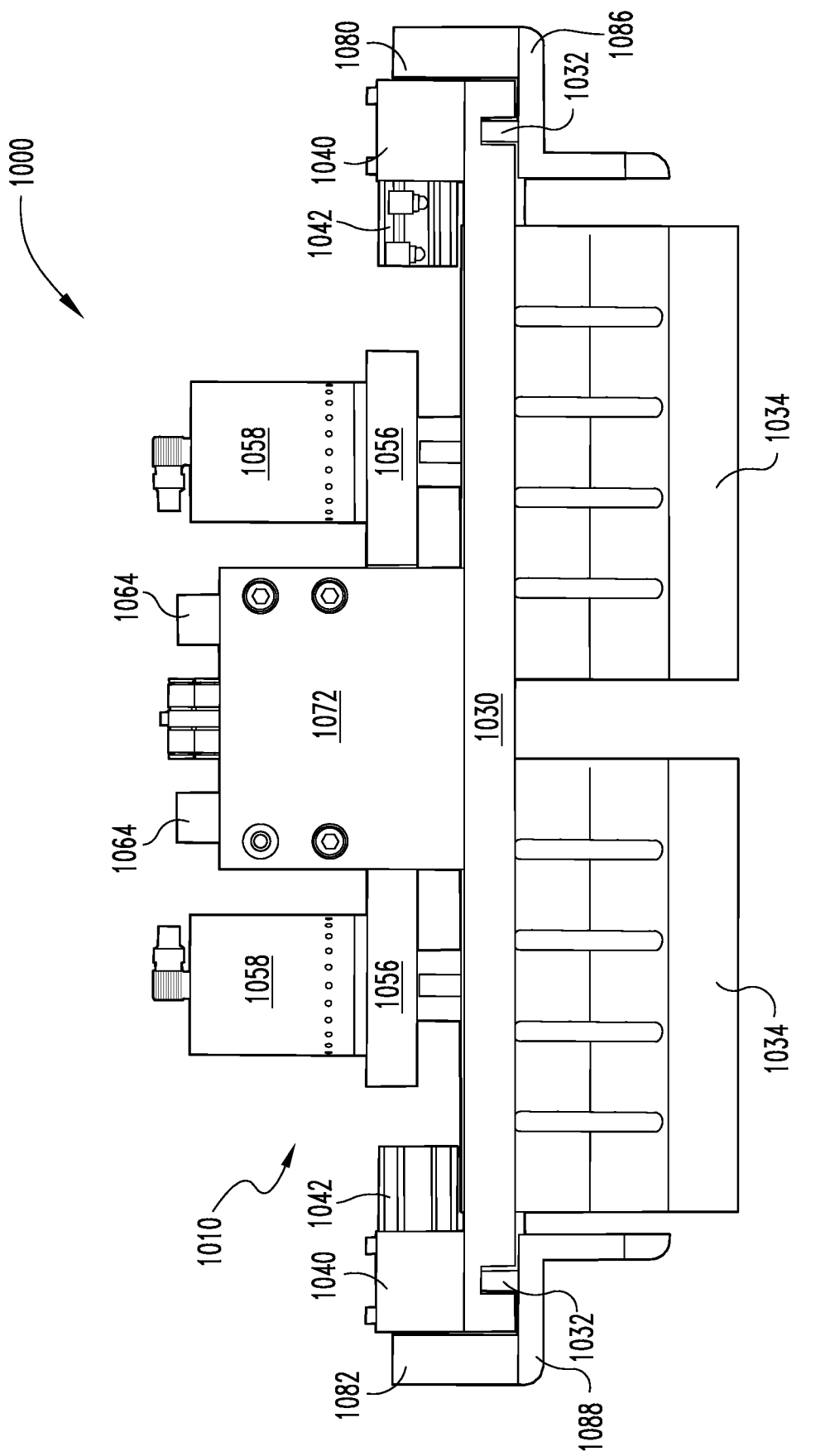
FIG. 66 is a rear view of the exemplary densification unit of FIG. 66.

Referencing FIG. 66, an exemplary microchannel unit 870 is shown with the third plate 924 removed (see FIG. 60) and the first manway 940 removed (see FIG. 61) for illustration purposes only in order to show the installed position of the ultrasonic densification unit 1000 (within the microchannel unit 870) on the reactant inlet side 880 of a first of the three microchannel reactors 800. Prior to gaining access to the reactant inlet side 880, it may be necessary to remove the retention subassemblies 850 directly covering the top of the reaction subassemblies 812. As will be discussed in more detail hereafter, the densification unit 1000 includes a densification carriage assembly 1010 that traverses along a pair of spaced apart rails 1020 in order to subject the contents of a predetermined portion of the reaction subassemblies 812 to ultrasonic waves in an incremental fashion until all of the reaction subassemblies of a microchannel reactor 800 have been processed. In particular, each of the rails 1020 engages corresponding reactant boundary supports 822 of the microchannel reactor 800 to secure the densification unit 1000 to the microchannel reactor 800.

Figure 67:
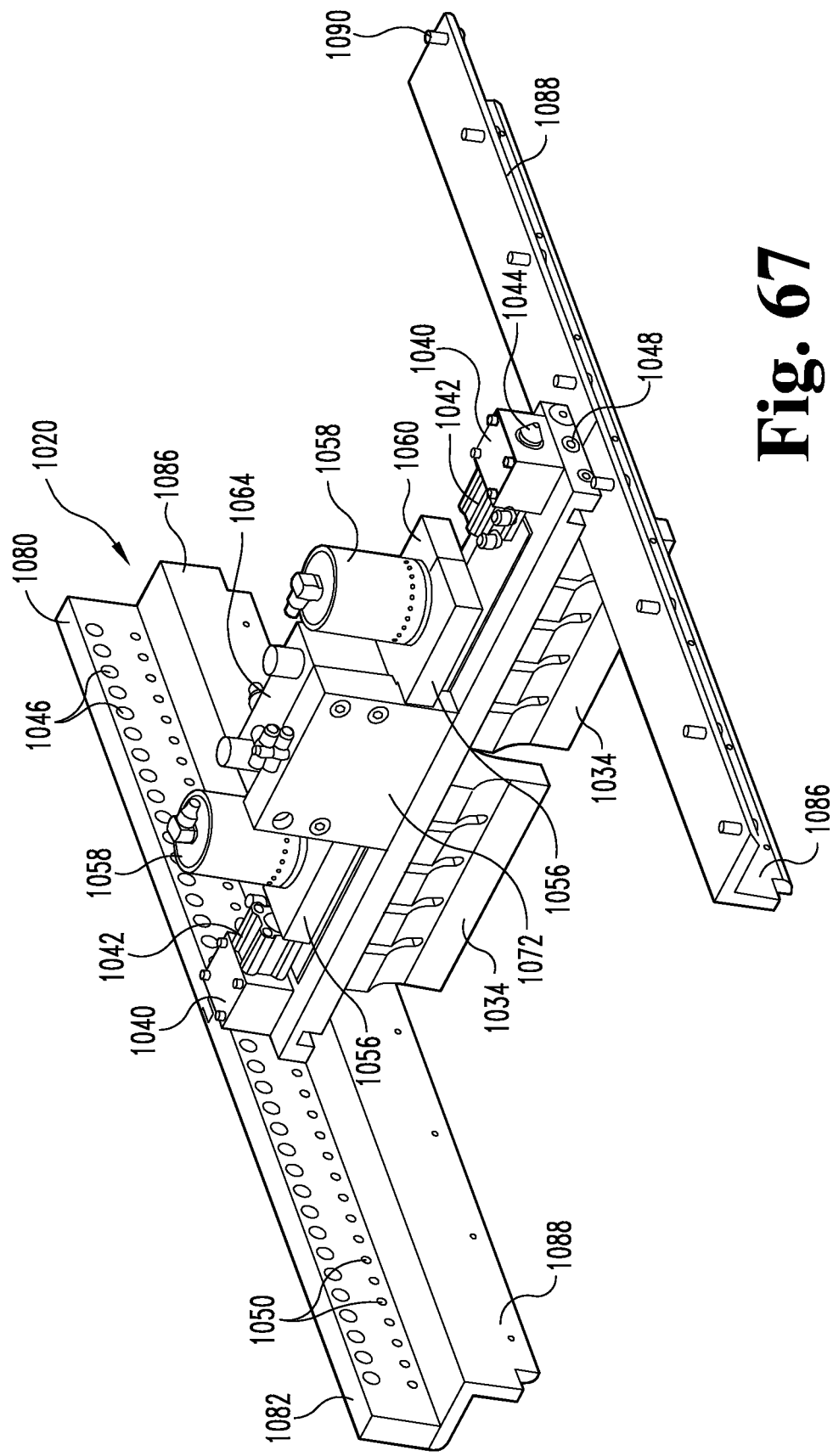
FIG. 67 is an elevated perspective view, from the rear, of the exemplary densification unit of FIG. 66, shown without part of one rail.
Figure 68:
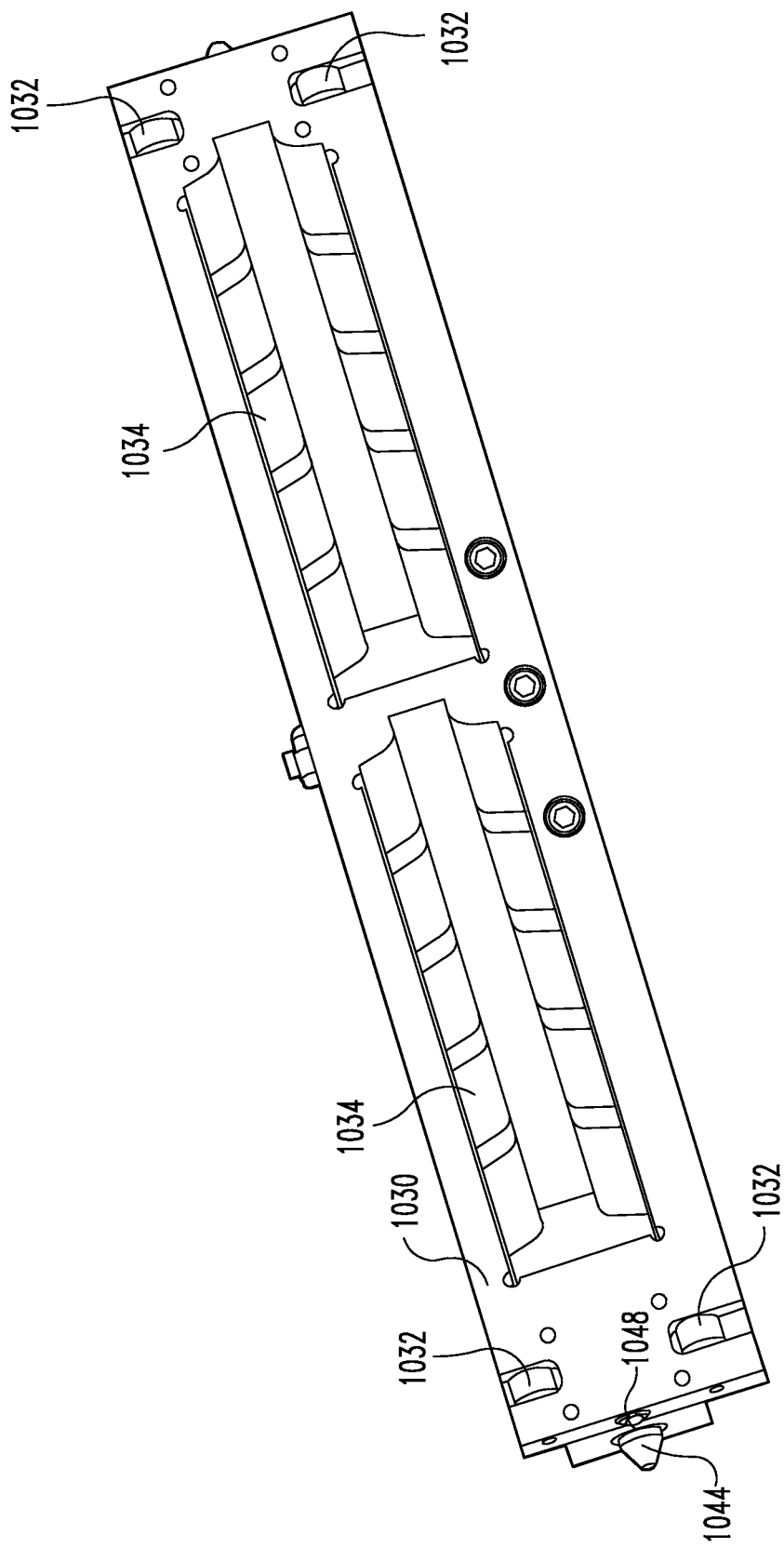
FIG. 68 is a bottom view of an exemplary carriage assembly.

Referring to FIGS. 67-69, the densification unit 1000 includes the densification carriage assembly 1010 that comprises numerous components. All of the components of the carriage assembly 1010 are mounted to a carriage baseplate 1030. An underside of the carriage baseplate 1030 includes four recesses that each accommodate a self-lubricated cam follower 1032. The underside also has mounted thereto a pair of ultrasonic horns 1034.

On the top surface of the carriage baseplate 1030 is mounted a pin block 1040 proximate each end that is coupled to a pneumatic piston assembly 1042. The piston assembly 1042 engages a shot pin 1044 that is repositionable between an extended position and a retracted position. As will be discussed in more detail hereafter, when the shot pin 1044 is in its extended position and received within one of a plurality of orifices 1046 of a respective rail 1020 the carriage assembly 1010 is not repositionable with respect to the rails, while when the shot pin is in its retracted position the carriage assembly may be repositionable with respect to the rails. In addition, a ball plunger 1048 is mounted within a recess that extends into the end of the carriage baseplate 1030. This ball plunger 1048 is also repositionable between an extended position and a retracted position, where the extended position has a portion of the ball plunger received within one of a plurality of orifices 1050 of one of the rails 1020 the carriage assembly 1010 so that the carriage assembly is not repositionable with respect to the rails, while the retracted position withdrawals the ball plunger from the orifice so that the carriage assembly may be repositionable with respect to the rails.

Centered between the pneumatic piston assemblies 1042 is a booster mount 1056 to which a pair of ultrasonic converters 1058 are mounted. In this exemplary embodiment, each ultrasonic horn 1034 is coupled to a respective ultrasonic converter 1058. In order to secure the ultrasonic converter 1058 in the desired position, both the booster mount 1056 and a booster mount cap 1060 includes a semicircular cut-out. In this manner, once the booster mount cap 1060 is attached to the booster mount 1056 using fasteners (e.g., bolts), the fasteners may be tightened to so the booster mount and cap sandwich a respective ultrasonic converter 1058. The booster mount 1056 also includes a depression that is sized to receive a portion of a compact guide cylinder 1064. The guide cylinder performs the function of raising and lowering the ultrasonic horns to provide contact to and pressure against the reactor surface during densification and raising to allow for movement along the rail. On the rear of the guide cylinder 1064 is mounted a bracket 1072 that sits upon the top of the carriage baseplate 1030. The guide bracket provides an attachment point for the guide cylinder to hold it stable during raising and lowering operation.

Each of the pair of spaced apart rails 1020 comprises separable components to facilitate assembly inside the exemplary microchannel unit 870 using one of the manways 940 as an egress location for the components. In this exemplary embodiment, the rails 1020 each include a two sections that are assembled to one another using a dovetail cut that extends vertically through the side guides 1080, 1082. Each side guide is mounted to a respective angle section 1086, 1088 having an L-shaped ninety degree profile. In this exemplary embodiment, a series of dowels 1090 extend through the angle sections 1086, 1088 and are received within corresponding recesses formed into the bottom of the side guides 1080, 1082 in order to mount the angle sections to the side guides.

As discussed briefly beforehand, each exemplary microchannel unit 870 may need to have its reaction microchannels of the reaction subassemblies 812 loaded with catalyst subsequent to assembly. In order to load catalyst into the reaction microchannels one may start by removing one of the manway 940 covers as well as the top retention subassembly 850 to expose the reaction microchannels of the reaction subassemblies 812. After the reaction microchannels are exposed, one may deliver particulate catalyst on top of the reaction microchannels, where the particulate catalyst is small enough in size to flow into the reaction microchannels. This process is carried out until almost all, if not all, of the reaction microchannels appear to be full of particulate catalyst (i.e., the particulate catalyst comes to the top of the reaction microchannel). At this point, one may install the ultrasonic densification unit 1000.

Installation of the ultrasonic densification unit 1000 includes assembling the rails 1020 and thereafter securing the rails to the respective reactant boundary supports 822 (see FIG. 51). Likewise, the densification carriage assembly 1010 is brought through the open manway 940 and installed onto the rails 1020 so that the cam followers 1032 sit upon the horizontal surface of the angle sections 1086, 1088. It should be noted that the rails 1020 are installed onto the reactant boundary supports 822 so the ultrasonic horns 1034 will vertically overly and can be vertically lowered to contact the microchannel unit. In this example, the ultrasonic horns contact a respective coolant subassembly 810 interposing respective reactant subassemblies 812 when the shot pin 1044 is in its extended position and received within one of a plurality of orifices 1046 of a respective side guides 1080, 1082. In exemplary form, the side guides 1080, 1082 each include thirty nine orifices 1046 that correspond to a total of thirty nine coolant subassemblies 810 interposing forty reactant subassemblies 812 (the actual numbers are double these figures because each horn 1034 overlies a different set of subassemblies).

Starting at orifice #1, the shot pins 1044 are moved to their extended position and received within orifice #1 1046. Thereafter, the horns 1034 are lowered to contact and affirmatively pressed against the first coolant subassembly 810. The ultrasonic horns 1034 are then activated for a predetermined time (e.g., for ten seconds), which operates to compact the catalyst within each of the adjacent reactant subassemblies 812. Each of the horns 1034 is deactivated and raised, followed by movement of the shot pins 1044 to their retracted position. Thereafter, the carriage assembly 1010 is repositioned so that the shot pins 1044 are moved into axial alignment with orifice #2. The shot pins 1044 are moved to their extended position, the horns 1034 lowered and activated to compact catalyst within each of the adjacent reactant subassemblies 812. This process is repeated until all reactant subassemblies 812 have been compacted. It is important to sequentially perform this process in order to provide ultrasonic energy to different areas of the surface of the unit to achieve uniform packing. It should be noted that the control of the carriage assembly 1010 and its components may be any combination of manual or automatic manipulation.

After the first round of compaction, the reaction microchannels exhibit between six to eight inches of variation in catalyst packing. It is preferred that the catalyst be uniformly packed throughout the reaction microchannels, so additional catalyst is added and substantially leveled over the microchannels. Thereafter, a second round of compaction using the ultrasonic densification unit 1000 is carried out that follows the same sequence as discussed for the first round.

After a second round of compaction, the reaction microchannels exhibit approximately one half inch of variation in catalyst packing. A third catalyst addition step is carried out, followed by a third round of compaction. This sequence of catalyst addition and compaction may be repeated as many times as necessary to achieve the desired catalyst densification within the reaction microchannels of the reactant subassemblies 812. When the desired densification is reacted, the ultrasonic densification unit 1000 is disassembled and removed from the microchannel unit 870 via the first manway 940. Thereafter, the retention subassembly 850 directly covering the top of the reaction subassemblies 812 is installed, followed by the manway 940 cover.

It is also within the scope of the disclosure to utilize the ultrasonic densification unit 1000 to help with removal of spent catalyst from the reactant subassemblies 812. This exemplary sequence is particularly useful for field servicing of the microchannel unit 870 after it has been permanently installed and operating, but needs to have the spent catalyst regenerated or replaced. An exemplary sequence begins by removing both the top and bottom manway 940 covers for the exemplary microchannel unit 870. Thereafter, both the top and bottom the retention subassemblies 850 directly covering the top and bottom of the reaction subassemblies 812 are removed. The components of the densification unit 1000 are then inserted through the top manway 940 and assembled so that the rails are fastened to a respective angle section 1086, 1088 and the carriage assembly 1020 can ride upon the rails 1020.

Starting at orifice #1, the shot pins 1044 are moved to their extended position and received within orifice #1 1046. Thereafter, the horns 1034 are lowered to contact the first coolant subassembly 810. The ultrasonic horns 1034 are then activated for a predetermined time (e.g., for ten seconds), which operates to dislodge caked catalyst from the interior of the reactant subassemblies 812. The dislodged catalyst falls out of the bottom of the reactant microchannels and is collected and removed via the bottom manway. Each of the horns 1034 is deactivated and raised, followed by movement of the shot pins 1044 to their retracted position. Thereafter, the carriage assembly 1010 is repositioned so that the shot pins 1044 are moved into axial alignment with orifice #2. The shot pins 1044 are moved to their extended position, the horns 1034 lowered and activated to dislodge further catalyst from within each of the adjacent reactant subassemblies 812. This process is repeated until all or substantially all of the catalyst has been dislodged from the reactant subassemblies 812. As discussed above, the movement sequence of the carriage assembly 1020 components may be any combination of manual or automatic manipulation.

After a first round of catalyst dislodgement is performed, the reaction microchannels may be optionally washed or rinsed with a fluid to remove any residual catalyst. It should be noted that this washing process is optional and need not be performed in all instances prior to loading new catalyst to the microchannel reaction subassemblies 812. After the spent catalyst is collected, the retention subassembly 850 is installed at the bottom of the reaction subassemblies 812 and the bottom manway cover reattached. Thereafter, new or refurbished catalyst is added to the top of the reaction subassemblies and subjected to a densification process to properly pack catalyst within the reaction subassemblies 812. A detailed sequence of the densification process has been omitted in furtherance of brevity given that it is generally the same sequence as discussed above for loading new catalyst to the reaction subassemblies.

To overcome challenges of propagating ultrasound waves through the walls of a microchannel reactor body, the ultrasonic source horn (Ultra Sonic Seal, Model ST, 1500 watt ultrasound power supply (Broomall, Pa.) is equipped with a 2.54 cm×20.3 cm titanium horn manufactured by ToolTex, Inc. Grove City, Ohio.

It was demonstrated that if the horn is positioned in the manner described above, the reactant microchannels (that contain the particulate catalyst) function as a focusing medium for the ultrasonic energy by creating transversal waves that transmit ultrasound vibration through the walls of the channels in a longitudinal direction. This proved effective in transmitting the vibration frequency through the entire length of the microchannels (up to 61 cm in length demonstrated and at least 1 m or more in length expected) channels with minimal attenuation. In this case the ultrasound components consisted of a 1500 W supply transformer, an amplitude booster and a tuned titanium ultrasonic horn measuring 20.3 cm long by 2.54 cm wide. The position of the ultrasound unit was pneumatically adjustable in the vertical plane along the length of the steel column. The pneumatic control also positioned the horn directly on the top edge of the channels with adjustability of its contact pressure against the surface of the device. Either a metal screen or thin metal plate was placed between the top of the channels and the emitting horn to prevent contact damage to the ends of the reactant microchannels. It is envisioned that this approach will also work for stainless steel microchannels with or without using a waveform. It is not believed that that the material of the microchannel is critical to operation of this method, although metals are preferred.

Ultrasound densification testing was conducted on particulate material packed between a steel and acrylic plate test device. Ultrasound was transmitted through a steel plate or from the top of the device at the apex of the channels. Adjustments were made to burst duration and contact pressure of the horn against the device during these initial trials. Burst duration was typically from 5-20 seconds and the horn was adjusted to a frequency of 20 kHz at amplitude 0.5 mm. Pressure of the horn against the device body was surprisingly found to be an important parameter. If the pressure of the horn was too low it hammered against the contact surface at its input frequency increasing the potential for damage to the face of the horn with little propagation of ultrasound into the device. If the pressure was too high the horn "coupled" with the device and sonic energy was mitigated, diminishing the efficiency of the process.

Densification was more than ten times faster and beyond that which was achieved through mechanical means. For example, a 61 cm long waveform was filled with particles with an average diameter of 300 μm support material and densified by striking the device body with a rubber mallet ~400 times over a 10 minute period until perceived maximum densification was achieved. Introduction of ultrasound through the tops of the channels for a period of only 5 seconds settled the powder bed another inch. Fill level uniformity across all channels also improved compared to mechanical vibration. In this case the contact pressure of the horn against the channels was 25 psi. In a demonstration of excessive energy input the contact pressure was increased to 45 psi and the powder within the channels was disrupted through fluidization resulting in inconsistent density and poor fill level uniformity.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method of increasing packing density of particulates loaded into a plurality of microchannels in microchannel apparatus, comprising:
   providing a microchannel apparatus comprising a plurality of microchannels having particulates contained therein;
   mounting a mobile carriage including an ultrasonic horn to a microchannel apparatus, the mobile carriage including the ultrasonic horn traversing along a rail between a first position where the mobile carriage including the ultrasonic horn is in acoustic communication with the plurality of microchannels and a second position where the mobile carriage including the ultrasonic horn is not in acoustic communication with the plurality of microchannels; and,
   applying ultrasonic sound to the plurality of microchannels from the ultrasonic horn to densify the particulates to form a packed bed of particulates within the plurality of microchannels.

2. The method of claim 1, wherein a sonically conductive material is disposed between the ultrasonic horn and the plurality of microchannels.

3. The method of claim 1, wherein the ultrasonic sound is applied in bursts of one to ten seconds.

4. The method of claim 1, wherein each microchannel in the plurality of microchannels has a length of at least 10 cm and at least one dimension of 10 mm or less.

5. The method of claim 1, wherein the microchannel apparatus comprises at least 1000 microchannels and wherein the mobile carriage including the ultrasonic horn extends over no more than 500 of the at least 1000 microchannels at one time.

6. The method of claim 1, wherein: the microchannel apparatus comprises an insert that extends down the length of at least one of the plurality of microchannels; and, the insert transmits sound down the length of the at least one of the plurality of microchannels.

7. The method of claim 6, wherein the microchannel apparatus comprises channels at least partly defined by walls of a wave-shaped insert.

8. The method of claim 6, wherein: the microchannel length is typically longer than the insert length, and the insert has a length that is at least 50% that of the microchannel.

9. The method of claim 1, wherein the step of applying ultrasonic energy is conducted while the plurality of microchannels are dry.

10. The method of claim 1, wherein the particulates comprise catalyst.

11. The method of claim 1, wherein the packed bed includes a void fraction of 0.50 or less.

12. The method of claim 11, wherein a pack density of any subset of the plurality of microchannels varies by less than 10 percent.

13. The method of claim 1, wherein the mobile carriage including the ultrasonic horn is autonomously repositionable.

14. The method of claim 1, wherein the mobile carriage comprises a piston assembly comprising a shot pin that is repositionable between an extended position and a retracted position.

15. The method of claim 1, wherein the ultrasonic horn is vertically repositionable with respect to the rail, and where the rail comprises at least two sections operatively coupled to one another.

* * * * *